(12) United States Patent
Molitor et al.

(10) Patent No.: US 6,299,550 B1
(45) Date of Patent: *Oct. 9, 2001

(54) GOLF BALL WITH MULTIPLE SHELL LAYERS

(75) Inventors: Robert P. Molitor, Niles, MI (US); Terence Melvin, Ormond Beach, FL (US); Michael J. Sullivan, Chicopee; Joseph E. Stahl, Southampton, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/040,797

(22) Filed: Mar. 18, 1998

Related U.S. Application Data

(63) Continuation-in-part of application No. 08/959,952, filed on Oct. 24, 1997, now abandoned, which is a continuation of application No. 08/839,740, filed on Apr. 15, 1997, now abandoned, which is a continuation of application No. 08/471,682, filed on Jun. 6, 1995, now abandoned, which is a continuation of application No. 08/162,215, filed on Dec. 2, 1993, now Pat. No. 5,480,155, which is a continuation-in-part of application No. 07/887,727, filed on May 22, 1992, now abandoned, which is a division of application No. 07/321,689, filed on Mar. 10, 1989, now Pat. No. 5,150,906, application No. 09/040,797, which is a continuation-in-part of application No. 08/495,062, filed on Jun. 26, 1995, now Pat. No. 5,830,087.

(60) Provisional application No. 60/042,119, filed on Mar. 28, 1997.

(51) Int. Cl.$^7$ .................................................. A63B 37/08

(52) U.S. Cl. ................................................. 473/354

(58) Field of Search ............................ 473/354, 368

(56) References Cited

U.S. PATENT DOCUMENTS

| 715,295 | * 12/1902 | Richards ............................ 473/354 |
| 1,167,396 | 1/1916 | Gammeter . |
| 2,249,612 | 7/1941 | Kalowski . |
| 3,248,113 | 4/1966 | Baggenstoss et al. . |
| 3,616,101 | * 10/1971 | Satchell ............................ 473/354 |
| 4,610,071 | 9/1986 | Miller . |
| 4,805,914 | 2/1989 | Toland . |
| 5,150,906 | 9/1992 | Molitor et al. . |
| 5,480,155 | 1/1996 | Molitor . |
| 5,683,312 | 11/1997 | Boehm et al. . |
| 5,816,937 | * 10/1998 | Shimosaka et al. ................ 473/354 |

* cited by examiner

Primary Examiner—Mark S. Graham
Assistant Examiner—Raeann Gorden

(57) ABSTRACT

Disclosed herein is a golf ball comprising a spherical shell which includes at least an inner first layer, a second layer, and a third layer, the second layer being sandwiched between the first layer and the third layer, and a core which substantially fills the spherical shell, the core comprising at least one of a liquid, a gel and a melt. The sum of the thickness of the first layer, second layer and third layer is 0.10–0.30 inches. The core at least substantially fills the spherical shell without stressing the spherical shell. The spherical shell, as opposed to the core, is primarily responsible for the high initial velocity obtained when the golf ball is struck by a golf club so as to allow the golf ball to be driven long distances both in the air and on the ground when it lands. A method of making the golf ball also is disclosed. The golf ball is particularly well-suited for use by players seeking a long distance ball with a low spin rate.

43 Claims, 23 Drawing Sheets

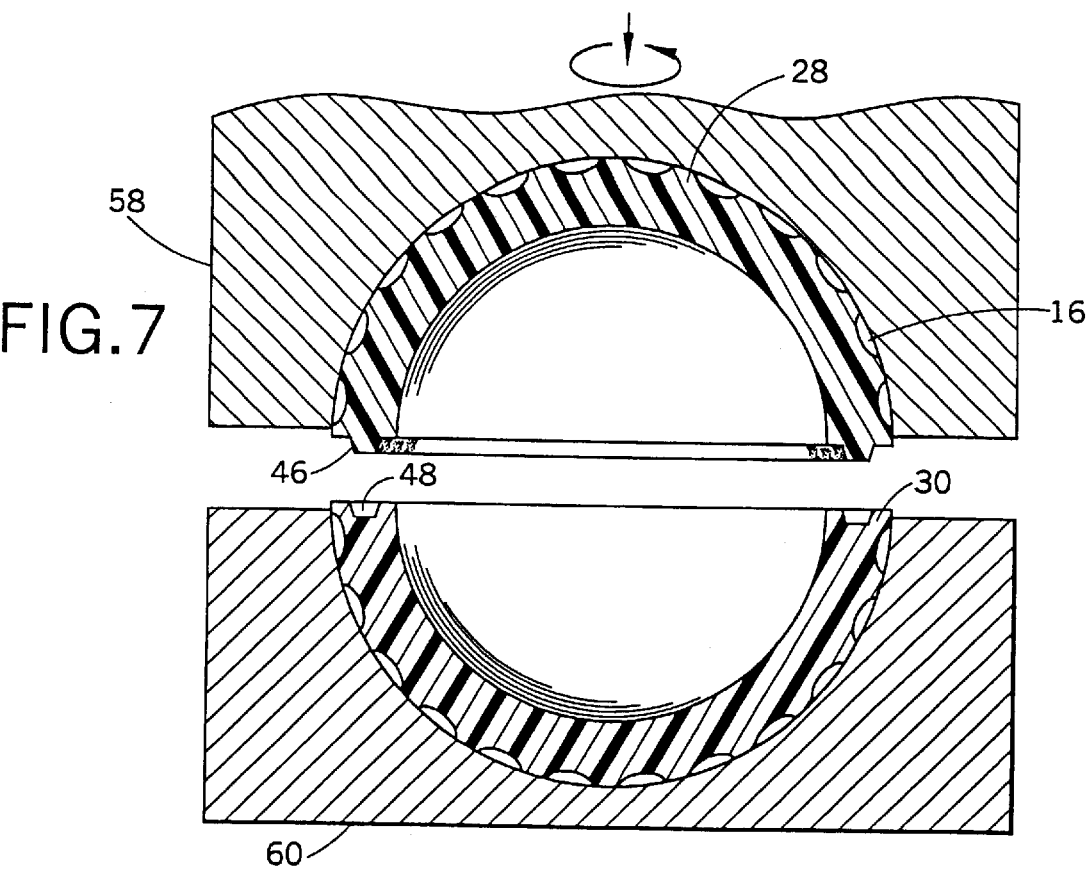
FIG. 7
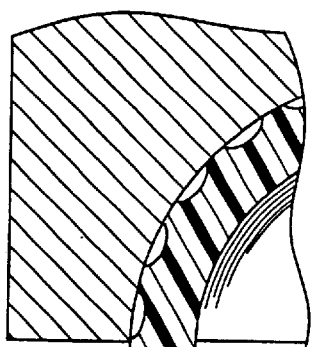
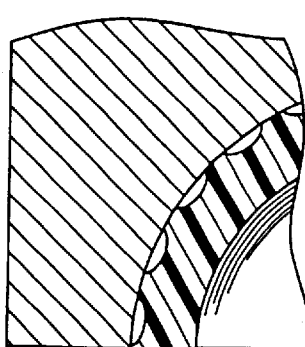
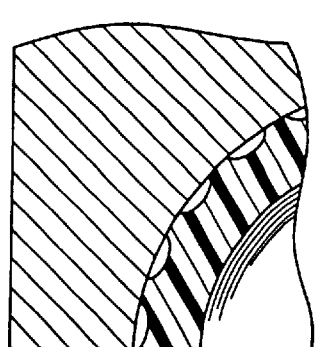
FIG. 8  FIG. 9  FIG. 10

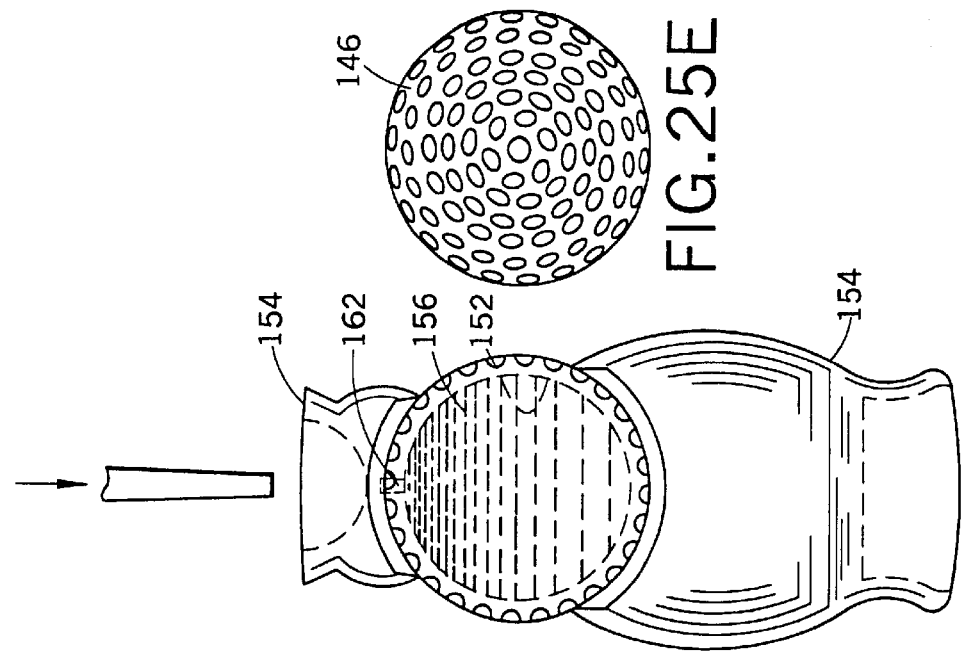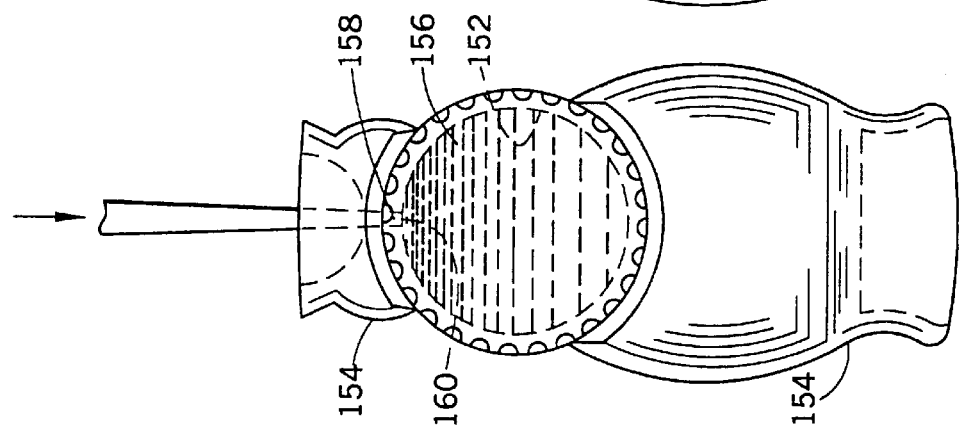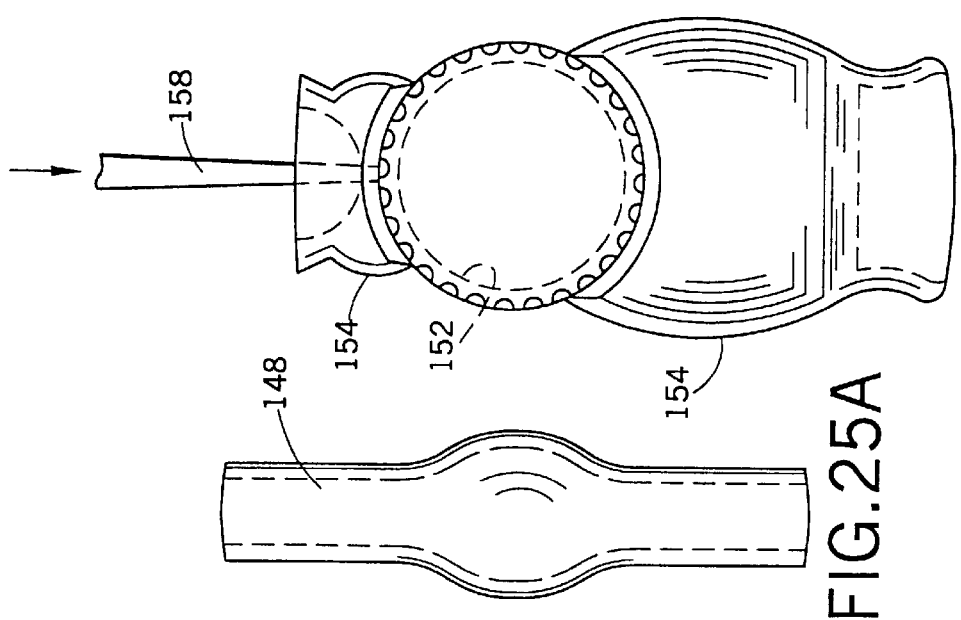

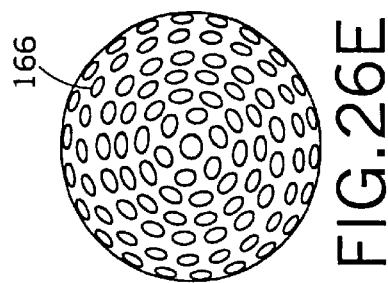
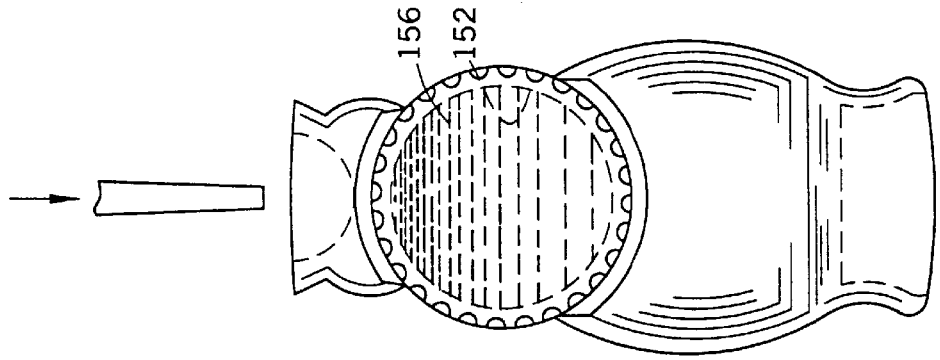
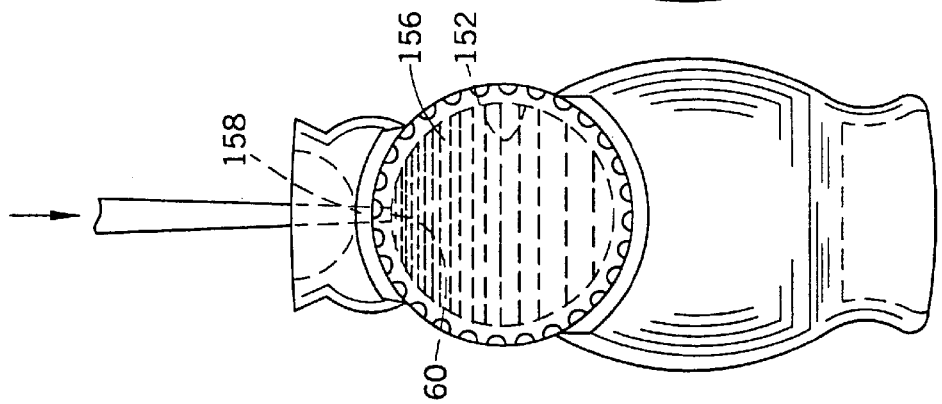
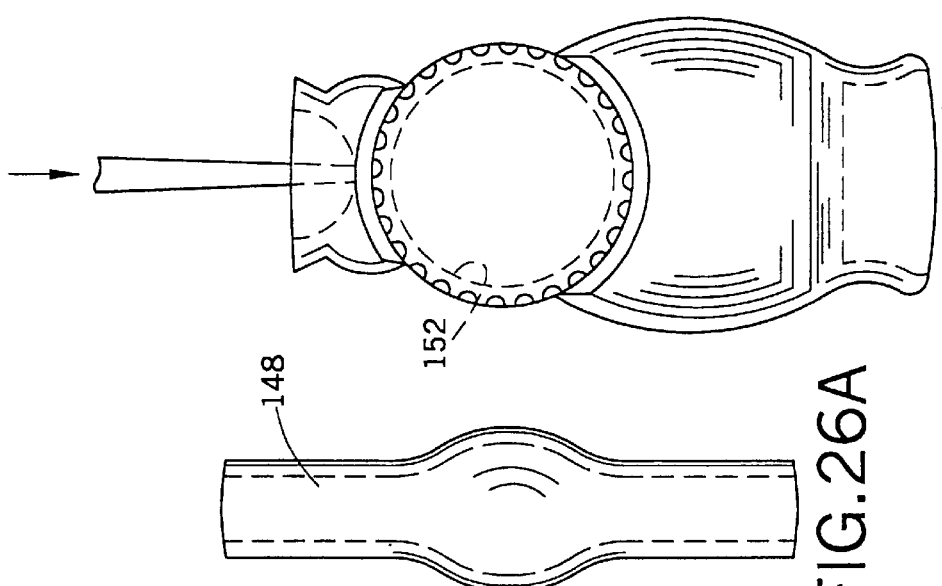

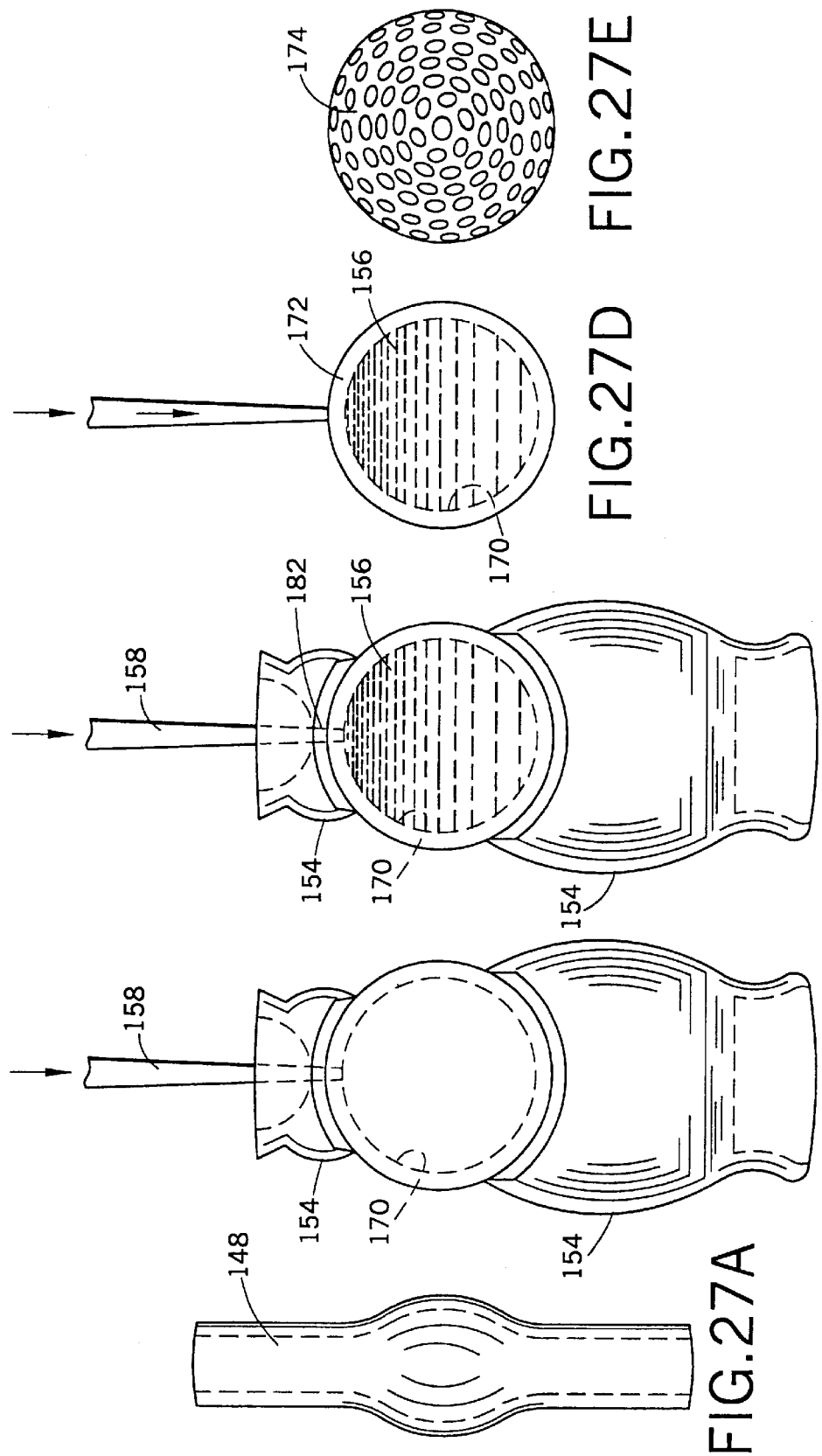

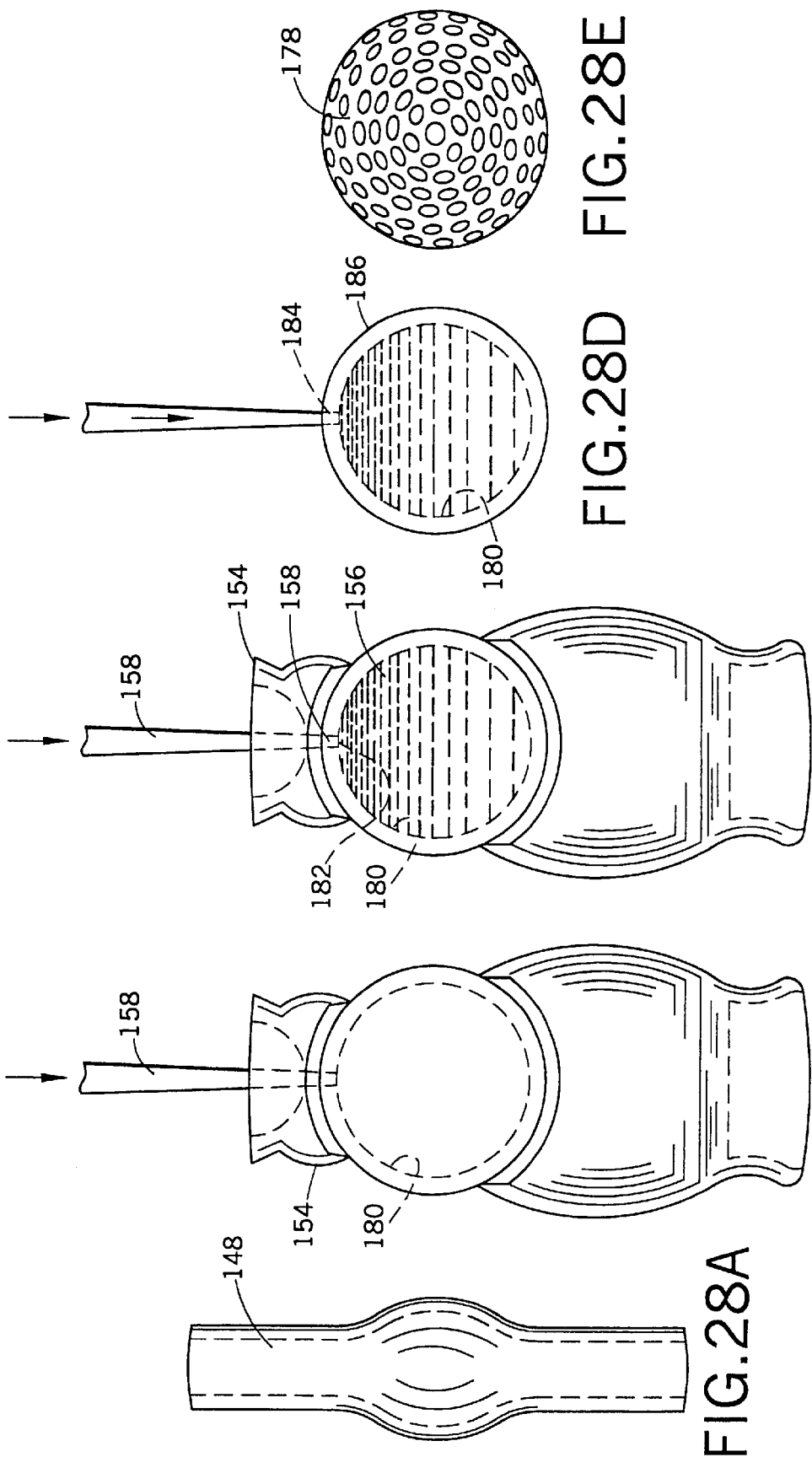

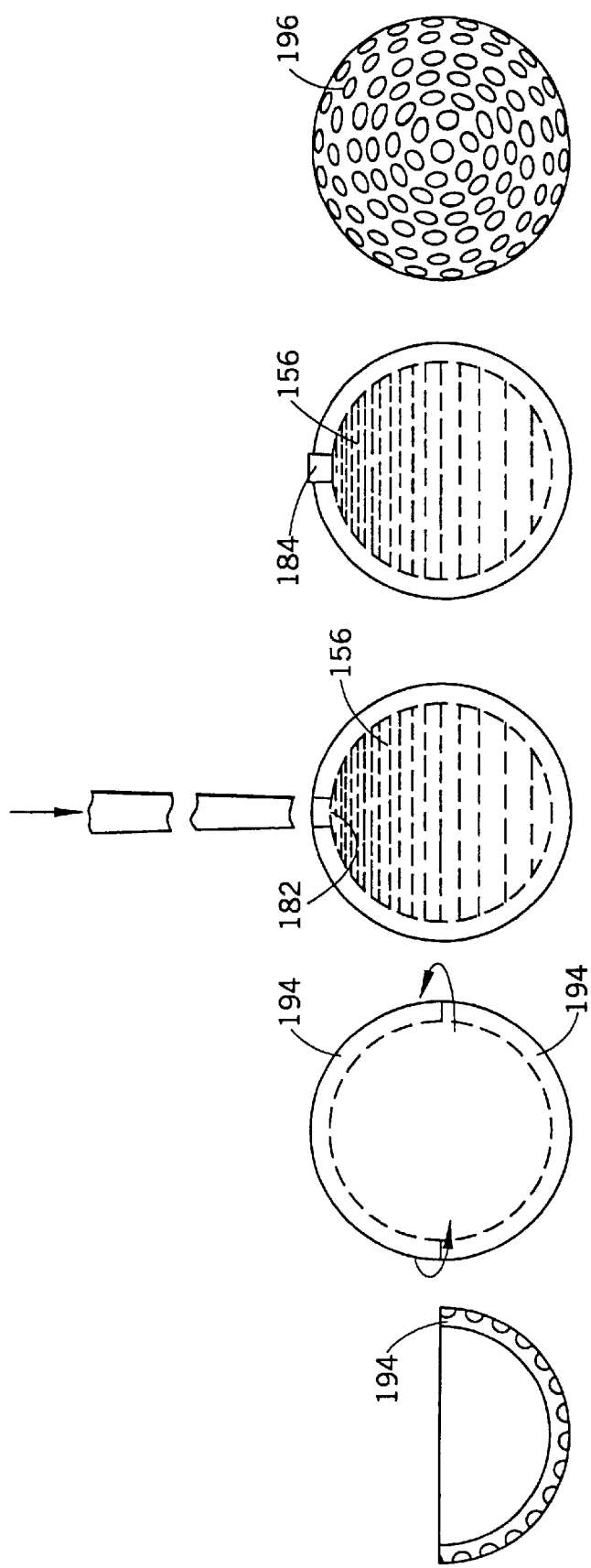

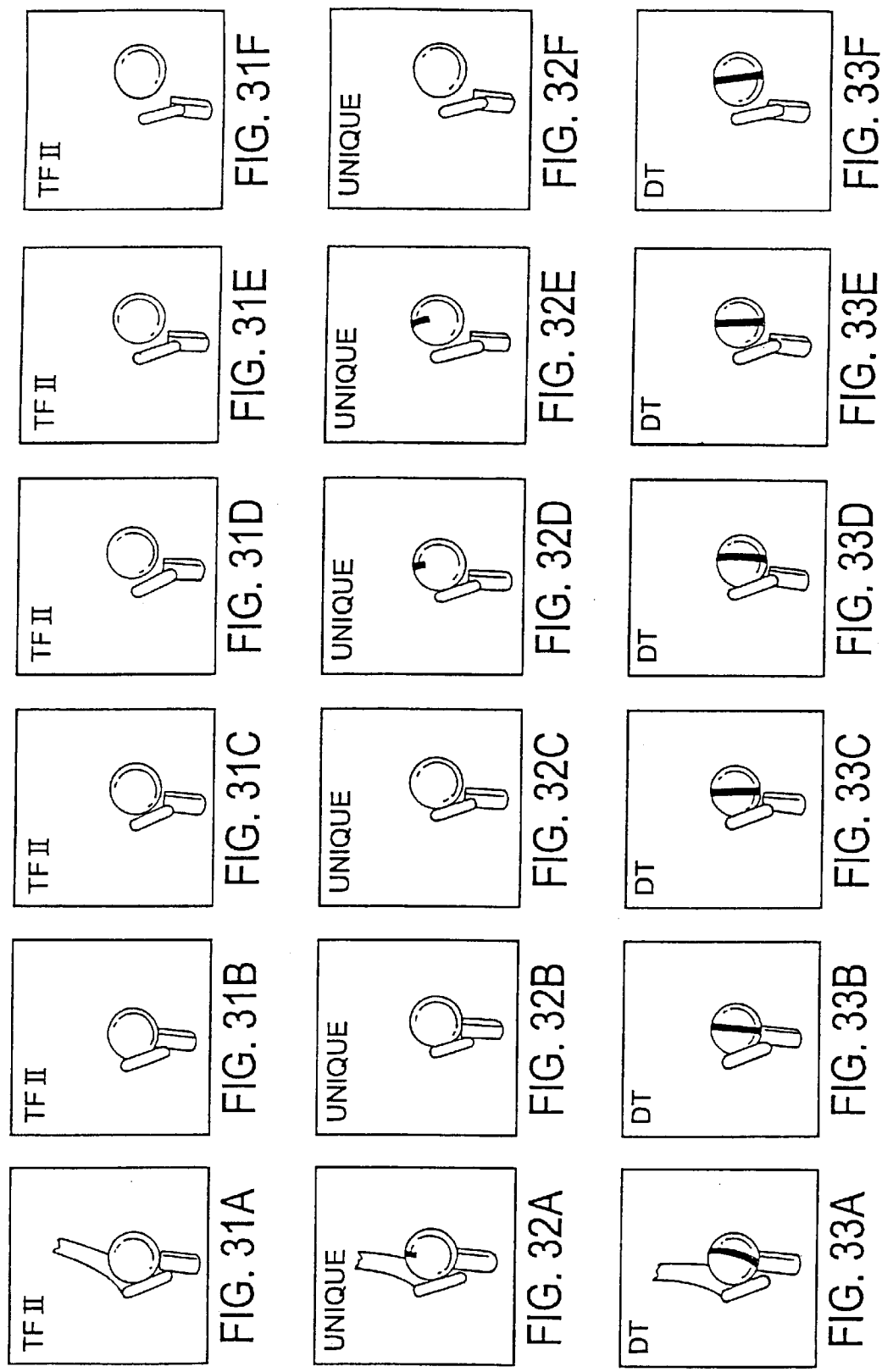

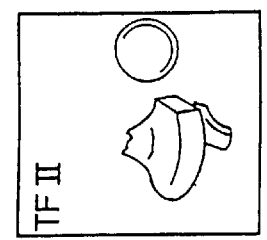
FIG. 37G
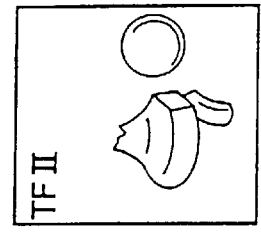
FIG. 37F
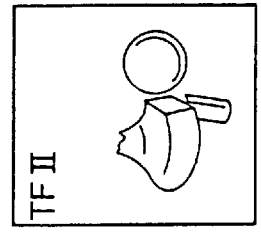
FIG. 37E
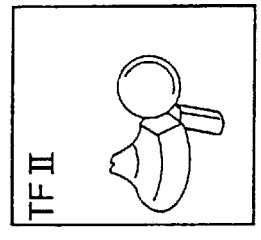
FIG. 37D
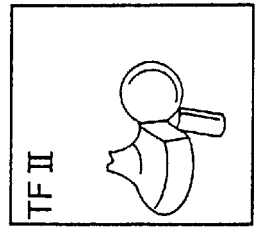
FIG. 37C
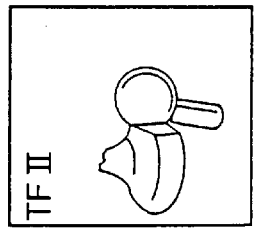
FIG. 37B
FIG. 37A
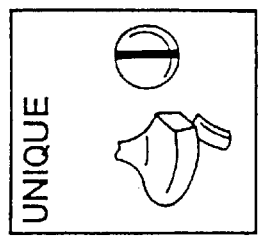
FIG. 38G
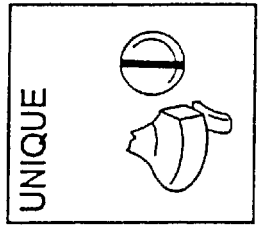
FIG. 38F
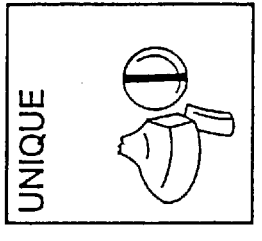
FIG. 38E
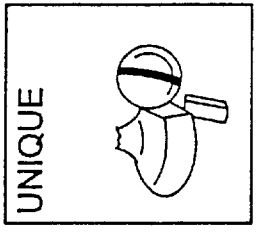
FIG. 38D
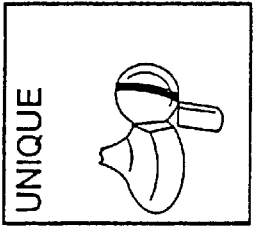
FIG. 38C
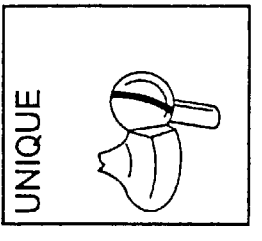
FIG. 38B
FIG. 38A
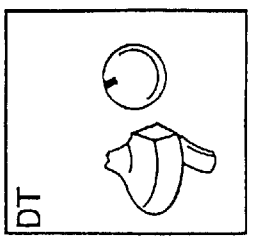
FIG. 39G
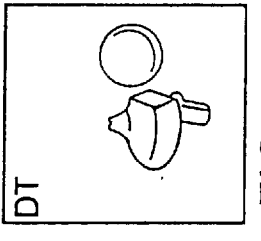
FIG. 39F
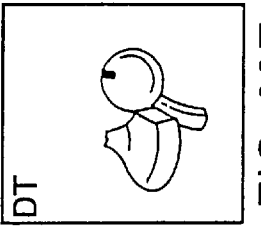
FIG. 39E
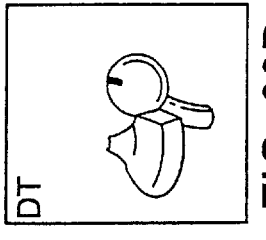
FIG. 39D
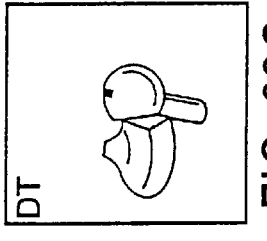
FIG. 39C
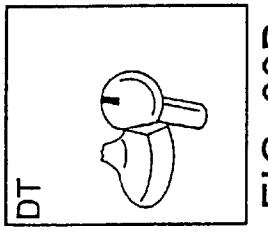
FIG. 39B
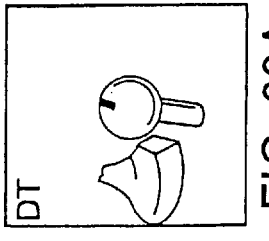
FIG. 39A

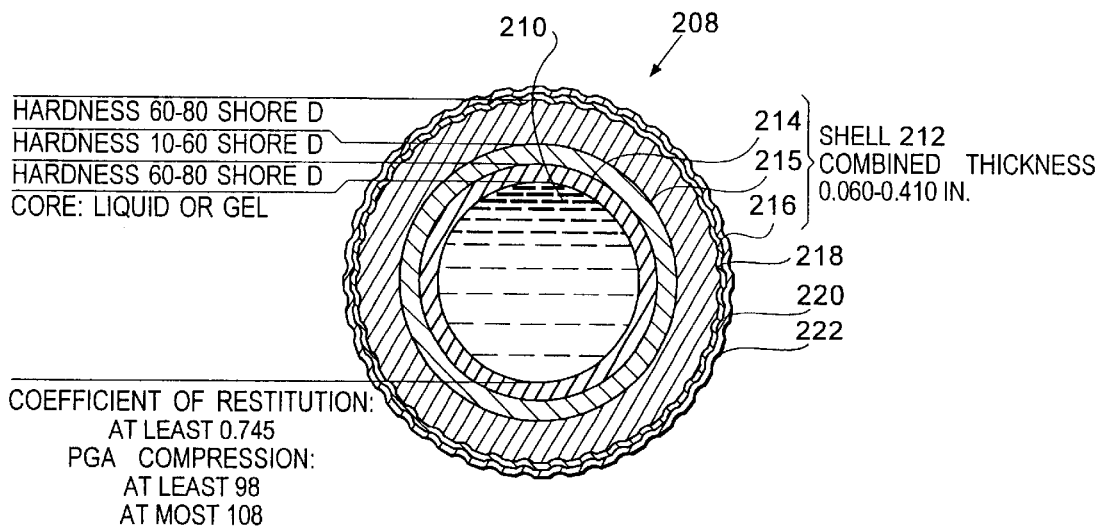
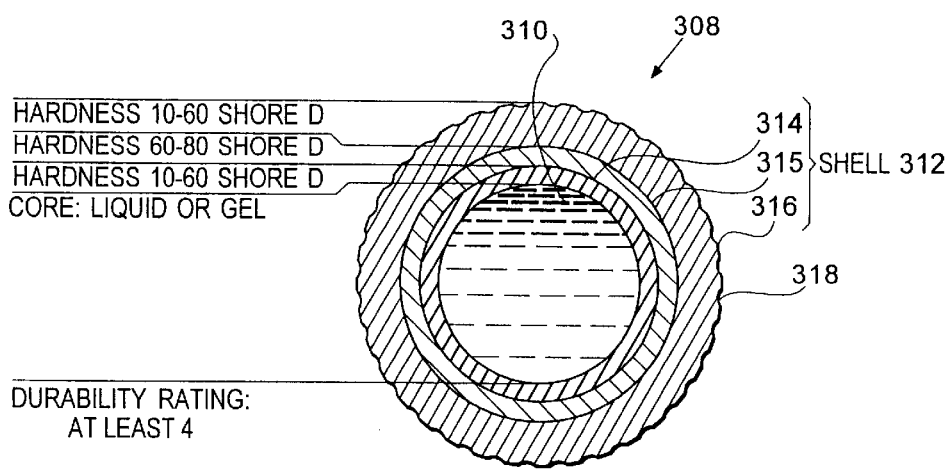

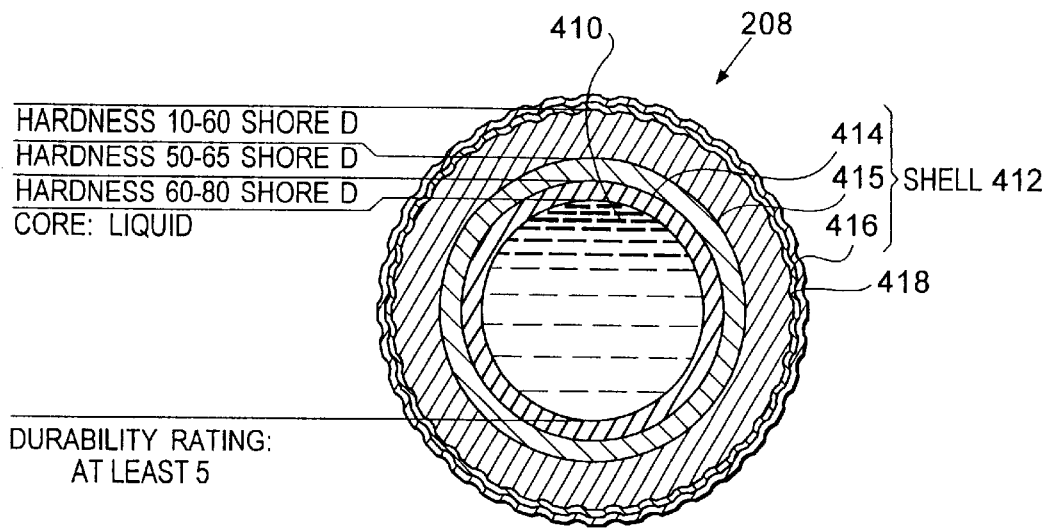
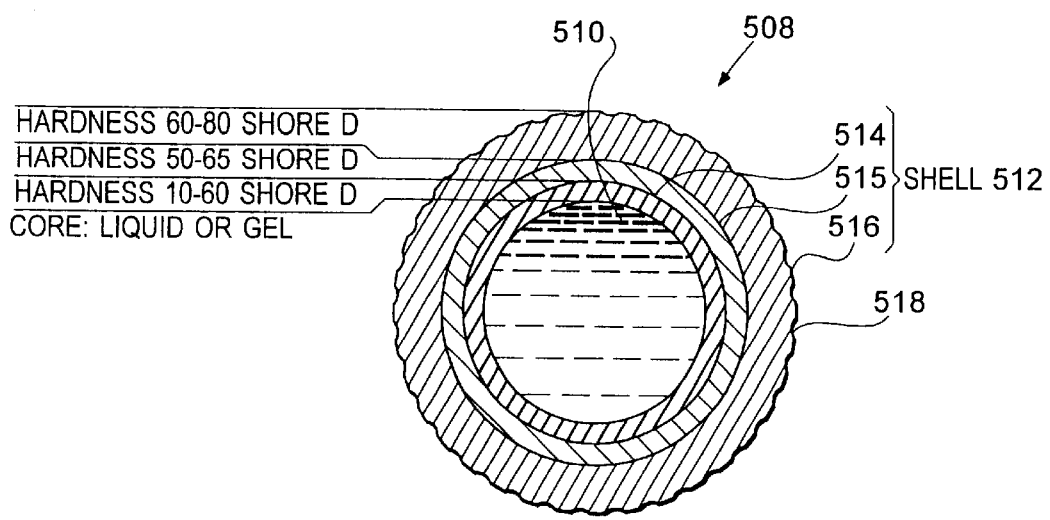

1

GOLF BALL WITH MULTIPLE SHELL LAYERS

RELATED APPLICATIONS

This is a continuation-in-part of U.S. application Ser. No. 08/959,952 filed Oct. 24, 1997, now abandoned which is continuation of U.S. application Ser. No. 08/839,740 filed Apr. 15, 1997, now abandoned which is a continuation of U.S. application Ser. No. 08/471,682 filed Jun. 6, 1995, now abandoned; which is a continuation of U.S. Ser. No. 08/162,215 filed Dec. 2, 1993, now U.S. Pat. No. 5,480,155, issued Jan. 2, 1996; which is a continuation-in-part of co-pending U.S. application Ser. No. 07/887,727, filed May 22, 1992, now abandoned; which in turn is a division of U.S. application Ser. No. 07/321,689, filed Mar. 10, 1989, now U.S. Pat. No. 5,150,906, issued Sep. 29, 1992. This application also is a continuation-in-part of U.S. application Ser. No. 08/495,062 filed Jun. 26, 1995 now U.S. Pat. No. 5,830,087, issued Nov. 3, 1998. This application claims the priority of and provisional U.S. application Ser. No. 60/042,119 filed Mar. 28, 1997.

FIELD OF THE INVENTION

The present invention generally relates to golf balls, and more particularly to a golf ball having a center formed from liquid or gel and a shell or cover which includes at least three layers.

BACKGROUND OF THE INVENTION

Golf balls traditionally have been categorized in three different groups, namely as one-piece, two-piece and three-piece balls. Conventional two-piece golf balls include a solid resilient core having a cover of a different type of material molded thereon. Three-piece golf balls traditionally have included a liquid or solid center, elastomeric winding around the center, and a molded cover. Solid cores of both two and three-piece balls often are made of polybutadiene and the molded covers generally are made of natural balata, synthetic balata, or ionomeric resins.

Ionomeric resins are polymers containing interchain ionic bonding. As a result of their toughness, durability and flight characteristics, various ionomeric resins sold by E.I. DuPont de Nemours & Company under the trademark "Surlyn®" and by the Exxon Corporation (see U.S. Pat. No. 4,911,451) under the trademark "Escor®" and the trade name "Iotek", have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally neutralized copolymers of an olefin, such as ethylene, and an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, i.e., durability, etc., for golf ball cover construction over balata.

While there are currently more than fifty (50) commercial grades of ionomers available from Exxon and DuPont, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting the desired combination of playability properties.

Golf balls are typically described in terms of their size, weight, composition, dimple pattern, compression, hardness, durability, spin rate, and coefficient of restitution (COR). One way to measure the COR of a golf ball is to propel the ball at a given speed against a hard massive surface, and to measure its incoming and outgoing velocity. The COR is the ratio of the outgoing velocity to the incoming velocity and is expressed as a decimal between zero and one.

There is no United States Golf Association limit on the COR of a golf ball but the initial velocity of the golf ball must not exceed 255 ft/second. As a result, the industry goal for initial velocity is 255 ft/second, and the industry strives to maximize the COR without violating this limit. Having the longest ball—compatible with the U.S.G.A. requirements—has been and also remains another, long-standing objective of golf ball manufacturers. In this respect, prior balata and polymeric covered balls, and certainly those intended for U.S.G.A. regulation play, have shared one thing in common. They have all relied on their preformed cores as the primary vehicle for transferring energy from the golf club to the ball when the ball is struck by the club. For years, the principal thrust of golf ball research and development has been directed to making improved preformed cores for enhancing distance performance. In other words, conventional wisdom among golf ball manufacturers has been that enhanced distance performance is primarily achievable through the use of better energy transferring cores.

This is not to say that some did not recognize that the cover composition could contribute to the ball's distance performance. U.S. Pat. No. 3,819,768, which issued in the name of Robert P. Molitor (one of the named inventors herein) and which disclosed the use of mixed SURLYN® resins as a ball cover material, recognized that the use of a mixed SURLYN® cover could and did increase the distance the ball could be driven. Nevertheless, the cores of the balls manufactured under U.S. Pat. No. 3,819,789 still were preformed and were believed to be a significant contributor to energy transfer. The coefficient of restitution of these cores was approximately 0.750 and the final ball was approximately 0.780.

The approach of utilizing preformed cores as the principal "mechanism" for transferring energy has recognized disadvantages. The cost of manufacturing such preformed cores is a relatively large part of the cost of manufacturing the golf balls. Because of the relative complex technology and operations involved, the use of such preformed cores have also imposed added quality assurance problems and costs.

In summary, those working in the golf ball art have long sought to develop a golf ball that: has the "feel" and controllability of a balata covered three-piece ball; has a high initial velocity or initial coefficient of restitution, has a good "cut resistance" and durable cover; may be driven long distances in regulation play, hopefully by "average" golfers; and, importantly, may be uniformly and inexpensively manufactured by mass production techniques. As noted, to a large extent, the industry has sought to achieve this long recognized and desired objective by using a polymer or balata cover over a preformed core and by enhancing the ball's preformed core's capacity for transferring energy when the ball is struck by a golf club.

A number of patents have issued which disclose golf balls having multi-layer cores or covers. U.S. Pat. Nos. 4,431,193 and 4,919,434 disclose golf balls with multi-layer covers. U.S. Pat. No. 4,431,193 discloses a multi-layer ball with a hard inner cover layer and a soft outer cover layer. U.S. Pat. No. 4,919,434 discloses a golf ball with a 0.4–2.2 mm thick cover made from two thermoplastic cover layers. U.S. Pat. No. 5,273,286 discloses a golf ball with a multi-layer core. The golf ball disclosed therein has an inner core, a shell surrounding the inner core, an outer core, and a cover.

SUMMARY OF THE INVENTION

The present invention is truly a unique breakthrough in the construction and manufacture of multi-piece golf balls intended for regulation play under U.S.G.A. requirements. Multi-piece golf balls, according to the present invention, represent a completely novel approach as to how a commercially viable golf ball should be constructed and manufactured.

More specifically, the approach of the present invention is directly contrary to the longstanding, prevailing industry thinking. A preformed spherical shell, rather than a preformed core, is the starting point for the golf ball, and the materials selected for the spherical shell may provide a substantially all of the energy transfer contribution to the performance of the golf ball. In other words, the unique golf ball of the present invention (hereinafter sometimes the "Unique ball") relies primarily on the shell composition for transferring energy from the golf club to the ball when the ball is struck, and its core need not contribute anything to this energy transfer. Rather, the core's principal contribution is to give the ball the weight desired or needed to conform to U.S.G.A. rules.

The golf ball of the present invention not only has a unique construction but also enjoys significant advantages over conventional multi-piece balls. With respect to three-piece balls, the golf ball of the present invention has all the advantages that a conventional two-piece ball affords. With respect to two-piece balls, the Unique ball enjoys the following advantages:

(1) The Unique ball distorts more and remains longer on the face of a golf club in a manner similar to balata covered, thread wound three-piece balls. This provides a "feel" and controllability very compatible to balata covered balls.

(2) The Unique ball has a significantly lower trajectory with long distance golf clubs (e.g. drivers) than conventional two-piece or three-piece balls made today. Skilled golfers, based on their choice of clubs and how the club head approaches the ball, can also easily and readily modify the trajectory of the present ball.

(3) The Unique ball can be driven farther (carry plus roll) than conventional two-piece and three-piece balls. Initial testing has shown that as the loft angle of long distance clubs increases, this increase in distance becomes more and more noticeable and that the roll of this Unique ball may approach twice that of a conventional two-piece ball. For instance, initial testing has also indicated that a golf ball, made in accordance with the present invention and having a coefficient of restitution of 0.745 to 0.765, may be driven farther than a conventional two-piece ball having a coefficient of restitution of 0.815. It is believed that less energy is lost because of the deformation and restoration of the Unique ball when it is struck by a club. Striking the ball deforms the cover and also the pre-formed core. This core deformation uses or wastes energy that does not occur with the Unique ball when using a liquid core. Further in the case of the Unique ball, the liquid core need not be put into rotation as is necessary in the case of conventional golf balls, thereby further conserving energy. Additionally, because of the lower trajectory of the ball, the ball will land at a more acute angle to the ground and this, too, lessens the energy expended on landing. Further, it is believed that some increase in distance is due to the lower spin rate of the Unique golf ball in flight, resulting in a significant increase in roll.

(4) The Unique ball's increase in driving distance is surprisingly more noticeable with golfers who swing their club heads at speeds of 145 feet per second (f.p.s.) or below (that is, "average" or below average golfers). This will make the Unique ball especially attractive, from a commercial standpoint, since most golfers fall into these categories. In addition, the better golfers will not be penalized.

(5) The Unique balls will be less expensive to manufacture. An obvious cost savings will occur because of the elimination of the cost of manufacturing relatively expensive preformed cores. Other savings will arise in the quality assurance area. For example, a greater tolerance in the degree of non-uniformity in the thickness of the walls of the spherical shell will be permitted due to the fact that the specific gravity of the shell walls will be significantly lower than the specific gravity of the core. Thus, the heavier core will compensate for non-uniformity and permit shell wall thickness tolerances of ±0.010, which tolerances are readily obtainable, for example, using conventional blow molding techniques.

The present invention may, as noted, be embodied in golf balls that conform to the initial velocity requirements of the U.S.G.A. and that may, in regulation play, be driven long distances, in terms of carry and roll. Such balls include those disclosed in U.S. Pat. No. 5,273,287 and U.S. Pat. No. 5,482,286.

The present invention also encompasses a number of methods of manufacturing or fabricating the Unique golf ball. One such method includes the steps of blow molding a hollow spherical shell or center from a parison of formable polymeric material, and filling the center of the shell with a core material which is a liquid (or at the time of the filling, can be handled as a liquid). Another method includes the steps of forming a hollow spherical shell from two hemispherical molded halves and introducing the liquid core material into the shell or center. In the latter golf ball manufacturing or fabrication method, the two hemispherical molded halves may be coupled together by a process selected from a group comprising spin welding, sonic welding, solvent welding, compression molding and adhesive bonding. The latter manufacturing or fabrication method also includes the introduction of the core material into the shell through a predrilled or preformed hole or holes and then plugging the hole or holes after the introduction of the core material.

In the contemplated methods, the exterior surface of the shell may constitute the outer surface of the ball's cover and conventional dimples may be formed thereon. Alternatively and preferably, another layer of cover material may be bonded to the outer surface of the shell and this outer layer functions as the ball's cover. (In this latter situation, the shell may also be referred to as a "center", but the term "shell" (as used herein and unless otherwise indicated) is generic to both situations-this is, where the shell serves as the outer part of the ball or where an additional overlayer is used as the outer cover of the ball.)

In the practice of these methods, the core material forms a homogeneous core that substantially fills the shell. The structural characteristics of the shell and core, made according to the contemplated methods, are such that the resulting golf ball has a high coefficient of restitution, conforms to the initial velocity requirements of the U.S.G.A., and may be driven long distances in regulation play.

Accordingly, it is a primary object of the present invention to provide unique golf balls and methods of manufacturing such golf balls that overcome the inadequacies of the prior golf balls and that represent significant contributions to the golf ball art.

Another object of the invention is to provide a unique golf ball where the ball has a high coefficient of restitution, conforms to the initial velocity requirements of the U.S.G.A. and may, in regulation play, be driven long distances, in terms of carry and roll, as a result of being struck by a golf club; where the ball comprises a spherical shell and a core material that substantially fills the spherical shell; and where the spherical shell transmits substantially all of the energy from the golf club to the ball when the golf ball is struck by the club. A related object of the present invention is to provide a unique golf ball, of the type described, where the core material contributes to the overall weight of the golf ball, but contributes substantially nothing to the transfer of energy when the golf ball is struck by the golf club.

Still another object of the present invention is to provide a uniquely constructed golf ball, of the type described, having a hollow, spherical shell of a deformable polymeric material and a unitary core of a material, which at the time of introduction into the shell, is a liquid or can be handled as a liquid and which forms a substantially homogeneous core substantially filling the hollow spherical shell; and where the outer surface of the shell preferably includes an outer, spherical layer of polymeric material which serves as the outer cover of the golf ball and which may or may not be the same as that used for the rest of the shell. A related object of the present invention is to provide such a golf ball where the thickness of the shell material is between about 0.060 inches and about 0.410 inches; where the shell is formed from a polymeric material selected from the group consisting of polyurethane resins, polyolefin resins or preferably ionic copolymers; where the core material is a member selected from a group consisting of a gel, a melt or preferably, a liquid; and where the polymeric material of the shell may be cellular and/or may comprise multiple layers.

Yet another object of the present invention is to make or fabricate a golf ball by preforming a hollow preformed shell in the configuration of a sphere from a deformable polymeric material and by introducing into a shell a liquid core material which forms a homogenous core and which substantially fills the shell. A related object of the present invention is to preform the shell either by bonding together two hemispherical molded halves or preferably, by use of blow molding techniques. A further related object of the present invention is to reduce the cost of manufacturing multi-piece golf balls by injecting liquid core material into a preformed or forming spherical shell. A still further related object of this invention is to form a separate cover over and around the spherical shell containing the core material.

It is still another object of the present invention to maintain or improve the performance of golf balls which have novel designs and which allow for the reduction in the cost of materials and simplification of the manufacturing steps by utilizing a preformed shell, rather than a preform core, as a starting point for the manufacture of the golf ball.

A preferred form of the invention is a golf ball comprising a spherical shell which includes an inner first layer, a second layer and a third layer, the second layer being sandwiched between the first layer and the third layer, and a core which substantially fills the spherical shell, the core comprising at least one of a liquid and a gel. The convex outer surface of the third cover layer preferably is dimpled, while the convex outer surfaces of the first and second cover layers preferably are generally smooth. Each layer of the shell preferably has a thickness of at least 0.020 inches. The golf ball preferably further comprises a top coat layer formed over the spherical shell. The golf ball preferably also comprises a primer coat layer formed between the spherical shell and the top coat.

In a particularly preferred form of the invention, the density of the second layer is less than the density of the first layer and/or the third layer. Each layer of the shell preferably has a different Shore D hardness than any adjacent shell layer. The difference in Shore D hardness of each layer and any adjacent layer preferably is at least three points and more preferably is at least five points. Each layer of the shell preferably is formed from at least one member selected from the group consisting of ionomers, vinyl resins, polyolefins, including metallocene catalyzed polyolefins, polyurethanes, polyamides, acrylic resins, blends of acrylic resins with polyvinyl chloride, blends of acrylic resins with elastomers, thermoplastic rubbers, polyphenylene oxide resins, blends of polyphenylene oxide with high impact polystyrene, thermoplastic polyesters, blends of polycarbonate with acrylonitrile butadiene styrene, polybutylene terephthalate, styrene maleic anhydride, polyethylene elastomers, blends of polyvinyl chloride with acrylonitrile butadiene styrene or ethylene vinyl acetate, and blends of thermoplastic rubbers with polyethylene, polypropylene, polyacetal, nylon, polyesters, or cellulose esters. The third layer of the shell preferably comprises ionomer.

In one preferred form of the invention, each layer of the shell is thermoplastic. In another preferred form of the invention, each layer of the shell comprises ionomer. Each layer of the shell preferably has a different overall chemical composition. In another preferred form of the invention, the shell is formed from a polyethylene-containing material. The core is a non-wound core. While the shell preferably has three layers, it can have four or more layers. All of the layers can have generally the same Shore D hardness.

Another preferred form of the invention is a golf ball comprising a thermoplastic shell which includes a plurality of shell layers, and a non-wound core which comprises a liquid and which is positioned within the shell. The plurality of shell layers preferably includes an inner first layer, a second layer, and a third layer, the second layer being sandwiched between the first layer and third layer. The density of the second layer preferably is less than the density of the first layer and/or the third layer. The third layer of the shell preferably is ionomeric. In a more preferred embodiment of the invention, all of the layers are ionomeric. Each of the layers of the shell preferably has a thickness of at least 0.020 inches.

Yet another preferred form of the invention is a golf ball cover for use in forming a golf ball, the cover comprising a blow-molded thermoplastic shell which includes an inner first layer, a second layer, and a third layer, the second layer being sandwiched between the first layer and the third layer.

In a particularly preferred form of the invention, at least one of the first layer and the second layer of the shell is foamed. Furthermore, the outer layer can be foamed as long as molding does not result in unacceptable surface imperfections on the ball.

The invention accordingly comprises the several steps and the relation of one or more of such steps with respect to each of the others and the article possessing the features, properties, and the relation of elements exemplified in the following detailed disclosure.

BRIEF DESCRIPTION OF THE DRAWINGS

For a fuller understanding of the objects, advantages and features of the present invention, reference should be made to the following detailed description of the preferred embodiments, taken in conjunction with the accompanying drawings in which:

FIG. 7 is a sectional view of two hemispherical shell halves loaded in opposed fixtures of a spin welding machine prior to being coupled together to a,form a spherical shell;

FIGS. 8, 9 and 10 are fragmentary views of alternate ways molded shell halves can be formed and also show parts of the fixtures used to join such molded halves;

FIGS. 25A through 25E, 26A through 26E, 27A through 27E, 28A through 28E, 29A through 29E, and 30A through 30E illustrate steps utilized in the manufacture or fabrication of the various embodiments of the present invention, with each of FIGS. 25E, 26E, 27E, 29E and 30E being an elevational view showing a golf ball made in accordance with the process illustrated in FIGS. 25A through 25D, 26A through 26D, 27A through 27D, 28A through 28D, 29A through 29D, and 30A through 30D, respectively; and FIGS. 31A through 31F, 32A through 32F, and 33A through 33F, 34A through 34F, 35A through 35F, 36A through 36E, 37A through 37G, 38A through 38G, and 39A through 39G illustrate the performance of golf balls fabricated in accordance with the principles of the present invention in comparison with the performance of conventional golf balls.

FIGS. 40–47 show sectional views of embodiments according to the invention having inner, intermediate and outer shell layers with various combinations of hardness.

DETAILED DESCRIPTION OF THE INVENTION

An Overview

Figure 1:
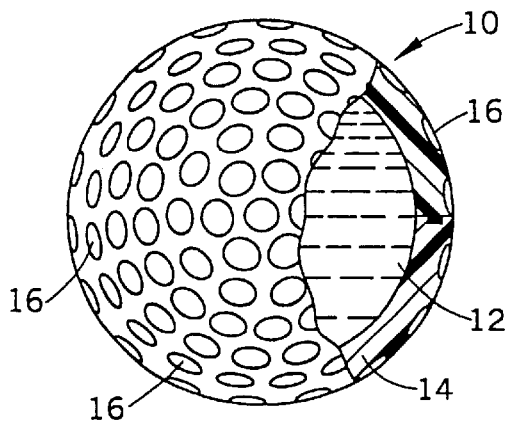
FIG. 1 is an elevational view, partly in section, showing a first embodiment of a golf ball in accordance with the principles of the present invention.

In golf balls of the present invention, the shell is initially preformed in the shape of a hollow sphere. As described below, preferably the shell is made from a synthetic polymeric material(s) and a variety of different manufacturing or fabricating methods may be utilized to preform the hollow spherical shell. The wall of the shell may be either solid or cellular.

After or while the shell is being formed, core material is introduced into the interior of the shell. Preferably the core material is a liquid or a unitary, noncellular material which at the time of its introduction into the shell may be handled as a liquid. As noted below, the core material may, in some embodiments, be introduced into the shell through a hole or holes in the shell or while the shell is being blow molded.

After its introduction, the core material forms a homogeneous core which substantially fills and conforms to the inter surface of the shell. In this latter regard, filling the shell, except for a $\frac{1}{16}$–$\frac{1}{8}$ inch diameter "air" bubble in a conventional sized golf ball, constitutes substantially filling the shell since an "air" bubble should not materially detract from or adversely affect the intended performance of the golf ball.

As also discussed below, a variety of materials, it is believed, may be used to make the shell and the core. What is important concerning the selection of the shell and core materials is that the shell is the principal transferring energy component of the golf ball, that is, for transferring energy from the golf club to the golf ball when the ball is struck by the club. The core need not contribute anything to this transfer of energy. Its primary function is to give the ball the weight desired and have the ball conform to the U.S.G.A. specifications. This does not mean, however, that the core could not be "tailored" to give the ball a particularly desired or better distortion characteristics on the club face, or in certain instances, could not be made to somewhat change the ball's performance characteristics. For example, a material might be added to the core to increase the pressure within the shell or material-such as a suspension or solution, with free floating particles—could be added to the liquid core material to absorb some energy. The liquid core is also believed to contribute unique spin properties that cannot be achieved with a solid core, namely low initial spin rates and higher terminal spin than a comparable solid core ball.

As noted, the shell material provides most or all of the energy transfer or resilience necessary for the proper distance performance of the golf ball of the present invention. It will, however, be understood by those skilled in the art that the properties of the shell material and the thickness of the shell are interrelated. These two variables must be tuned to optimize performance.

The golf ball according to one preferred embodiment of the invention has a shell which includes at least three layers. Each shell layer can be formed from a thermoplastic or thermoset material. The inner shell layer preferably is formed from a thermoplastic material. The intermediate shell layer also preferably is formed from a thermoplastic material. The outer shell layer preferably is formed from a thermoplastic material and more preferably is ionomeric.

In a first embodiment of the invention, the inner and outer shell layers are hard and the intermediate shell layer is softer than the inner and outer shell layers. This type of construction results in a golf ball having relatively low spin rates for good distance and accuracy, and a relatively soft feel, the soft intermediate layer providing added flexibility to an otherwise very rigid cover. In a second embodiment, the inner and outer shell layers are soft and the intermediate shell layer is harder than the inner and outer shell layers. This type of golf ball is useful when high spin on short iron shots, but lower spin on tee shots is desired. This construction also gives the softest compression for a very soft feel. In a third embodiment, the inner shell layer is hard, the outer shell layer is soft, and the intermediate shell layer has an intermediate hardness. This construction is useful to form a golf ball having very high spin rates maximizing the ability of a golfer to stop a ball precisely, minimizing roll. In a fourth embodiment, the inner shell layer is soft, the outer shell layer is hard, and the intermediate shell layer has intermediate hardness. This embodiment is useful when a good balance of relatively low spin, yet soft feel is desirable.

Materials for the Shell

As noted, thermoplastic materials are generally preferred for use as materials for the shell. Typically, but not limiting of the properties desirable for the synthetic polymeric resins, are good flowability, moderate stiffness, high abrasion resistance, high tear strength, high resilience, and good mold release, among others. The shell layers each can contain 0.1–300 parts by weight, more preferably 20–200, and even more preferably 30–150 parts by weight of a filler based upon 100 parts by weight of resin composition. In this way, for example, a perimeter weighted ball can be formed. Suitable fillers are described below.

Preferred polymeric materials for uses in accordance with this invention are ionic copolymers. Such copolymers include those which are available under the trademark SURLYN from E.I. DuPont De Nemours & Company of Wilmington, Del. (copolymers of ethylene and methacrylic acid partially neutralized with zinc, sodium or lithium); and those which are available and under the trademarks IOTEK or ESCOR from Exxon Chemical Company, Houston, Tex., (copolymers of ethylene and acrylic acid partially neutralized with zinc or sodium).

In the preferred embodiments of this invention, the shell is formed from mixtures or blends of zinc ("Zn") and sodium ("Na") ionic copolymers. Other types of ionomers also can be used. Both "high acid" and "standard" IOTEK and SURLYN materials can be and have been used, for example, IOTEK 959 (Na) and IOTEK 960 (Zn) (50/50 weight/weight blend); IOTEK 8000 (Na) and IOTEK 7000 (Zn) (75/25 weight/weight blend); SURLYN 8940 (Na) and SURLYN 9910 (Zn) (50/50 weight/weight blend). Non-limiting examples of other suitable ionomers are shown below. [The blend ratios are flexible.

For example, a 90/10 to 10/90 blend or IOTEK 8000 and IOTEK 7000 is acceptable; the 75/25 blend noted above does give a good cost/performance balance.]

Combinations of standard SURLYN (Na/Zn) materials and high acid IOTEK (Na/Zn) materials, and vice versa, may also be used. Also where the shell is formed as center (e.g., with a diameter of about 1.50 inches) by blow molding, the shell walls could comprise a single material or layers of different materials, as explained below, and the material(s) could be standard or high acid SURLYN (NarZn) materials and/or the IOTEK materials. Similarly the intermediate and outer cover layers, which can be injection molded over this shell or center core, likewise can be made of standard or high acid SURLYN (Na/Zn) or IOTEK As noted above, those skilled in this art will recognize that the selection of the specific materials to be used will depend on the particular golf ball performance desired.

Ionic copolymers of the type suitable for use in this invention are further described in U.S. Pat. No. 3,819,789 issued Jun. 25, 1974, in U.S. Pat. No. 3,264,272 issued Aug. 2, 1966; U.S. Pat. No. 4,679,795 issued Jul. 14, 1987; and U.S. patent application Ser. No. 081723,285 filed Sep. 30, 1996, which is a continuation of U.S. patent application Ser. No. 08/264,997 filed Jun. 24, 1994, now abandoned, which in turn is a continuation of U.S. patent application Ser. No. 08/174,765 filed Dec. 27, 1993, now abandoned. Singular ionic copolymers can be used as shell materials in the subject invention. These singular materials are described in U.S. Pat. No. 3,454,280 issued Jul. 8, 1969. The present invention may likewise be used in conjunction with cellular polymeric golf ball shells as are described in U.S. Pat. No. 4,274,637 issued Jun. 23, 1981.

In accordance with the various embodiments of the present invention, the walls of the shells may have an overall thickness from about 0.060 inches to about 0.410 inches, preferably between about 0.075 inches and about 0.300 inches and even more preferred, between about 0.090 inches and about 0.190 inches. When the shell has three layers, each layer has a thickness of 0.02–0.20 inches, preferably 0.03–0.15 inches, and more preferably 0.03–0.10 inches. Standard golf ball covers in use today generally have a thickness of about 0.090 inches. The specific gravity of the shell, as described above, is between about 0.75 and about 1.25, more preferably 0.92–1.02, and most preferably 0.96–0.98.

Synthetic polymeric materials, other than those described above, which may be used in accordance with this invention as shell materials include homopolymeric and copolymer materials which may be adapted for use in this invention as follows: (1) Vinyl resins formed by the polymerization of vinyl chloride, or by the copolymerization of vinyl chloride with vinyl acetate, acrylic esters or vinylidene chloride; (2) Polyolefins such as polyethylene, polypropylene, polybutylene, and copolymers such as polyethylene methylacrylate, polyethylene ethylacrylate, polyethylene vinyl acetate, polyethylene mylic or polyethylene acrylic acid or polypropylene acrylic acid or terpolymers made from these and acrylate esters and their metal ionomers, metallocene catalyzed polyolefins, polypropylene/EPDM grafted with acrylic acid as sold under the trademark POLYBOND by Reichhold Chemicals, Inc., Hackettstown, N.J. 07840, or anhydride modified polyolefins as sold under the trademark "PLEXAR" by Northern Petrochemical Company, Rolling Meadows, Ill. 60008. (3) Polyurethanes, such as are prepared from polyols and diisocyanates or polyisocyanates, including reaction injection moldable polyurethanes, castable polyurethanes and injection moldable polyurethanes; (4) Polyamides such as poly (hexamethylene adipamide) and others prepared from diamines and dibasic acids, as well as those from amino acids such as poly (caprolactam), and blends of polyamides with ionomers, polyethylene, ethylene copolymers, EDPM, etc., (5) acrylic resins and blends of these resins with poly vinyl chloride, elastomers, etc.; (6) Thermoplastic elastomers such as urethanes, olefinic thermoplastic elastomers such as blends of polyolefins with EPDM, block copolymers of styrene and butadiene and functionalized versions such as KRATON FG, (Shell Chemical Co.), isoprene or ethylene-butylene rubber, thermoplastic block polyamides, including polyether block amides, an example of which is sold under the trademark PEBAX by Elf Atochem (Philadelphia, Pa.); (7) Polyphenylene oxide resins, or blends of polyphenylene oxide with high impact polystyrene as sold under the trademark NORYL by General Electric Company, Pittsfield, Mass.; (8) Thermoplastic polyesters, such as PET, PBT, PETG and elastomers sold under the trademark HYTREL by E.I. DuPont De Nemours & Company of Wilmington, Del. and the trademark LOMOD by General Electric Company of Pittsfield, Mass.; (9) Blends and alloys including polycarbonate with ABS, PBT, PET, SMA, PE elastomers, etc. and PVC with ABS or EVA or other elastomers; and (10) Blends of thermoplastic rubbers with polyethylene, polypropylene, polyacetal, nylon, polyesters, cellulose esters, etc. In the above description, shorthand symbols are used to describe certain polymers. The symbols used above and their descriptions are as follows:

ABS—Acrylonitrile butadiene styrene;
PBT—Polybutylene terephthalate;
PET—Polyethylene terephthalate;
SMA—Styrene maleic anhydride;
PE—Polyethylene;
PETG—Polyethylene terephthalatelglycol modified;
EPDM—Ethyl-propylene-non-conjugated diene terpolymer;
PVC—Polyvinyl chloride; and
EVA—Ethylene vinyl acetate.

Additionally, U.S. Pat. No. 5,688,869, issued Nov. 18, 1997 and U.S. patent application Ser. No. 081366,365, filed on Dec. 29,1994, respectively, also disclose ionomers usable as materials for shells. The above listing is not meant to be limiting or exhaustive, but merely illustrates the wide range of polymeric materials which may be used to form shells in the present invention. Mixtures of the abovedescribed materials may also be used. Further, the polymers used to form the outer shell, in accordance with the present invention, may be stress oriented subsequent to the formation of the shell. Likewise, in accordance with the present invention, the polymeric materials may be reinforced when utilized in the shell: In summary and as can be seen from the discussion above, the subject invention can be used in conjunction with a wide variety of polymeric materials which are suitable for the formation of shells.

It is also within the purview of this invention to add to the shell compositions of this invention materials which do not affect the basic novel characteristics of the composition of this invention. Among such materials are antioxidants, antistatic agents, and stabilizers.

The white basic color of the golf ball shell may be formed by the pigmentation of one of the above-mentioned polymeric materials. Suitable pigments for use in accordance with this invention include the following: titanium dioxide, zinc oxide, zinc sulfide and barium sulfate.

The amount of pigment used in conjunction with the polymeric shell composition naturally depends on the particular polymeric material utilized and the particular pigment utilized. The concentration of the pigment in the polymeric shell composition can be from about 1 percent to about 25 percent as based on the weight of the polymeric material. A more preferred range is from about 1 percent to about 5 percent as based on the weight of the polymeric material. The most preferred range is from about 1 percent to about 3 percent as based on the weight of the polymeric material. The percent pigment utilized is in large part determined by the weight needed to provide a golf ball with the preferred physical characteristic. It is understood by one skilled in the art that the percent of pigment added must be balanced with the weight of the core material in order to attain the desired density of the resulting golf ball.

Preferred shell compositions for use in accordance with this invention are the ionomers described above including SURLYN and IOTEK resins and they may be used in conjunction with fillers, pigments and other additives. The presently most preferred pigment for use in accordance with this invention, if one is to be used, is titanium dioxide. When this combination of components is utilized, it is preferred that the concentration of titanium dioxide in the shell composition be from about 1 percent to about 10 percent as based on the weight of SURLYN resin utilized. A more preferred range for the concentration of titanium dioxide is from about 1 percent to about 5 percent as based on the SURLYN resin utilized. A most preferred concentration for the titanium dioxide is about 2 percent as based on the weight of the SURLYN or IOTEK resin utilized.

The shell can be formed from multiple layers having different characteristics. For example, a dual layer shell can be formed by blow molding and can be covered with a dimpled cover layer formed by injection molding, compression molding, casting, vacuum forming, powder coating, etc. Furthermore, a single layer can be blow molded and covered with a two-layer cover formed by injection molding, compression molding, casting, vacuum forming, powder coating, etc. In one preferred embodiment, a blow molded core is filled with liquid and plugged, and then two or more layers are molded over the blow molded core.

As has been amply discussed above, the shell of the subject invention can utilize a wide variety of polymers. When pigmented, many of the polymers in question, and in particular SURLYN or IOTEK resins, may not be glossy after injection molding. Experience in the marketplace has demonstrated that the average golfer prefers a glossy golf ball. In order to produce glossy golf balls, the balls of this invention may be coated with a clear epoxy-urethane system subsequent to molding. The system can be, for example, a clear epoxy primer and/or water borne primer, followed by a clear urethane coat. Use of this clear coat system subsequent to the molding operation is not mandatory in order to achieve the desirable results of this invention; however, it is highly desirable. in addition to high initial gloss, the abovementioned system produces a golf ball which is durable and maintains its gloss during play. It will be understood by those skilled in the art that other clear coat systems can likewise be utilized. Further, it is understood by one skilled in the art that the golf balls of the invention can be painted with a pigmented paint in a conventional manner.

The Core

Figure 2:
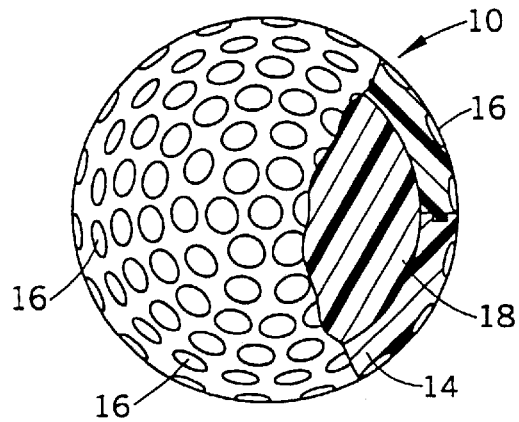
FIG. 2 is an elevational view, similar to that of FIG. 1, but illustrating an alternate core construction.
Figure 3:
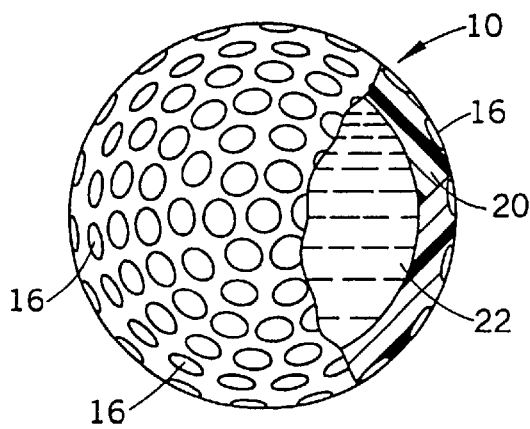
FIG. 3 is an elevational view, similar to FIG. 1, but showing an alternate, thin wall shell construction.
Figure 4:
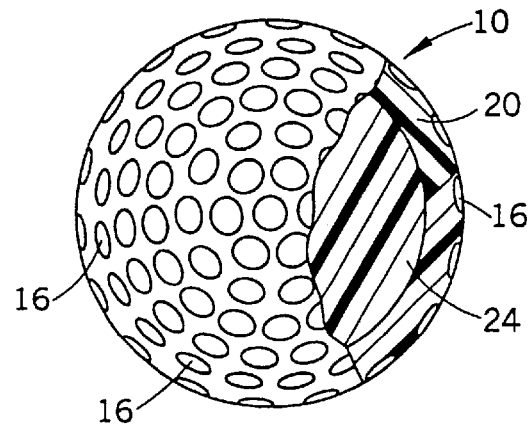
FIG. 4 is an elevational view, similar to that of FIG. 3, but illustrating another alternate core construction.

It should be appreciated that a wide variety of materials could be utilized for a core including gels, hot-melts, liquids, and other materials which at the time of their introduction into a shell, can be handled as a liquid. Examples of suitable gels include water gelatin gels, hydrogels, and water/methyl cellulose gels. Golf ball embodiments with a gel or other solid core are shown in FIGS. 2 and 4. Hot-melts are materials that are heated to become liquid and at or about normal room temperatures become solid. This property allows their easy injection into the shell to form the core. Examples of suitable liquids, as shown in FIGS. 1 and 3 include either solutions such as glycol/water, salt in water or oils or colloidal suspensions, such as clay, barytes, carbon black in water or other liquid, or salt in water/glycol mixtures.

The presently preferred materials are liquids. A preferred example of a suitable liquid core material is a solution of inorganic salt in water. The inorganic salt is preferably calcium chloride. Other liquids that have been successfully used are conventional hydraulic oils of the type sold at, for example, gasoline stations and that are normally used in motor vehicles.

The liquid material, which is inserted in the shell in accordance with this invention to form the core, may also be reactive liquid systems that combine to form a solid. Examples of suitable reactive liquids are silicate gels, agar gels, peroxide cured polyester resins, two-part epoxy resin systems and peroxide cured liquid polybutadiene rubber compositions. It will be understood by those skilled in the art that other reactive liquid systems can likewise be utilized depending on the physical properties of the shell and the physical properties desired in the resulting finished golf balls.

The core of all embodiments, whether remaining a liquid or ultimately becoming a solid, should be unitary, that is, of a substantially common material throughout its entire extent or cross-section, with its exterior surface in contact with substantially the entire interior surface of its shell. All cores are also essentially substantially homogenous throughout.

In the preferred embodiments, in order to provide a golf ball which has similar physical properties and functional characteristics to conventional golf balls, preferably the core material will have a specific gravity greater than that of the shell (and the outer cover when such a cover is molded over the shell). Specifically, the core material may have a specific gravity of between about 0.8 and about 3.9, preferably at about 1.32. The specific gravity of the core material may be selected so that the golf ball will float in water. Thus, it will be understood by those skilled in the art that the specific gravity of the core may be varied depending on the physical dimensions and density of the outer shell and the diameter of the finished golf ball. The core (that is, the inner diameter of the shell) may have a diameter of between about 0.860 inches and about 1.62 inches, more preferably 1.20–1.55 inches, and most preferably about 1.30 inches.

The Structure of the Golf Balls and Method of Manufacture

A golf ball 10 constructed in accordance with the principles of the present invention is shown in FIG. 1. The golf ball 10 maintains or improves the performance of presently known and utilized golf balls. It includes two major components: a core or internal portion 12; and a shell or external portion 14. The shell 14 is formed in a substantially hollow spherical configuration, and the core 12 is a liquid material. The exterior surface of the liquid core 12 is and remains in contact with the interior surface of the shell which has a generally spherical shape.

As shown in FIG. 1, the outer, exterior surface of the shell 14 may be formed with conventional dimples 16 to provide improved flight characteristics a and to create an appearance essentially identical with conventional, commercially available golf balls. The selection of the dimples and the dimple pattern is within the purview of those skilled in the golf ball art.

In the FIG. 2 embodiment, the core 18 is of a solid material rather than a liquid material as is the core 12 of the FIG. 1 ball. Preferably, however, this solid material is or can be handled as a liquid at the time this material is introduced into the shell. FIGS. 3 and 4 illustrate further, alternate embodiments of the invention shown in FIGS. 1 and 2, respectively, but where the thickness of the shell wall is thinner, that is, a thin wall shell 20 is shown with a liquid core 22 in the FIG. 3 embodiment, and a thin wall shell 20 with a solid core 24 is shown in the FIG. 4 embodiment.

With reference to FIGS. 5–10, and to one of the preferred methods of manufacture of the golf balls as described above, two hemispherically-shaped shell halves 28 and 30 are formed, preferably through injection molding, prior to being joined or coupled to form a completed spherical shell. Other techniques for forming the shell halves include conventional blow molding, injection blow molding and rotational casting.

Figure 5:
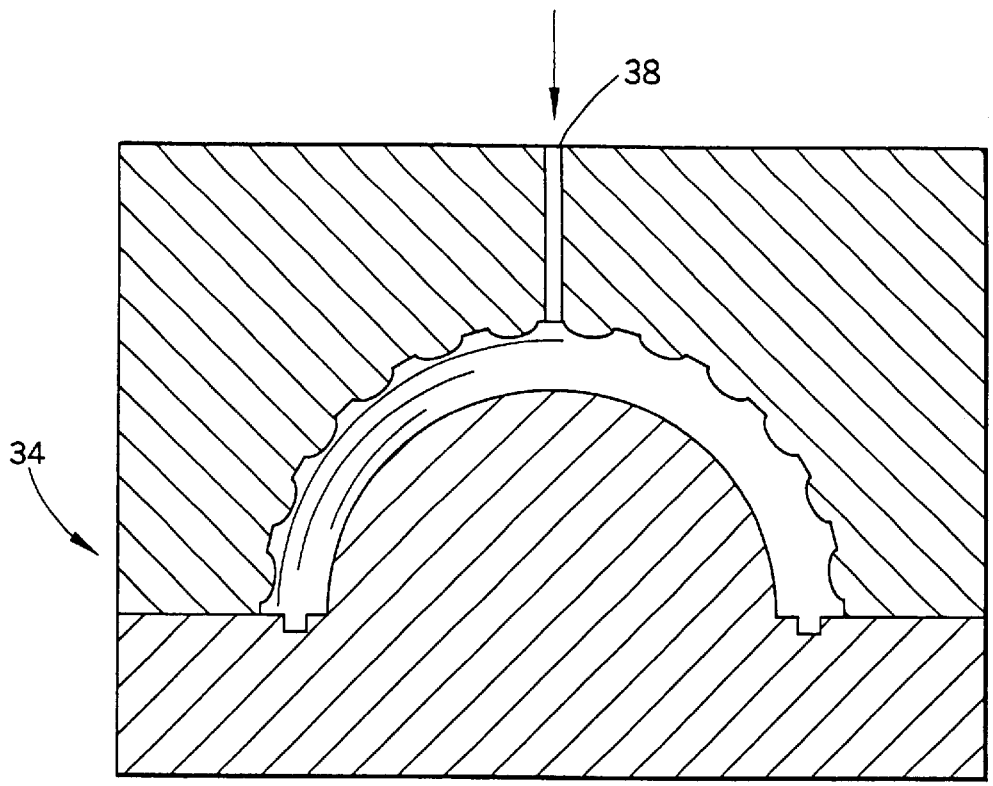
FIGS. 5 and 6 are sectional views of mold halves for forming the two mating, molded halves of a golf ball shell.
Figure 6:
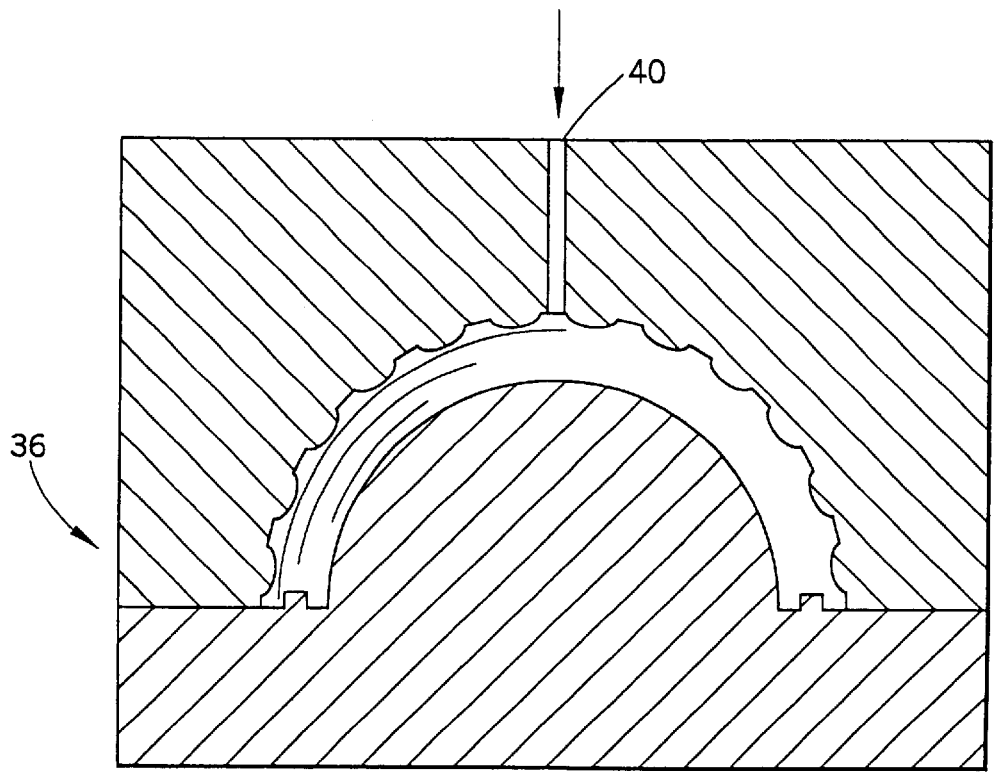
Figure 11:
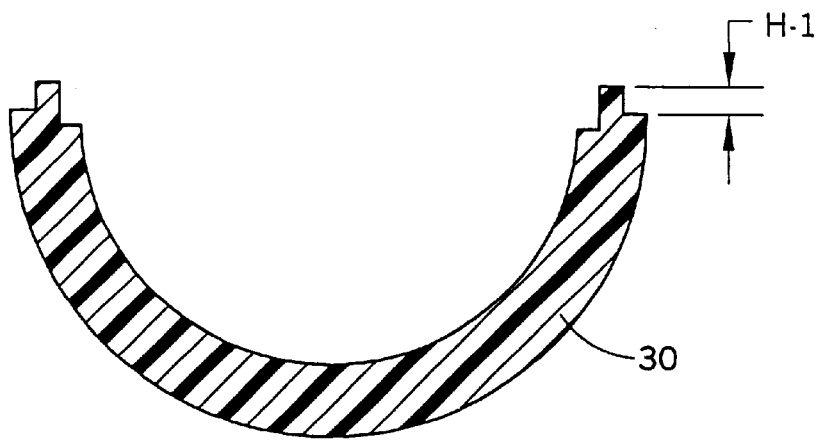
FIGS. 11 and 12 are sectional views of molded shell halves prior to being joined.
Figure 12:
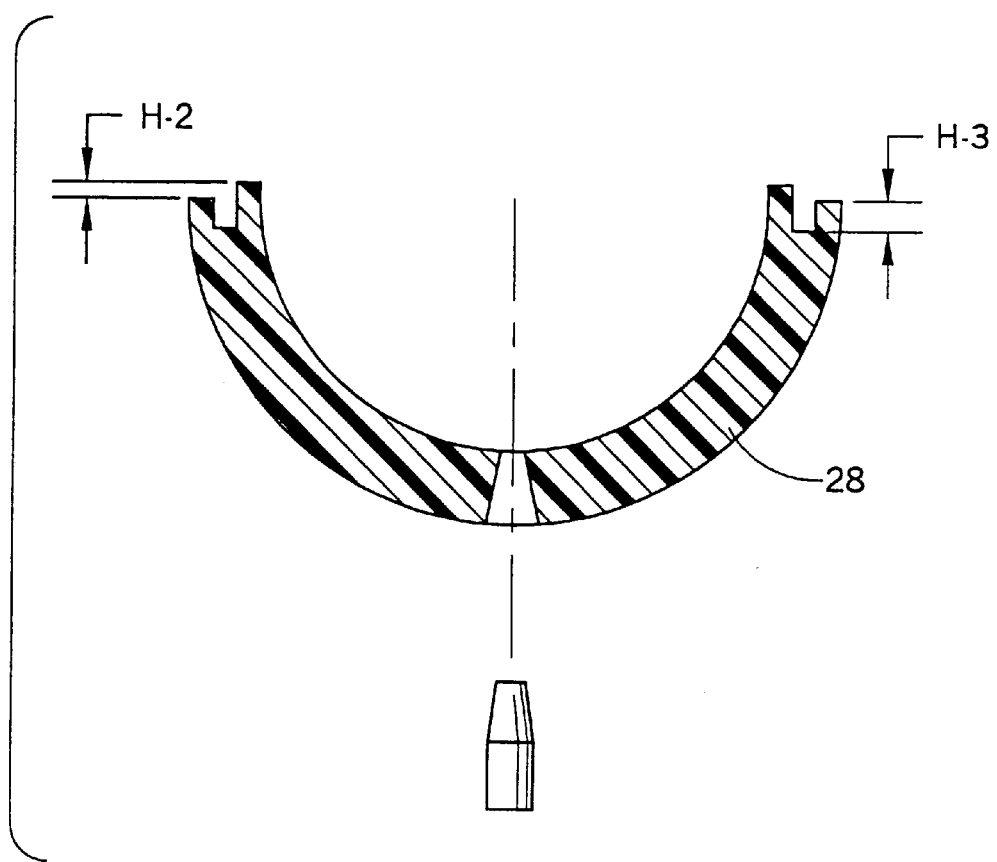
Figure 13:
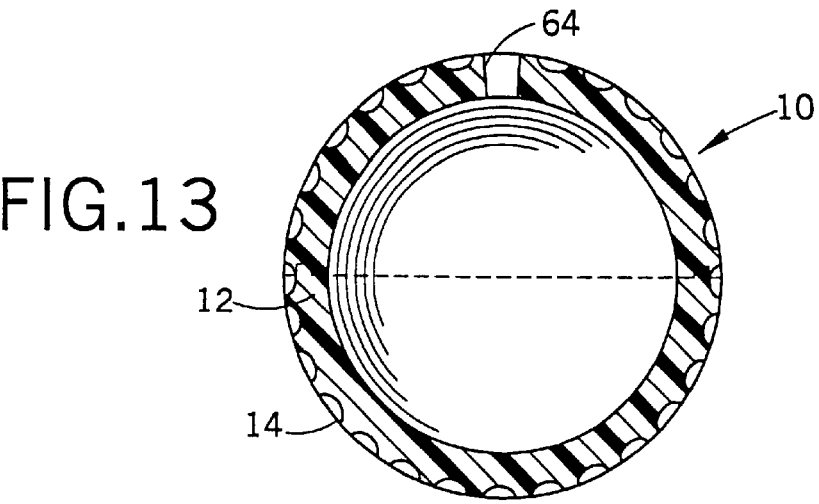
FIGS. 13, 14 and 15 are sectional views of a golf ball after the shell halves have been joined together and also illustrating the injection of liquid core material into the shell to fill the shell.
Figure 14:
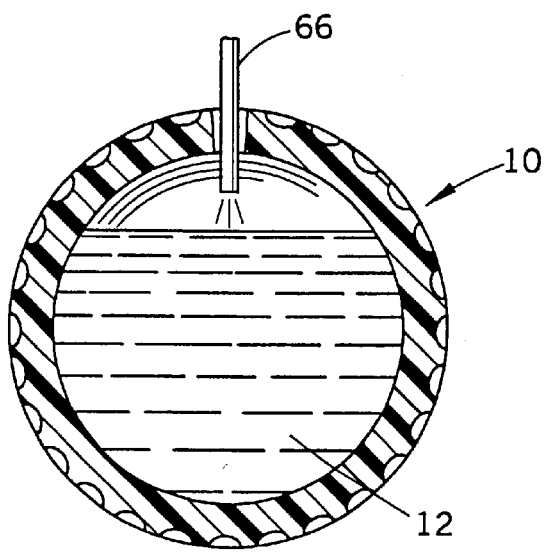

FIGS. 5 and 6 illustrate mold halves 34 and 36 that include holes 38 and 40 for the introduction of the material, in fluid form, from which the shell is to be formed. These mold halves 34 and 36 may be identical in shape except at their equator where they are joined and where they may or may not be identical. As illustrated in FIG. 8, the mold halves may be fully identical with flat, planar surfaces 42 and 44 at the equator of the ball, at the areas of joining illustrated in FIG. 8. A preferred alternative, however, would be to provide male and female tongue 46 and groove 48 surface configurations to assist in the proper placing of the halves with respect to each other. FIGS. 11 and 12 illustrate a tongue and groove arrangement with the tongue of a length H-1 slightly less than the length H-2 of the interior wall of the groove but slightly greater than the length H-3 of the exterior wall of the groove. FIGS. 1 and 2, as well as FIGS. 5, 6 and 7, also illustrate this alternative. Other configurations at the equator could also be utilized, such as mating undulations 50 and 52 of male and female segments across the thickness as shown in FIG. 9.

In the embodiment of the thin walled shells of FIGS. 3, 4 and 10 the parting line 54 and 56 may take the form of a cylinder around the periphery of the ball, with the parting line in an orientation at an angle to the equator of the ball. This forms a triangular projection in the lower shell half and a mating triangular recess in the upper half. Additional surface area is thus provided for bonding purposes. Further, during spin welding, centrifugal forces acting with the shell edges and tooling wall urge together the mating halves for superior joining or coupling.

The dimples 16 on the exterior surface of the shell halves may be formed during the injection molding of the halves. It should be appreciated, however, that in certain embodiments, the ball may be molded with a smooth exterior surface and the dimples molded in after the joining of the halves and either before or after the injection of the core and plugging of the hole. The temperature for such subsequent dimple molding must be sufficiently low so as not to be detrimental to the core.

The hemispherical halves may be joined together by any one of a wide variety of methods. A preferred method is the spin welding of the halves. This can be effected by fixedly supporting one of the halves 30 in a fixed fixture 60, shown as the lower half in FIG. 7, and supporting the other half 28, shown as the upper half, in a fixture 58 that is rapidly rotated about a vertical axis while moved axially toward the fixed half. Note the arrows included in FIG. 7. The frictional energy generated by the movement of one half with respect to the other, while being brought into contact, will generate sufficient heat to create a final cohesive bond between the melding and coalescing thermoplastic materials of the halves. The resulting structure is then a preformed, unitary hollow sphere that constitutes the shell of the ball.

Spin welding techniques are conventional as described, for example, in U.S. Pat. No. 2,956,611 to Jendrisak. A commercially available spin welding machine, acceptable for performing this method, is Model No. SPW-1-EC manufactured by Olsen Manufacturing Company of Royal Oak, Mich.

Other coupling techniques may, however, be readily utilized for joining the halves. Such other techniques include known methods such as ultrasonic welding, vibrational welding, laser welding, solvent welding, compression molding or even adhesive bonding with a suitable adhesive having properties matched to the properties of the shell halves.

Next in the manufacturing process for a preferred embodiment is the forming of the hole 64 in the shell 14 as for example, by drilling. The hole 64 could also be formed during molding. The hole is preferably tapered radially inwardly toward the center of the spherical shell 14 to facilitate its subsequent closure. It will be understood by those skilled in the art that two or more holes of the same or different sizes may be drilled or molded for the purposes associated with injecting the liquid material into the core 12 of the shell. Thereafter the core material may be injected through the hole 64 into the center of the shell, as through a hypodermic needle 66, or similar injection device, to substantially, totally fill the center of the shell for constituting the core 12.

A conical plug 68 may be used for plugging of the hole 64. The material of the plug 68 is preferably the same as that of the remainder of the shell 14. Trimming the cylindrical radial outwardly extending end of the plug 68 completes the fabrication method unless, of course, the dimples are to be applied following these manufacturing steps. The plug 68 may be secured in the hole to seal the shell through any of the above described fabrication techniques, although spin welding is presently preferred. In certain embodiments, the core material may itself be relied upon to seal the hole.

Figure 16:
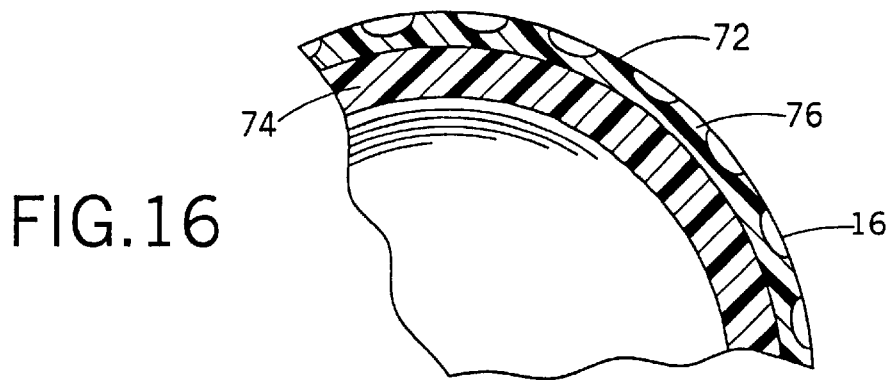
FIGS. 16, 17, 18 and 19 illustrate, in fragmentary sectional views, additional embodiments of shell construction where the shells are tailored to yield intended physical characteristics.

The shell 72, shown in FIG. 16, is formed from a first or inner layer 74 having radial thickness slightly less than the final golf ball. This shell layer 74 constitutes an internal layer of the final composite shell or laminate formed of plural shell layers. A final exterior shell layer 76 is applied to the exterior surface of the internal shell layer 74, preferably through conventional molding techniques, such as injection, compression, or rotational molding techniques. The exterior surface 76 of the shell is fabricated with dimples 16.

By fabricating the shell as a multi-layer laminate, the shell materials can be selected for tailoring the performance of the golf ball to a particular use or application. For example, properties, such as color, frictional bite, durability, and resistant to scuffs and cuts, may be built into the radial outer layer. The radial inner layer could simply provide desired resilience or energy transfer. In other words, the inner layer could be made of a polymeric material having a relatively high modulus of elasticity for increased life and resilience while the outer layer could be formed of a polymeric material providing a lower modulus of elasticity for greater frictional contact with the face or ball striking surface of the golf club so as to achieve greater bite, playability and control. "Brightness" could be added to the outer layer only for minimizing the utilization of such relatively expensive, conventional brightening agents. Similarly, to minimize costs, a relatively inexpensive polymeric material, for example, a polyethylene, could be used for the inner layer while a presently more expensive IOTEK material could be used for the outer layer.

The shell 72 and its core may be manufactured or fabricated by any one of the techniques as described above. Specifically, the shell 72, which, as noted, is formed of a plurality of bonded layers, could also be manufactured in a conventional shuttle method. In this method, the inner molded layer is first injected into the mold to form the inner layer. Thereafter, or vice versa, the outer layer, of a different material than the inner layer, is injected over the first, inner layer. This may be effected through consecutive shootings into a common mold over a mold component in the fabrication of layered shell halves. This molding technique is common in the molding of typewriter keys wherein the different injected materials form the visible (contrasting colored) lettering on the keys.

Figure 17:
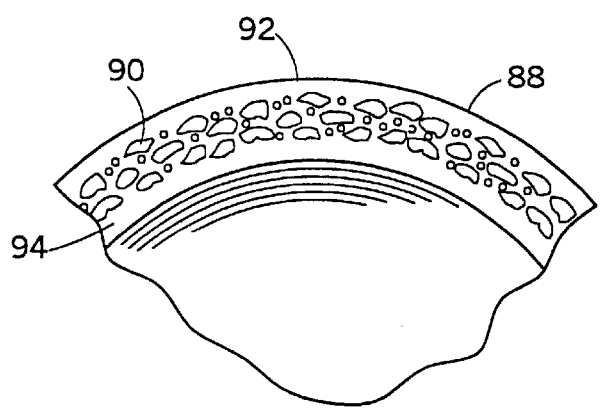
Figure 18:
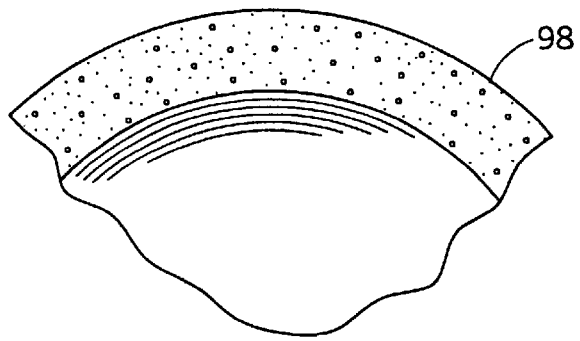
Figure 19:
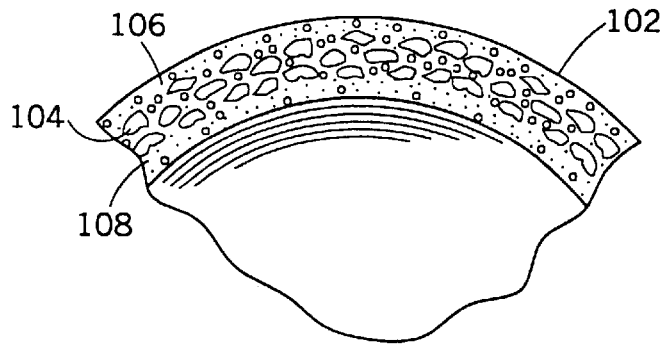

FIGS. 17, 18 and 19 illustrate three other alternative embodiments of a shell for the subject invention where the shell properties may be tailored to a particular application or use. These three shell embodiments, illustrated in FIGS. 17, 18, and 19, as well as in FIG. 16, may be made by fabricating a hollow shell or by joining hemispherical molded halves.

FIG. 17 illustrates a shell 88 having a central cellular stratum or layer 90 sandwiched between two non-cellular skins or layers 92 and 94. These non-cellular skins 92 and 94 may be formed in situ by varying the process parameters wherein the shell 88 is molded. Skins 92 and 94 may be altered and formed by a plurality of techniques. For example, the skins 92 and 94 may be formed by varying the temperature of the mold during the initial stages of the injection molding process and by varying other parameters, such as melt temperatures, injection time, injection speed, injection pressure, nozzle type, gating venting, holding pressure, holding time, shot weight, blowing agent concentration, nucleator concentration, polymeric composition, mold surface treatment and mold lubricant. U.S. Pat. No. 4,274,637 to Robert P. Molitor includes further details.

FIG. 18 illustrates a shell 98 having an essentially uniform cellular structure. In this embodiment, the shell 98 is shown molded over a hemispherical mold half.

FIG. 19 illustrates still another shell 102 which has a central stratum or layer 104 sandwiched between a pair of strata or layers 106 and 108. The central stratum 104 has a density which is less than that of the strata 106 and 108. To put it in other words, the strata 106 and 108 have a greater density than that of the central stratum 104. Naturally, those skilled in the art will recognize that in the region of the interfaces between the stratum, the density will vary. The respective densities of the strata can be varied by those skilled in the art by altering the process parameters as discussed above.

Figure 20:
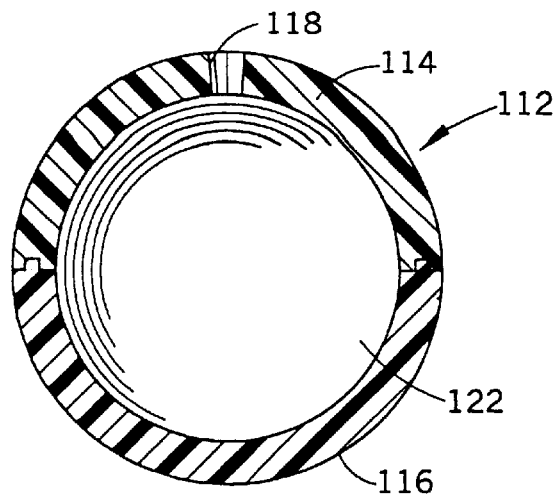
FIGS. 20, 21, 22, 23 and 24 illustrate another method of golf ball manufacture or fabrication, and a golf ball constructed in accordance with that method.

FIGS. 20 through 24 illustrate still further embodiments of the present invention. Specifically, a shell 112 is fabricated from two hemispherical members 114 and 116 which are coupled together, for example, by spin welding. A hole 118 is formed in the hemispherical shell member 114 as shown in FIG. 20.

The steps of fabricating the shell 112 are essentially the same as those described above. The most significant difference, is however, in the size of the shell wherein the exterior diameter is slightly less than that of the contemplated, completed golf ball. When so sized, the filled shell (that is, the shell and core) can, as noted above, be also referred to as a center or golf ball center.

Figure 21:
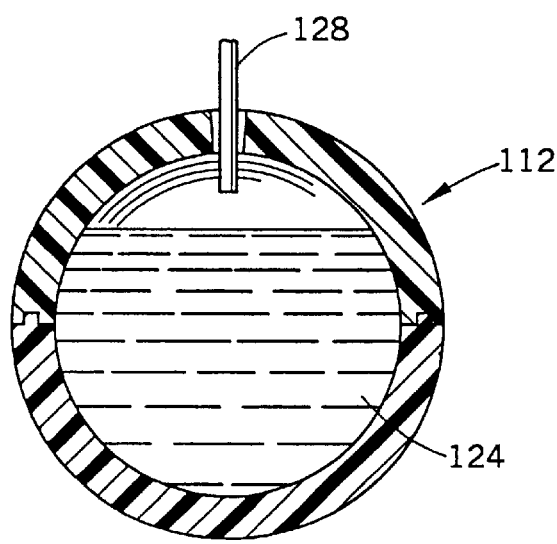
Figure 22:
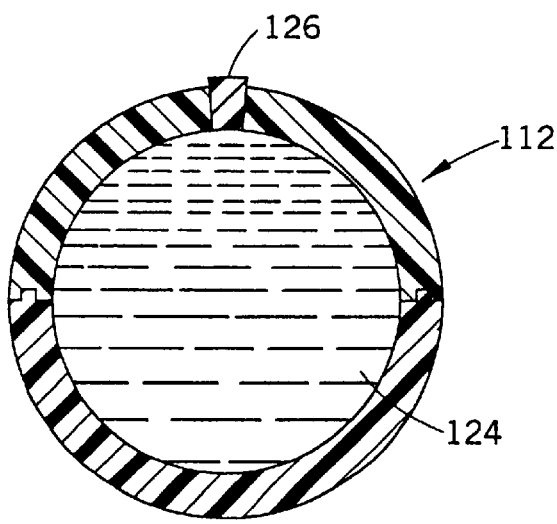

FIGS. 21 and 22 illustrate methods of filling a shell similar to those previously discussed wherein the interior 122 of the shell or center 112 is filled with a liquid 124 through a drilled filling hole 118. A needle or similar device 128 is injected into the shell 112 through the hole 118 and is used for filling the interior of the shell. Thereafter, the filling hole 118 is closed through the use of a plug 126. The radially outer, exposed end of the plug 126 is next ground so its exterior surface is essentially coextensive with the exterior spherical surface of the remainder of the shell or center 112.

Figure 23:
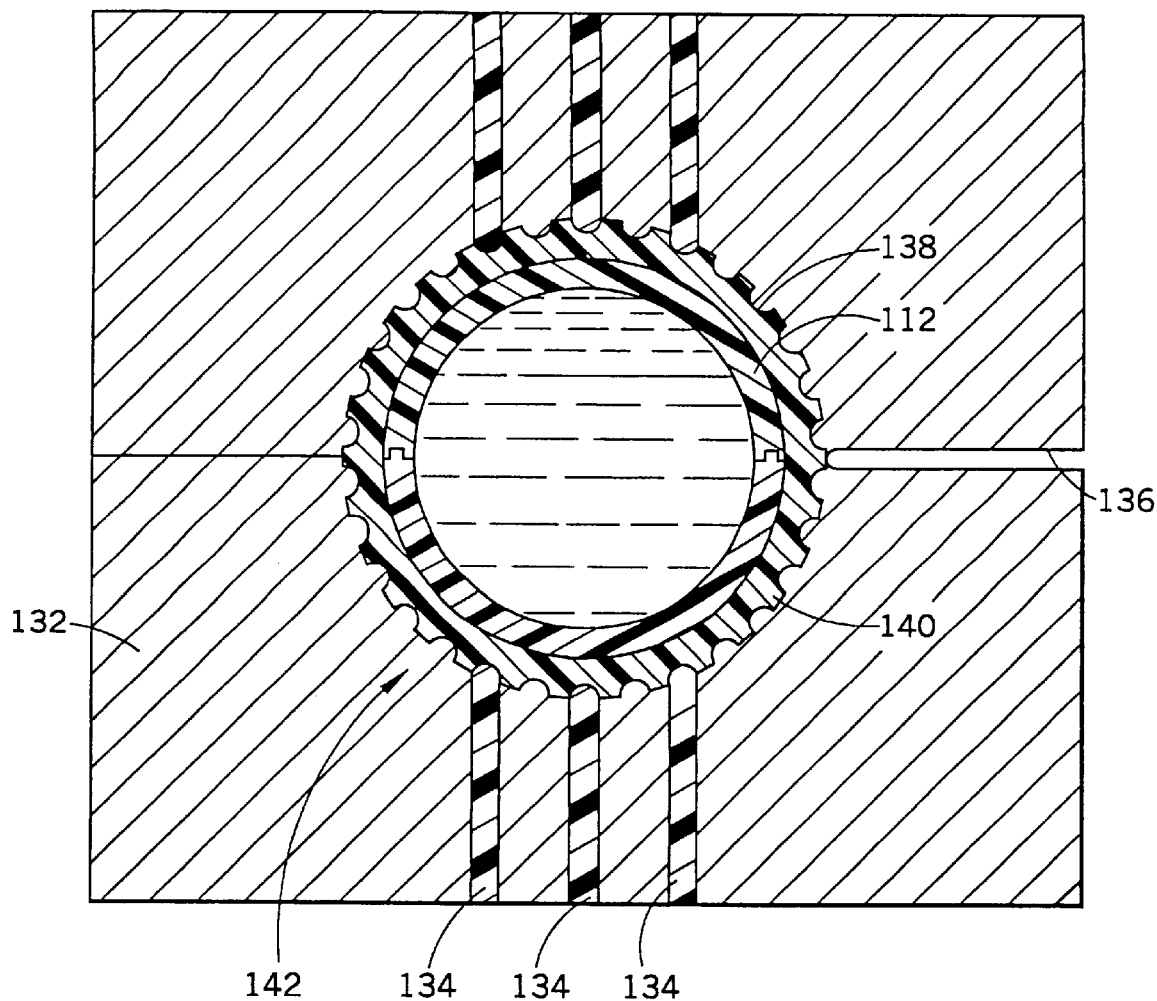

FIG. 23 illustrates a two-piece injection mold 132 with the spherical, filled center 112 centrally located therein. The center 112 is held in position centrally within the mold 132 by pins 134 in a conventional manner. The mold 132 is then filled through an entrance port 136 to provide a layer of polymeric elastomeric material of an even thickness, completely around the previously formed center 112. The elastomeric layer is allowed to harden and bond to the center 112 and after trimming, forms a one-piece outer cover 140 for the final, finished golf ball 142. Dimples 138 are provided to the exterior surface of this cover 140 through the configuration of the mold or, in the alternative, the dimples may be formed separately in the finished golf ball 142.

Figure 24:
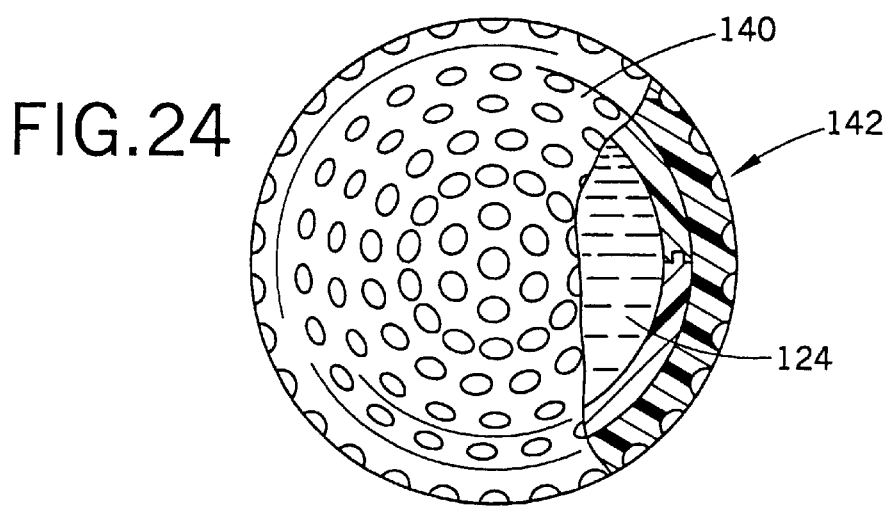

Stated again, in the final finished golf ball 142, as seen in the FIG. 24, the core of the ball 124 is an injected liquid that is disposed within an intermediate center or shell 112 formed of mating, spin welded, hemispherical parts. The use of an exterior, one-piece cover 140 thereover provides additional stability to the ball 142 during play. The elastomeric components of the golf ball 142, including the intermediate two part center or shell 112 and the exterior one-part cover 142, may be fabricated of any of the materials described above. It may be possible, however, to delete the color imparting, additional materials from the center or shell 112 since it cannot be seen after application of the cover 140.

The entire radial thickness of the center 112 and cover 142, in combination, should be the same, as described above with respect to balls having shells, where the outer surface of the shell is the outer cover of the golf ball, and particularly, is between about 0.060 and about 0.300 inches. In selecting of the specific thicknesses of the center and cover, those skilled in the art will appreciate that the center 112 should be of a thickness so that the final hemispheres may be properly handled during fabrication of the golf ball, that is, spin welded, drilled for the injection of the liquid for the core, filled with the core material, and having the drilled holes closed. Similarly, the cover 142 should be of a thickness so that the dimples may be molded or otherwise formed therein and so that adequate strength is provided for holding together the two halves of the center.

In another further, most preferred embodiment, as shown in FIGS. 25–28, a shell 152 is formed as a one-piece unit, preferably by blow molding, with the result that a golf ball 146 may be made relatively inexpensively. In these embodiments, an extrudate or parison is extruded from a starting polymeric, elastomer material, preferably pellets. The extrudate 148 is a continuous tube fed into conventional clam shell mold halves of a blow molding machine. From the extrusion machine, not shown, the extrudate is continuously cut to length and then captured in the mold halves. The mold halves preferably move in a step and repeat manner to receive the extrudate and then move to subsequent locations. In some of these embodiments, the mold halves close and pressurized air is injected into the mold so as to force the extrudate into a desired spherical shaped shell. At the next station, a core material liquid or fluid is injected into the shell through a filling hole, and then the filling hole is plugged or closed.

In other of these embodiments, the core material liquid 156 is used, in lieu of pressurized air, to mold the extrudate into a spherical shaped shell. After the liquid core material 156 is within the shell, the filling hole, if there is one, is plugged or closed.

The interior surfaces of the mold halves may include symmetric projections for directly forming dimples on the outer spherical surface of shell so that shell, with a liquid filled core, constitutes a final golf ball. Alternatively, the shell can be molded as a center (that is, where its outer diameter is less than that of a regulation golf ball) and a dimpled outer cover can thereafter be molded, as by the above noted conventional molding techniques, about the shell or center. Further, a multi-layer parison, that is, a parison of two or more layers of materials, can be extruded simultaneously to form a shell, that is either a center or a dimpled ball. The shell and the golf ball must, of course, be appropriately trimmed, particularly with regard to removing the excess extrudate, after the shell is molded.

More specifically, FIGS. 25A through 25E generally illustrate the steps and/or stations of a fabrication or manufacturing method for the one-piece blow-molded golf ball 146. FIG. 25A shows the output of a conventional extrusion press—an extrudate or parison 148—having enlarged side walls in its central extent or portion. FIG. 25B illustrates the parison or extrudate 148 disposed in the mold of the blow-molding machine at a step or station where the hollow spherical shell 152 is formed internally and dimples are formed on the external surface of the shell. Excessive extrudate material 154 is shown above and below the shell 152. FIG. 25C illustrates a station or step where the filling of the interior of the spherical shell 152 with core material liquid 156 occurs by means of a needle 158 that extends through a filling hole 160 in the upper extent of the shell. FIG. 25D shows the needle 158 removed and a plug 162 closing the filling hole 160. FIG. 25E illustrates the finished golf ball 146 after being trimmed of the excess material including that of the plug 162 above the surface of the ball 146.

FIGS. 26A through 26E illustrate the stations and/or steps of another blow molding fabrication method. FIG. 26A illustrates the same parison or extrudate 148 as used in the prior FIGS. 25A–25E embodiment. FIGS. 26B and 26C show the same method steps or stations that are illustrated in FIGS. 25B and 25C, respectively. However, in closing the filling hole step or station, as illustrated in FIG. 26D, no plug is utilized. Instead, after the removal of the needle 158, the molding machine is provided with mechanisms (not shown) to push extrudate material of the parison located adjacent the filling hole 160 so as to cover and fill the hole 160. FIG. 26E shows the finished golf ball 166, as trimmed, that constitutes the final product.

FIGS. 27A through 27E illustrate the steps 10 and/or stations of still another blow molding fabrication method. The parison 148, shown in FIG. 27A, is slightly smaller than the parison shown in FIGS. 25A and 26A since in this embodiment, blow molding is utilized to fabricate only a golf ball center or shell 170 rather than an entire golf ball itself. The center 170, is about 1.50 inches in diameter, and is blow-molded as shown in FIG. 27B, in the same manner as the shell 152, except no dimples are formed on its external surface. It may be then filled with a fluid 156 and sealed, by and in the blow-molding machine, in a manner similar to the steps shown in FIGS. 25D and 26D. After being trimmed, the center 170 is provided with an outer or exterior cover 172, having dimples, through conventional techniques, such as injection molding techniques. The molded cover 172 is then trimmed to constitute the final golf ball 174 as shown in FIG. 27E.

FIGS. 28A through 28E illustrate the steps and/or stations of yet another method for fabricating a golf ball 178 with a blow-molded shell or center 180. FIGS. 28A and 28B illustrate the five same method steps as shown in FIGS. 27A and 27B. In FIG. 28C, the center is filled with a core liquid 156 through a needle 158 and the filling hole is then plugged with a plug 184 and trimmed as described in the step illustrated in FIG. 25D. While the plug would generally be made from the same material as the shell, (e.g., an ionic material), this is not necessary. Plugs of an elastomeric material (e.g., rubber), which have been elongated to reduce their diameter, have been inserted into the hole of a center (shell), relaxed and have sealed the hole from a bulge or a flange on the inner surface of the center. Such plugs have achieved a tight fit. The application of cover material over the center in the injection molding process does not interfere with the sealing capabilities of such plugs. As in the prior FIG. 27 step, the center 180 then receives an injection molded outer cover 186 having dimples thereon. Thereafter the exterior of the ball 178 is trimmed to constitute the final golf ball as shown in FIG. 28E.

Figures 29A, 29B, 29C, 29D, 29E:
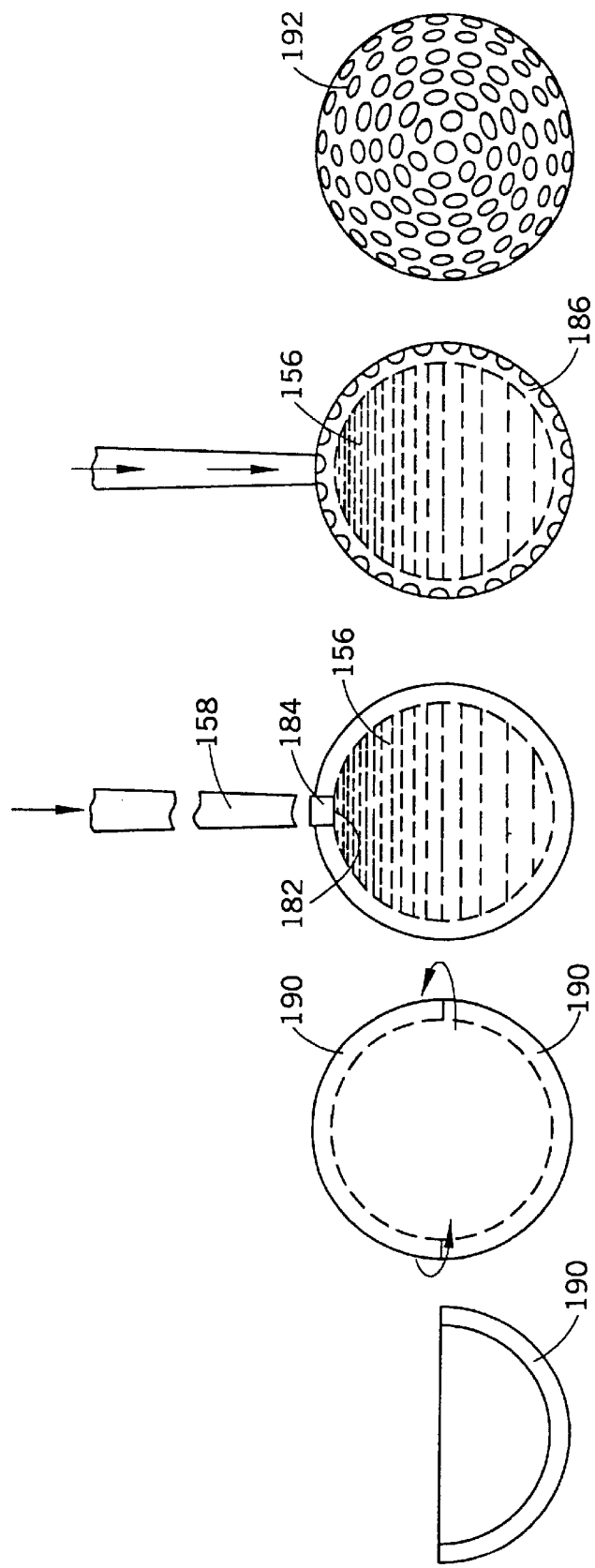
Figure 34A:
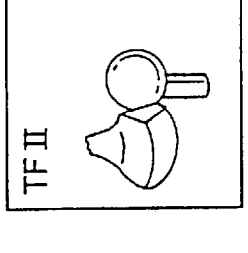
Figure 34B:
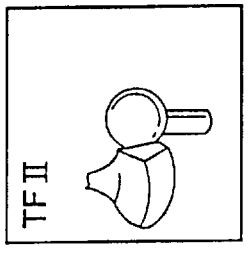
Figure 34C:
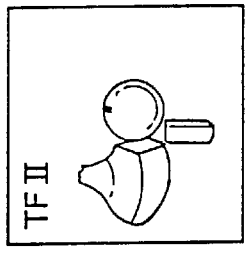
Figure 34D:
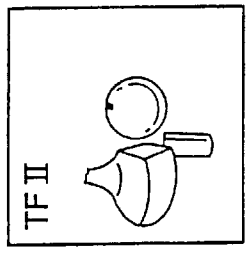
Figure 34E:
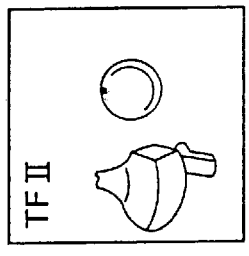
Figure 34F:
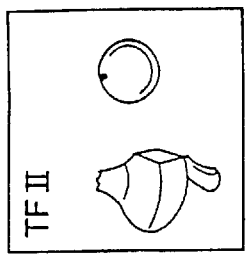
Figure 35A:
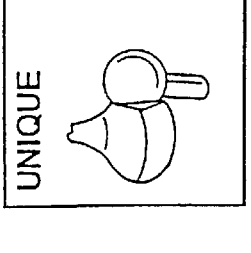
Figure 35B:
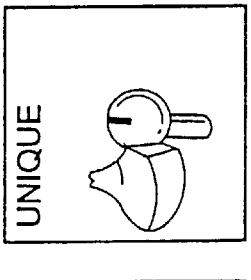
Figure 35C:
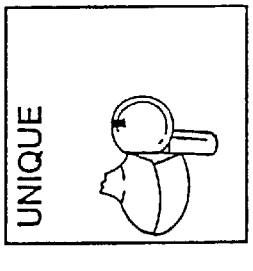
Figure 35D:
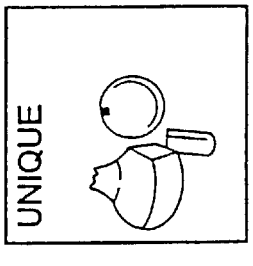
Figure 35E:
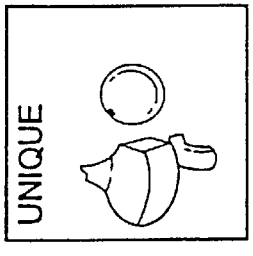
Figure 35F:
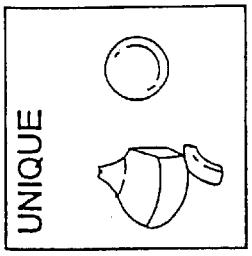
Figure 36A:
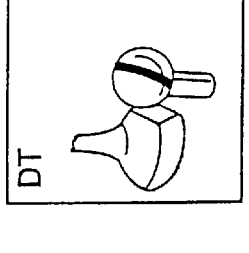
Figure 36B:
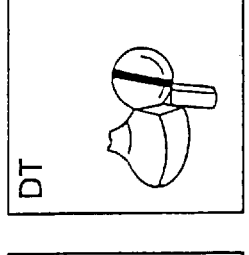
Figure 36C:
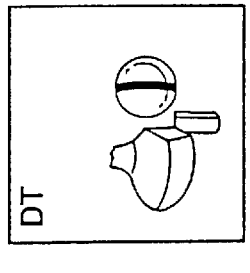
Figure 36D:
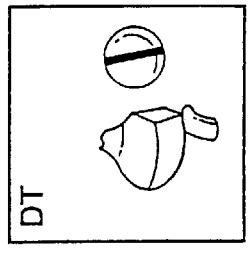
Figure 36E:
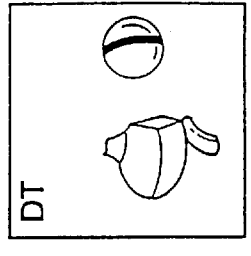

FIGS. 29A through 29E illustrate the several steps and/or stations of a further golf ball fabrication method. Two shell halves 190 are conventionally injection molded and then bonded together as by spin welding as generally illustrated in FIGS. 29A and 29B. FIGS. 29C and 29D illustrate the steps or stations where the drilling of a filling hole 182 in the preformed shell or center occurs, where the shell is filled with core fluid 156 by means of a needle 158, and where the filling hole 182 is subsequently plugged, with a plug 184. Thereafter, a cover 186 is injection molded onto the shell or center, with dimples being formed on the exterior or outer surface of the shell. FIG. 29E illustrates the final golf ball 192 after trimming.

FIGS. 30A through 30E illustrate the steps and/or stations of a still further golf ball fabrication method. Here the shell halves 194 are formed through conventional injection molding techniques and have dimples molded in their outer spherical surfaces. The shell halves are then joined, by spin bonding techniques, to form a preformed shell as generally illustrated in FIGS. 30A and 30B. The steps of drilling of the shell, the filling of the shell 196 with a core fluid 156, and thereafter, closing the fill hole in the shell, by a plug 184, are illustrated in FIGS. 30C and 30D. Alternatively, and as described in connection with the step shown in FIG. 26D, the fill hole can also be closed by the use of mechanisms (not shown) which push material adjacent to the fill hole so as to cover and fill the hole. The finished golf ball 196, after being trimmed, is generally shown in FIG. 30E.

A comparison of the shells made in accordance with the disclosed blow molding embodiments (e.g. the embodiments illustrated in FIGS. 25 and 27)—vis-a-vis shells made from two injection molded half shells (e.g. the embodiments illustrated in FIGS. 28 and 29)—reveals that there are differences. One is that a parting line seam is formed across approximately 180 degrees of the periphery of a blow molded shell at the mold line and that in the remaining 180 degrees, there is no flash and effectively no seam. This is in contrast to the 360 degree seam in the spin bonded, two half shell shells. Even the seam formed throughout the 180 degrees span in the blow molded shells is superior to the seams where the shells are formed from two half shells that are spin welded together. it is believed that superior shell seams exist in shells made in accordance with the blow molding embodiments because those seams are created when the polymeric material is in a melt state.

Having superior seams or no seams is extremely important from a marketing standpoint, and accordingly it would appear that the blow molding fabrication methods will ultimately be the preferred method of manufacturing the unique golf balls of the present invention. While it should be possible to achieve a "good" joining of the two injected molded half shells 99.9% of the time, any failure of the golf balls along the seams could be catastrophic from a marketing point of view, particularly during the initial introduction of the unique golf balls. It would be obviously unacceptable, from a marketing standpoint, if golfers would be splashed with a liquid should the ball parts separate when the golf ball was hit by a golf club.

Advantages of the Unique Golf Balls

Comparisons between samples of the unique golf balls, which were manufactured with blow-molded shells or centers, and conventional TOP-FLITE II and TOP-FLITE XL brand balls discloses that the former have a much greater uniformity in weight. The reason for this greater weight uniformity is in the simplicity in golf ball design and in the manufacturing process used. In contrast, the centers, which are used for conventional prior art two-piece balls, are solid and must be formed from a complex blend of materials that, as a result of the blending and curing techniques, cannot approach the uniformity of the golf ball of this invention. Further, the centers must be molded, ground, etc. in order to produce centers suitable for the injection molding of a cover thereover.

When Unique golf balls made by the disclosed blow molded processes are compared with the conventional prior art three-piece balls, the cores of the three-piece wound balls are found to vary in density, in the tension under which the threads are wound onto the core and in the amount of material which is wound onto the core. All of these factors tend to create a golf ball which is less uniform than the Unique ball where the shell (center) is blow molded, filled with liquid and where a cover is injection molded onto the shell.

The series of successive, high speed, stop action photographs, which are included as FIGS. 31, 32 and 33, are of golf balls being hit by a 5-iron swung at 128 feet per second. The distortion of the Unique golf ball of the present invention, shown in FIG. 32, is significantly greater than that of the conventional, two-piece TOP-FLITE II brand ball shown in FIG. 31. The impact distortion of the ball of the present invention is at least as great as the conventional, three-piece, TITLEIST DT brand ball shown in FIG. 33. From FIGS. 31, 32 and 33, it can be seen that the Unique golf ball (FIG. 32) is on the club face of the iron longer than either the TOP-FLITE II or the TITLEIST DT brand balls of FIGS. 31 and 33. The ability to stay on the face longer allows the golfer to impart greater control to the ball as well as giving more time for energy transfer. Further, it tends to give the golfer a superior, much desired "feel".

The series of successive, high speed, stop action comparison photographs of FIGS. 34–36 and FIGS. 37–39 show the same balls (as in FIGS. 31–33, respectively) being struck by a driver swung at 145 fps and at 160 fps, respectively. These photographs again show that the Unique golf ball remains on the club face longer, FIGS. 35 and 38, than either the TOP-FLITE II or the TITLEIST DT brand balls—FIGS. 34 and 36 or FIGS. 37 and 39, respectively. Again, the ability of the golf ball to stay on the club face longer will tend to give the golfer greater control and a better "feel".

FIGS. 31–33, 34–36 and 37–39 further show that the Unique ball of the present invention has less back spin than either the TOP-FLITE II or the TITLEIST DT brand balls. Having less back spin when hit, for example, by a driver or a 5-iron is advantageous in obtaining greater distance by a optimized combination of launch angle and spin rate which results in greater roll. Further, the Unique golf ball is spinning less than a conventional ball and this causes the Unique ball to fly at a lower trajectory. Accordingly, the Unique ball is very efficient in terms of energy transfer, that is, a lower coefficient of restitution, and should travel further than a conventional two- or three-piece ball when hit under comparable circumstances.

It is believed that the Unique golf ball's improved performance may also be derived, at least in part, from the decreased moment of inertia which results from the novel construction of the balls. Moment of inertia is measured in ounce inch squared. Limited testing has shown that Unique balls, fabricated in accordance with the principles of the present invention, have a moment of inertia of about 0.240 ounce inch. In contrast, the moment of inertia of conventional golf balls varies from about 0.400 to about 0.445 ounce inch squared.

Based on tests conducted so far, the Unique golf ball of the present invention also shows a much greater gain in distance as the club head speed decreases and as the loft of the club head increases as compared with conventional TOP-FLITE brand golf balls or conventional three-piece balls. This leads to the belief that the Unique golf balls will be more playable and provide "longer" distances for all golfers including the average golfers.

Additional Preferred Embodiments

Referring now to FIG. 40, a golf ball according to another embodiment of the invention is shown and is designated as 208. The ball preferably has a diameter of at least 1.68 inches. The invention is also useful with golf balls having a diameter of 1.70 inches or more.

The golf ball includes a central core 210 and a multi-layer shell 212. The multi-layer shell includes an inner layer 214, an intermediate layer 215, and an outer layer 216 with dimples 218. The inner layer 214 preferably has a Shore D hardness in the range of 60–80 and more preferably 62–78. The intermediate layer 215 preferably has a Shore D hardness in the range of 10–60, more preferably 30–60 and most preferably 55–60, the Shore hardness being at least three points softer, and more preferably at least five points softer than the Shore D hardness of the inner layer. The outer layer 216 preferably comprises an ionomer, but also or alternatively could include other materials, e.g. crosslinked polyurethane, etc. The outer layer 216 preferably has a Shore D hardness in the range of 60–80 and more preferably 62–78.

A primer layer 220 and a top coat layer 222 are shown in FIG. 40, though not to scale. The other embodiments may also optionally have a primer layer an a top coat layer (not shown).

Referring to FIG. 41, a golf ball according to a further embodiment of the invention is shown and is designated as 308. The ball preferably has a diameter of at least 1.68 inches. The ball includes a central core 310 and a multi-layer shell 312. The multi-layer shell includes a soft inner layer 314 having a Shore D hardness which preferably is in the range of 10–60 and more preferably 30–50, a hard intermediate layer 315 which preferably has a Shore D hardness in the range of 60–80 and more preferably 62–78, and a soft outer layer 316 with dimples 318, the soft outer layer 316 preferably having a Shore D hardness in the range of 10–60 and more preferably 30–50. The inner and intermediate layers are preferably formed from an ionomeric or non-ionomeric polyolefin material. The outer layer preferably comprises ionomer.

Referring now to FIG. 42, yet another embodiment of a golf ball according to the invention is designated as 408. The golf ball includes a central core 410 and a multi-layer shell 412. The multi-layer shell includes a hard inner layer 414 preferably having a Shore D hardness of 60–80 and more preferably 62–78, an intermediate layer 415 preferably having a Shore D hardness of 50–65 and more preferably 55–60, and an outer layer 416 with dimples 418. The outer layer preferably has a Shore D hardness of 10–60 and more preferably 30–50, with the hardness being at least three points lower than the Shore D hardness of the intermediate layer 415. The inner layer 414 and intermediate layer 415 preferably comprise ionomeric or non-ionomeric polyolefin materials. The outer layer 416 preferably comprises ionomer.

Referring now to FIG. 43, a golf ball according to a further embodiment of the invention is shown and is designated as 508. The ball includes a central core 510 and a multi-layer shell 512. The multi-layer shell includes an inner layer 514 which preferably has a Shore D hardness of 10–60 and more preferably 30–50, an intermediate layer 515 which preferably has a Shore D hardness of 50–65 and more preferably 55–60, and an outer layer 516 with dimples 518. The outer layer has a Shore D hardness of 60–80 and more preferably 62–78. The inner and intermediate layers 514 and 515 preferably comprise ionomeric or non-ionomeric polyolefin materials. The outer layer 516 preferably comprises ionomer.

Figure 44:
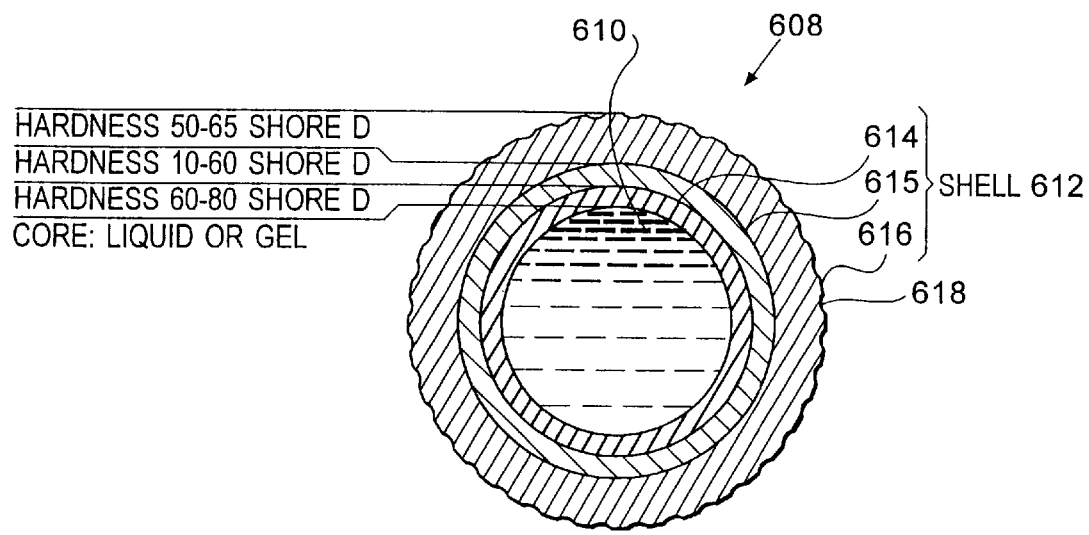

Referring now to FIG. 44, a golf ball according to another embodiment of the invention is shown and is designated as 608. The ball includes a central core 610 and a multi-layer shell 612. The multi-layer shell includes an inner layer 614 which preferably has a Shore D hardness of 60–80 and more preferably 62–78, an intermediate layer 615 which preferably has a Shore D hardness of 10–60 and more preferably 30–50, and an outer layer 616 with dimples 618. The outer layer preferably has a Shore D hardness of 50–65 and more preferably 55–60. The inner and intermediate layers 614 and 615 preferably comprise ionomeric or non-ionomeric polyolefin materials. The outer layer 616 preferably comprises ionomer.

Figure 45:
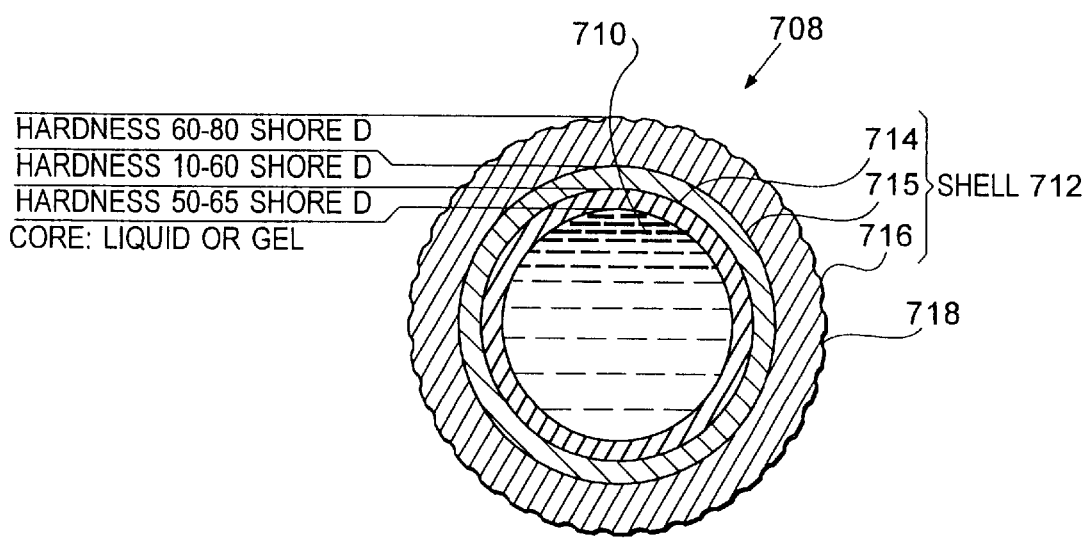

Referring now to FIG. 45, a golf ball according to yet another embodiment of the invention is shown and is designated as 708. The ball includes a central core 710 and a multi-layer shell 712. The multi-layer shell includes an inner layer 714 which preferably has a Shore D hardness of 50–65 and more preferably 55–60, an intermediate layer 715 which preferably has a Shore D hardness of 10–60 and more preferably 30–50, and an outer layer 716 with dimples 718. The outer layer has a Shore D hardness of 60–80 and more preferably 62–78. The inner and intermediate layers 714 and 715 preferably comprise ionomeric or non-ionomeric polyolefin materials. The outer layer 716 preferably comprises ionomer.

Figure 46:
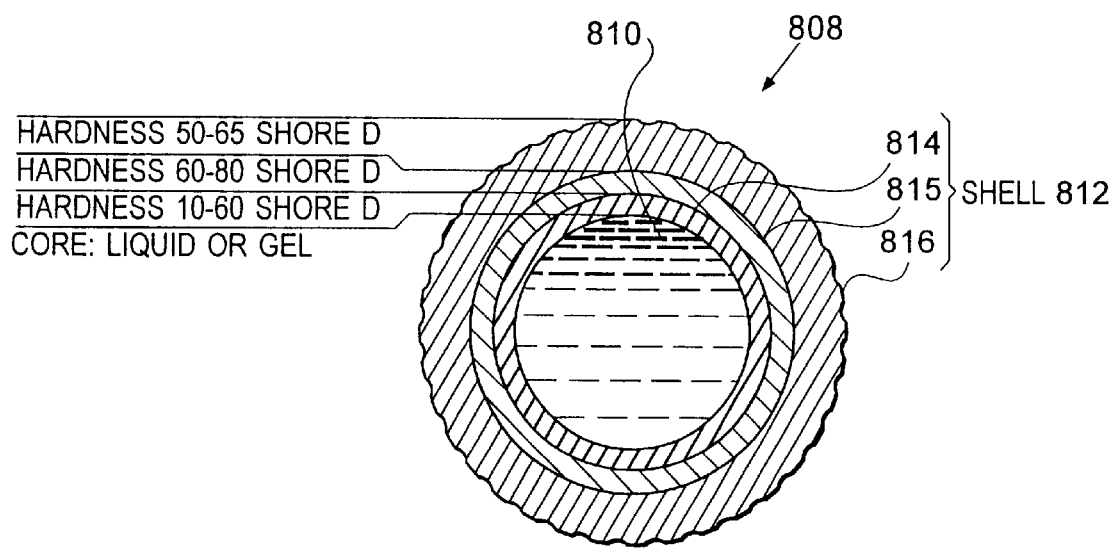

Referring now to FIG. 46, a golf ball according to another embodiment of the invention is shown and is designated as 808. The ball includes a central core 810 and a multi-layer shell 812. The multi-layer shell includes an inner layer 814 which preferably has a Shore D hardness of 10–60 and more preferably 30–50, an intermediate layer 815 which preferably has a Shore D hardness of 60–80 and more preferably 62–78, and an outer layer 816 with dimples 818. The outer layer has a Shore D hardness of 50–65 and more preferably 55–60. The inner and intermediate layers 814 and 815 preferably comprise ionomeric or non-ionomeric polyolefin materials. The outer layer 816 preferably comprises ionomer.

Figure 47:
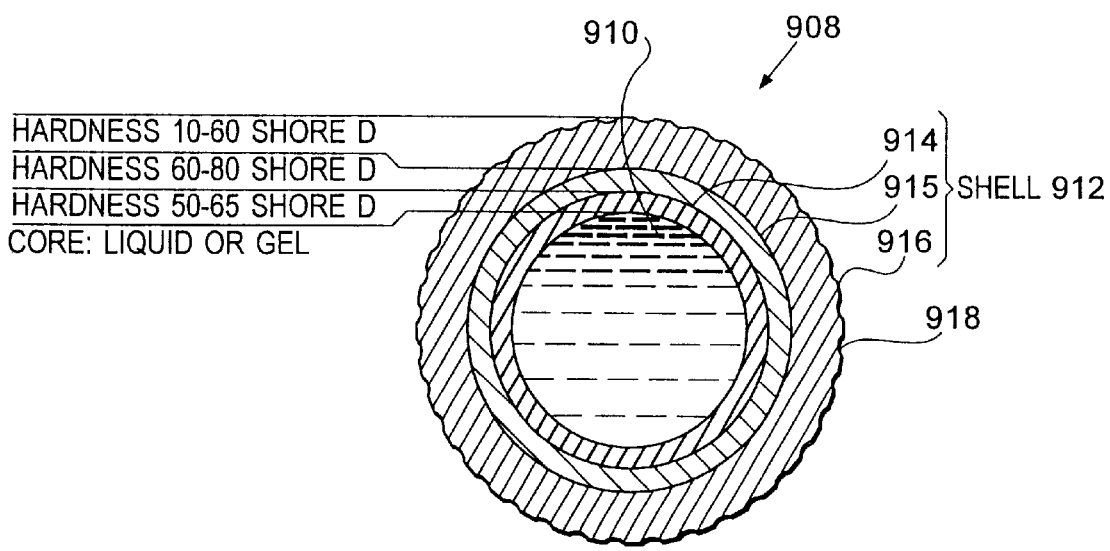

Referring now to FIG. 47, a golf ball according to yet another embodiment of the invention is shown and is designated as 908. The ball includes a central core 910 and a multi-layer shell 912. The multi-layer shell includes an inner layer 914 which preferably has a Shore D hardness of 50–65 and more preferably 55–60, an intermediate layer 915 which preferably has a Shore D hardness of 60–80 and more preferably 62–78, and an outer layer 916 with dimples 918. The outer layer preferably has a Shore D hardness of 10–60 and more preferably 30–50. The inner and intermediate layers 914 and 915 preferably comprise ionomeric or non-ionomeric polyolefin materials. The outer layer 916 preferably comprises ionomer.

Figure 48:
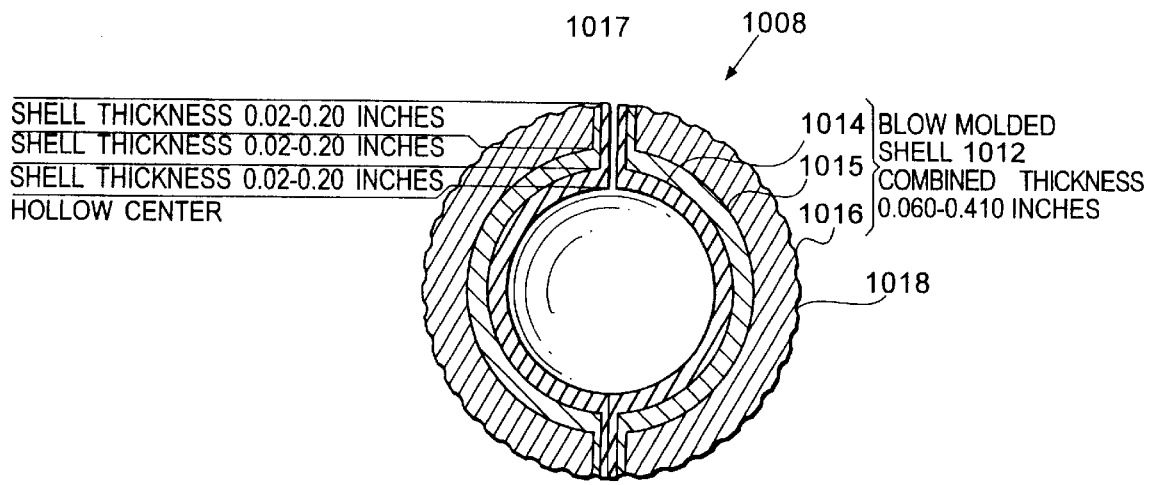

FIG. 48 shows another preferred embodiment of the invention. The shell 1008 has three layers, 1014, 1015, and 1016, a perforation 1017, and the usual dimples 1018 on its outer layer or shell. The walls of the shells may have an overall thickness from about 0.060 inches to about 0.410 inches. Each layer has a thickness of 0.02–0.20 inches. All three layers are blow-molded from a single parison.

Figure 49:
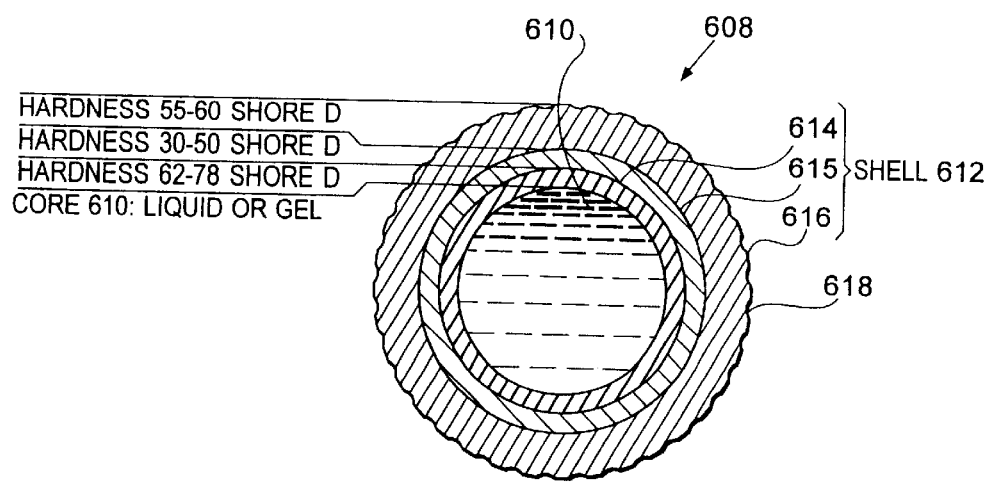

FIG. 49 is another species of the ball 608 of FIG. 44. The ball includes a central core 610, which is a liquid or gel, and a multi-layer shell 612. The multi-layer shell 612 includes an inner layer 614 which has a Shore D hardness of 62–78, an intermediate layer 615 which has a Shore D hardness of 30–50, and an outer layer 616 with dimples 618, having a Shore D hardness of 55–60.

Figure 50:
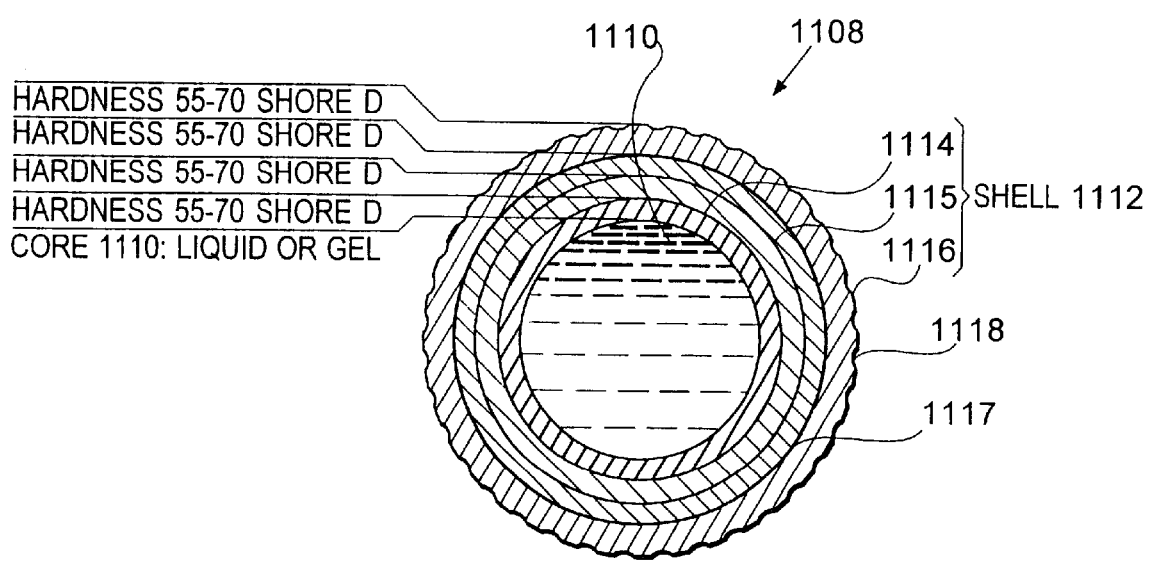

Another preferred embodiment of the invention, illustrated in FIG. 50, is a ball 1108 having a liquid or gel center 1110, surrounded by a three-layer shell 1112. The shell 1112 includes an inner shell 1114, an intermediate shell 1115, and an outer shell 1116 having dimples 1118. Each layer 1114, 1115, and 1116 of the shell 1112 has the same Shore D hardness as the other layers. The Shore D hardness preferably is 50–80 and more preferably 55–70. Each layer can be formed from the generally same composition.

As indicated above, the shell layers preferably are formed from ionomer. In a preferred form of the invention, soft shell layers, i.e. those with a Shore D hardness of 10–60 and preferably 30–50 comprise an ionomer with an average wt % acid content of about 15 or less which is at least 10% neutralized. In a preferred form of the invention, the soft shell layers constitute a blend of two types of ionomers in which one component of the blend is an ethylene-acrylic acid or ethylene-methacrylic acid copolymer containing ≧15 wt % acid groups which are at least partially neutralized with a cation, and the other type of ionomer is a terpolymer of ethylene, acrylic acid or methacrylic acid and a softening termonomer such as butyl acrylate or methyl acrylate, resulting in an overall wt % acid content of about 15 or less. The blend preferably contains at least 75 wt % terpolymer type ionomer. Non-limiting examples of suitable blends are described in U.S. Pat. Nos. 4,884,814 and 5,120,791, both of which are incorporated herein by reference.

If shell layers of intermediate hardness, i.e. those with a Shore D hardness of 10–55, are made of ionomer, a blend of about 25–75 wt % copolymer ionomer and about 75–25 wt % terpolymer ionomer preferably is used.

The hard ionomeric shell layer or layers can contain a single type of ionomer or a blend of two or more types of ionomers. Furthermore, a hardening and/or softening modifier can be added. In a particularly preferred form of the invention, the hard shell layer or layers contain one or more ionomers having at least 16 weight % acid groups, which are at least partially neutralized.

Each of the three cover layers can be foamed or unfoamed. Preferably, each layer is unfoamed. A foamed layer has a lower density than an unfoamed layer, thereby affecting the weight distribution and moment of inertia. Typically, the melt index is increased by foaming. The use of a foamed cover layer results in an increase in the weight of the core of the ball, thereby allowing for easier initiation of spin to a ball, particularly on short shots. This may partially compensate for a low spin rate on a hard covered ball, particularly in the case of a player who does not strike the ball at a fast swing speed. A foamed layer generally has a lower modulus and thus increased flexibility. Typically, a foamed layer is formed by adding a small amount of a chemical blowing agent to the cover material prior to molding. The blowing agent is selected such that it will release gas at the molding temperature for the cover layer.

The outer cover layer of the golf ball preferably is made of ionomer, a metallocene catalyzed polyolefin such as EXACT, INSITE, AFFINITY, or ENGAGE which preferably is crosslinked, a polyamide, amide-ester elastomer, or graft copolymer of ionomer and polyamide such as CAPRON, ZYTEL, ZYTEL FN, a thermoplastic block polyamide such as PEBAX, which is a polyetheramide, etc., a crosslinked transpolyisoprene blend, a thermoplastic block polyester such as HYTREL, which is a polyetherester, or a thermoplastic or thermosetting polyurethane such as Estane® polyurethanes, including Estane® X4517.

The inner and intermediate cover layers can be made of any of the materials listed in the previous paragraph as being useful for forming an outer cover layer. Furthermore, the inner and intermediate cover layers can be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR, NUCREL, ESCOR and ATX, other plastomers and flexomers, thermoplastic elastomers such as styrene/butadiene/styrene (SBS) or styrenelethylene-butylenelstyrene (SEBS) block copolymers, including Kraton® (Shell), dynamically vulcanized elastomers such as Santoprene® (Monsanto), ethylene vinyl acetates such as Elvax® (DuPont), ethylene methyl acrylates such as Optema® (Exxon), polyvinyl chloride resins, and other elastomeric materials described above may be used. Mixtures, blends, or alloys involving these materials can be used. It is desirable that the polyolefin be a tough, low density material.

The non-ionomeric polyolefins can be mixed with ionomers. The inner, intermediate and outer cover layers optionally may include processing aids, release agents and/or diluents. Another useful material for a golf ball inner layer is a natural rubber latex (prevulcanized) which has a tensile strength of 4,000–5,000 psi, high resilience, good scuff resistance, a Shore D hardness of less than 15 and an elongation of >500%.

To form one preferred embodiment of a soft cover layer for use as an inner, intermediate or outer cover layer, one or more low modulus ionomers (i.e., soft ionomers), or a blend of one or more high modulus ionomers (i.e., hard ionomers) and one or more low modulus ionomers (i.e., soft ionomers) in a mixture can be used. A high modulus ionomer is one which has a flexural modulus of about 15,000–120,000 psi or more as measured under ASTM method D-790. The hardness of this type of ionomer is at least 50 on the Shore D scale as measured on a plaque in accordance with ASTM method D-2240. Typically, hard ionomers are copolymers with two types of monomers. A low modulus ionomer which can be blended with the high modulus ionomer to form the inner layer has a flexural modulus of about 1,000 to about 15,000 psi (ASTM D-790), and a plaque hardness of about 10–40 on the Shore D scale (ASTM D-2240).

To form a cover layer of intermediate hardness, hard and soft cover materials typically are blended in a ratio of 25–75 wt % hard (copolymer) ionomer and 75–25 wt % soft (terpolymer type) ionomer. Alternatively, cover layers of intermediate hardness as well as soft cover layers can be comprised of a single ionomer having a hardness that meets the requirements of Shore D hardness, i.e., a ball (not plaque) Shore D hardness of 10–60 for a soft cover layer and ball (not plaque) Shore D harness of 50–65 for a cover layer of intermediate hardness.

To form a hard cover layer, one or more hard (high modulus) ionomers are used. Furthermore, low modulus ionomers can be blended with the high modulus ionomer or ionomers to improve compressing, toughness at low temperatures, enhanced feel, scuff resistance, etc., as long as the Shore D hardness requirements for the hard cover layer are met.

The hard ionomer resins include ionic copolymers which are the e.g. sodium, zinc, magnesium, calcium, manganese, nickel, potassium or lithium, etc. salt, or blend thereof, of the reaction product of an olefin having from 2 to 8 carbon atoms and an unsaturated monocarboxylic acid having from 3 to 8 carbon atoms and which result in a ball having the desired combination of COR, compression, and inner cover layer hardness. The carboxylic acid groups of the copolymer are partially neutralized by the metal ions, i.e., about 10–100%, typically about 10–75% and more preferably about 30–70% neutralized. The hard ionomeric resins typically are copolymers of ethylene with acrylic and/or methacrylic acid. Two or more hard ionomer resins can be blended.

The metal cation salts utilized in the invention are those salts which provide the metal cations capable of neutralizing, to various extents, the carboxylic acid groups of the high acid copolymer. These include acetate, oxide or hydroxide salts of e.g. lithium, calcium, zinc, sodium, potassium, nickel, magnesium, and manganese, etc.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

Non-limiting examples of commercially available hard ionomeric resins with intermediate acid levels which can be used in a blend to form the cover layers include the hard sodium ionic copolymer sold under the trademark Surlyn®8940 and the hard zinc ionic copolymer sold under the trademark Surlyn®9910. Surlyn®8940 is a copolymer of ethylene with methacrylic acid with about 15 weight % acid which is about 29% neutralized with sodium ions. This resin has an average melt flow index of about 2.8. Surlyn®9910 is a copolymer of ethylene and methacrylic acid with about 15 weight % acid which is about 58% neutralized with zinc ions. The average melt flow index of Surly®9910 is about 0.7. Additional examples include Iotek 1002, Iotek 1003, Iotek 8000, Iotek 8020, Iotek 8030, Iotek 7010 and Iotek 7030 which are sold by Exxon Corporation. Non-limiting examples of ionomeric resins with intermediate acid levels are shown below on Table 1.

Hard cover layers and other cover layers containing hard-soft blends also can be made using high acid ionomer resins. High acid ionomer resins preferably contain more than 16% by weight of a carboxylic acid, preferably 17–25% by weight of a carboxylic acid, and most preferably about 18.5–21.5% by weight of a carboxylic acid. Examples of a number of copolymers suitable for use to produce the high acid ionomers include, but are not limited to, high acid embodiments of an ethylenelacrylic acid copolymer, an ethylene/methacrylic acid copolymer, an ethylene/itaconic acid copolymer, an ethylenelmaleic acid copolymer, an ethyleneimethacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene. Examples of commercially available high acid methacrylic acid-based ionomers which can be used in accordance with the invention include Surlyn® AD-8422 (sodium cation), Surlyn® 8162 (zinc cation), Surlyn® SEP-503-1 (zinc cation), and Surly® SEP-503-2 (magnesium cation). According to DuPont, all of these ionomers contain from about 18.5 to about 21% by weight methacrylic acid.

A cover layer with a particular Shore D hardness can be formed using a single ionomer, or more commonly, a blend of two or more ionomers. Non-limiting examples of ionomers which can be used to form golf ball covers are as follows:

TABLE 1

Typical Properties of Some Commercially Available Hard Surlyn ® Resins

|  | ASTM D | 8940 | 9910 | 8920 | 8528 | 9970 | 9730 |
|---|---|---|---|---|---|---|---|
| Cation type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific gravity, g/cm$^3$ | D-792 | 0.95 | 0.97 | 0.95 | 0.94 | 0.95 | 0.95 |
| Hardness, Shore D | D-2240 | 65 | 64 | 66 | 60 | 62 | 63 |
| Tensile strength, (kpsi) | D-638 | (4.8) | (3.6) | (5.4) | (4.2) | (3.2) | (4.1) |
| MPa |  | 33.1 | 24.8 | 37.2 | 29.0 | 22.1 | 28.3 |
| Elongation, % | D-638 | 470 | 290 | 350 | 450 | 460 | 460 |
| Flexural Modulus, (kpsi) | D-790 | (51) | (48) | (55) | (32) | (28) | (30) |
| MPa |  | 350 | 330 | 380 | 220 | 190 | 210 |
| Tensile Impact (23° C.), KJ/m$^2$ | D-1822S | 1020 | 1020 | 865 | 1160 | 760 | 1240 |
| (ft-lbs./in$^2$) |  | (485) | (485) | (410) | (550) | (360) | (590) |
| Vicat Temperature, ° C. | D-1525 | 63 | 62 | 58 | 73 | 61 | 73 |

TABLE 2

Properties of Additional Hard Surlyn ® Resins

| IONOMER |  | SURLYN ® 8920 | SURLYN ® 8140 | SURLYN ® 9120 |
|---|---|---|---|---|
| Cation |  | Na | Na | Zn |
| Melt Flow Index | gms/10 min. | 0.9 | 2.6 | 1.3 |
| MP | ° C. | 84 | 88 | 85 |
| FP | ° C. | 52 | 49 | 50 |
| Tensile Strength | kpsi | 5.4 | 5.0 | 3.8 |
| Yeild Strength | kpsi | 2.2 | 2.8 | 2.4 |
| Elongation | % | 350 | 340 | 280 |
| Flex Modulus | kpsi | 55 | 71 | 64 |
| Shore D Hardness |  | 66 | 70 | 69 |

TABLE 3

Typical Properties of Iotek Ionomers

| Resin Properties | ASTM Method | Units | 7010 | 7020 | 7030 | 8000 | 8020 | 8030 |
|---|---|---|---|---|---|---|---|---|
| Cation type |  |  | zinc | zinc | zinc | sodium | sodium | sodium |
| Melt Index | D-1238 | g/10 min | 0.8 | 1.5 | 2.5 | 0.8 | 1.6 | 2.8 |
| Density | D-1505 | kg/m$^3$ | 968 | 966 | 964 | 957 | 956 | 956 |
| Melting Point | D-3417 | ° C. | 83.5 | 84 | 85 | 83 | 84 | 87 |
| Crystallization Point | D-3417 | ° C. | 55 | 56 | 58 | 45 | 47 | 49 |
| Vicat Softening Point | D-1525 | ° C. | 60 | 60 | 60 | 54 | 54.5 | 55.5 |
| Tensile strength at break | D-638 | MPa | 24.5 | 23.5 | 22.6 | 33 | 32.5 | 32 |
| Yeild strength | D-638 | MPa | 14 | 13 | 12 | 19 | 18.5 | 18 |
| Elongation at break | D-638 | % | 440 | 450 | 460 | 370 | 380 | 410 |
| 1% Secant modulus | D-638 | MPa | 150 | 135 | 125 | 280 | 280 | 280 |
| Shore Hardness D | D-2240 | — | 54 | 53 | 52 | 60 | 60 | 60 |
| Flex modulus (3 mm) | D-790 | MPa | 190 | 175 | 155 | 320 | 340 | 355 |

TABLE 4

Examples of Exxon High Molecular Weight Ionomers

| PROPERTY | Ex 1005 | Ex 1006 | Ex 1007 | Ex 1008 | Ex 1009 | 7310 |
|---|---|---|---|---|---|---|
| Melt Index, g/10 min. | 0.7 | 1.3 | 1.0 | 1.4 | 0.8 | 1.0 |
| Cation | Na | Na | Zn | Zn | Na | Zn |
| Melting Point, °C. | 85.3 | 86 | 85.8 | 86 | 91.3 | 91 |
| Vicat Softening Point, °C. | 54 | 57 | 60.5 | 60 | 56 | 69 |
| Tensile @ Break, MPa | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

TABLE 5

Exxon High Acid Ionomers

| Property | Ex 1001 | Ex 1002 | ESCOR ® (IOTEK) 959 | Ex 1003 | Ex 1004 | ESCOR ® (IOTEK) 960 |
|---|---|---|---|---|---|---|
| Melt index, g/10 min. | 1.0 | 1.6 | 2.1 | 1.1 | 2.0 | 1.8 |
| Cation | Na | Na | Na | Zn | Zn | Zn |
| Melting Point, °C. | 83.7 | 83.7 | — | 82 | 82.5 | 79 |
| Vicat Softening Point, °C. | 51.5 | 51.5 | 58 | 56 | 55 | 55 |
| Tensile @ Break | 34.4 MPa | 31.7 MPa | 34 MPa | 24.8 MPa | 20.6 MPa | 24 MPa |
| Elongation @ Break, % | 341 | 348 | 280 | 387 | 437 | 430 |
| Hardness, Shore D | 63 | 62 | 65 | 54 | 53 | 57 |
| Flexural Modulus | 365 MPa | 380 MPa | 480 MPa | 147 MPa | 130 MPa | 170 MPa |

TABLE 6

Additional Exxon High Acid Ionomers

| Property | Unit | EX 989 | EX 993 | EX 994 | EX 990 |
|---|---|---|---|---|---|
| Melt Index | g/10 min. | 1.30 | 1.25 | 1.32 | 1.24 |
| Moisture | ppm | 482 | 214 | 997 | 654 |
| Cation Type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m³ | 959 | 945 | 976 | 977 |
| Vicat softening point | °C. | 52.5 | 51 | 50 | 55.0 |
| Crystallization point | °C. | 40.1 | 39.8 | 44.9 | 54.4 |
| Melting point | °C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

TABLE 7

Zinc-Based Iotek Terpolymer Ionomers

| Property | Unit | IOTEK 7520 | IOTEK 7510 |
|---|---|---|---|
| Melt Index | g/10 min. | 2.0 | 0.8 |
| Density | g/cc | 0.96 | 0.97 |
| Melting Point | °F. | 151 | 149 |
| Vicat Softening Point | °F. | 108 | 109 |
| Flex Modulus | psi | 3800 | 5300 |
| Tensile Strength | psi | 1450 | 1750 |
| Elongation | % | 760 | 690 |
| Hardness, Shore D | — | 32 | 35 |

As indicated above, ionomers which contain softening comonomers, such as ionomeric terpolymers, can be included in the cover layers. Non-limiting examples of a softening comonomer include vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Non-limiting examples of soft ionomers to be blended with the above-described hard ionomers to form the cover layers of the inventive golf ball comprise sodium, zinc magnesium, calcium, manganese, nickel, potassium or lithium, etc. salts of a terpolymer of an olefin having from about 2 to 8 carbon atoms, acrylic acid or methacrylic acid, and a softening comonomer which is an unsaturated monomer of the acrylate ester class having from 1 to 21 carbon atoms. The soft ionomer is preferably an ionomer made from an acrylic acid-based polymer and an unsaturated monomer of the acrylate ester class. The soft ionomers typically have an acid content of 3–12 wt % (including the weight percent of the softening comonomer).

It has been determined that when hard-soft ionomer blends are used for cover layers, good results are achieved when the relative combination is in a range of about 90 to about 10 wt % hard ionomer and about 10 to about 90 wt % soft ionomer. For cover layers which are soft or of intermediate hardness, results are improved by adjusting the range to about 75 to 25 wt % hard ionomer and 25 to 75 wt % soft ionomer. Even better results are noted at relative ranges of about 60 to 40 wt % hard ionomer resin and about 40 to 60 wt % soft ionomer resin. For hard cover layers, the wt % of soft ionomer preferably will not exceed about 25 wt %.

As indicated above, the cover layers optionally may include hardening or softening modifiers, non-limiting examples of which include a metal stearate, such as zinc stearate, or another fatty acid salt, as described in commonly assigned U.S. Pat. Nos. 5,306,760 and 5,312,857. One purpose of the metal stearate or other fatty acid salt is to reduce the cost of production of the ball without affecting overall performance of the finished ball. Furthermore, polar-group modified rubbers can be blended with ionomers as described, for example, in commonly assigned U.S. Pat. Nos. 4,986,545, 5,098,105, 5,187,013, 5,330,837 and 5,338,610. Thermoplastic elastomers which act as hardening or softening agents, including polyurethane, a polyester elastomer such as that sold by DuPont as HYTREL®, a polyester polyurethane such as B.F. Goodrich Company's ESTANE® polyester polyurethane X-4517, and a polyester amide such as that sold by Elf Atochem S. A. under the name PEBAX®D, can be added. A plastomer such as that sold by Exxon under the name EXACT™, e.g., EXACT™ 4049 can be included. Various plasticizers and processing aids also can be used.

As indicated above, the inner, outer and intermediate shell layers may contain plastomer. The plastomer may, but need not necessarily, be crosslinked or blended with ionomer or another compatible material. Plastomers are olefin copolymers with a uniform, narrow molecular weight distribution, a high comonomer content, and an even distribution of comonomers. The molecular weight distribution of the plastomers generally is about 1.5–4, preferably 1.5–3.5 and more preferably 1.5–2.4. The density is typically in the range of 0.85–0.97 if unfoamed and 0.10–0.90 if foamed. The comonomer content typically is in the range of 1–32%, and preferably 2–20%. The composition distribution breadth index generally is greater than 30%, preferably is at least 45%, and more preferably is at least 50%.

The term "copolymer" includes (1) copolymers having two types of monomers which are polymerized together, (2) terpolymers (which are formed by the polymerization of three types of monomers), and (3) copolymers which are formed by the polymerization of more than three types of monomers. The compositions further may include additives and fillers as well as a co-agent for use with a curing agent to aid in crosslinking the plastomer or to improve processability.

The "composition distribution breadth index" (CDBI) is defined as the weight percent of the copolymer molecules which have a comonomer content within 50 percent of the median total molar comonomer content.

Plastomers are polyolefin copolymers developed using metallocene single-site catalyst technology. Plastomers exhibit both thermoplastic and elastomeric characteristics. Plastomers generally contain up to about 32 wt % comonomer. Plastomers which are useful in making golf balls include but are not limited to ethylenebutene copolymers, ethylene-octene copolymers, ethylene-hexene copolymers, and ethylene-hexene-butene terpolymers, as well as mixtures thereof.

The plastomers employed in the invention preferably are formed by a single-site metallocene catalyst such as those disclosed in EP 29368, U.S. Pat. No. 4,752,597, U.S. Pat. No. 4,808,561, and U.S. Pat. No. 4,937,299, the teachings of which are incorporated herein by reference. As is known in the art, plastomers can be produced by metallocene catalysis using a high pressure process by polymerizing ethylene in combination with other monomers such as butene-1, hexene-1, octene-1 and 4methyl-1-pentene in the presence of catalyst system comprising a cyclopentadienyl-transition metal compound and an alumoxane.

EXAC™ plastomers (Exxon Chemical Co., Houston, Tex.) are metallocene-catalyzed polyolefins. This family of plastomers has a density of 0.87–0.915 g/cc, melting points in the range of 140–220° F., Shore D hardness in the range of 20–50 (measured generally in accordance with ASTM D-2240, but measured on the curved surface of the inner shell layer), flexural modulus in the range of 2–15 k.p.s.i., tensile strength of 1600–4000 p.s.i., excellent thermal stability, and very good elastic recovery. One of these materials, known as EXAC™ 4049, is a butene copolymer with a comonomer content of less than 28% and a polymer density of 0.873 g/cc. The properties of EXACT™ 4049 are shown on Table 8 below:

TABLE 8

| Polymer Properties | Typical Values[1] | ASTM Method |
|---|---|---|
| Melt flow index | 4.5 dg/min | D-1238 (E) |
| Density | 0.873 g/cm$^3$ | D-792 |
| Elastomer Properties[2] | | |
| Hardness | 72 Shore A | D-2240 |
|  | 20 Shore D |  |
| Ultimate Tensile[3], Die D | 900 p.s.i. (6.4 MPa) | D-412 |
| Tensile Modulus |  | D-412 |
| @ 100% elongation | 280 p.s.i. (2 MPa) |  |
| @ 300% elongation | 350 p.s.i. (2.4 MPa) |  |
| Ultimate Elongation | 2000% | D-412 |
| Brittleness Temperature | ←112° F. (←80° C.) | D-746 |
| Vicat Softening Point, 200 g | 130° F. (55° C.) | D-1525 |
| Mooney Viscosity |  |  |
| (1 + 4 @ 125° C.) | 6.5 Torque Units | D-1646 |

[1]Values are typical and are not to be interpreted as specifications.
[2]Compression molded specimens.
[3]Tensile properties determined using a type D die & a crosshead speed of 20 in/min.

This material has been found to be particularly useful in -forming the inner and intermediate shell layers.

Other non-limiting examples of EXACT plastomers which are useful in the invention include linear ethylene-butene copolymers such as EXACT 3024 having a density of about 0.905 gms/cc (ASTM D-1505) and a melt flow index of about 4.5 g/10 min. (ASTM D-2839); EXACT 3025 having a density of about 0.910 gms/cc (ASTM D-1505) and a melt flow index of about 1.2 g/10 min. (ASTM D-2839); EXACT 3027 having a density of about 0.900 gms/cc (ASTM D-1505) and a melt flow index of about 3.5 g/10 min. (ASTM D-2839); and EXACT 4011 having a density of about 0.887 gms/cc (ASTM D-1505) and a melt flow index of about 2.2 g/10 min. (ASTM D-2839); and ethylene-hexene copolymers such as EXACT 3031 having a density of about 0.900 gms/cc (ASTM D-1505) and a melt flow index of about 3.5 g/10 min. (ASTM D-2839). Other non-limiting examples of useful EXACT plastomers are EXACT 4005 and EXACT 5010. Terpolymers of e.g. ethylene, butene and hexene also can be used. All of the above EXACT series plastomers are available from EXXON Chemical Co. Similar materials sold by Dow Chemical Co. as Insite® technology under the Affinity® and Engage® trademarks also can be used.

EXACT plastomers typically have a molecular weight distribution ($M_w/M_n$) of about 1.5 to 2.4, where $M_w$ is weight average molecular weight and $M_n$ is number average molecular weight, a molecular weight of about 5,000 to about 50,000, preferably about 20,000 to about 30,000, and a melt flow index above about 0.50 g/10 mins, preferably about 1–10 g/10 mins as determined by ASTM D-1238, condition E. Plastomers which may be employed in the invention include copolymers of ethylene and at least one $C_3$–$C_{20}$ α-olefin, preferably a $C_4$–$C_8$ α-olefin present in an amount of about 5 to about 32 mole %, preferably about 7 to about 22 mole %, more preferably about 9–18 mole %.

These plastomers are believed to have a composition distribution breadth index of about 45% or more.

Plastomers such as those sold by Dow Chemical Co. under the tradename ENGAGE are believed to be produced in accordance with U.S. Pat. No. 5,272,236, the teachings of which are incorporated herein in their entirety by reference. These plastomers are substantially linear polymers having a density of about 0.85 gms/cc to about 0.97 g/cc measured in accordance with ASTM D-792, a melt flow index ("MI") of about 0.01 gms/10 minutes to about 1000 grams/10 minutes, a melt flow ratio ($I_{10}/_2$) of about 7 to about 20, where $I_{10}$ is measured in accordance with ASTM D-1238 (190/10) and $I_2$ is measured in accordance with ASTM D-1238 (190/2.16), and a molecular weight distribution $M_w/M_n$ which preferably is less than 5, and more preferably is less than about 3.5 and most preferably is from about 1.5 to about 2.5. These plastomers include homopolymers of $C_2$–$C_{20}$ olefins such as ethylene, propylene, 4-methyl-1-pentene, and the like, or they can be interpolymers of ethylene with at least one $C_3$–$C_{20}$ α-olefin and/or $C_2$–$C_{20}$ acetylenically unsaturated monomer and/or $C_4$–$C_{18}$ diolefins. These plastomers generally have a polymer backbone that is either unsubstituted or substituted with up to 3 long chain branches/1000 carbons. As used herein, long chain branching means a chain length of at least about 6 carbons, above which the length cannot be distinguished using $^{13}C$ nuclear magnetic resonance spectroscopy. The preferred ENGAGE plastomers are characterized by a saturated ethylene-octene backbone, a narrow molecular weight distribution $M_w/M_n$ of about 2, and a narrow level of crystallinity. These plastomers also are compatible with pigments, brightening agents, fillers such as those described above, as well as with plasticizers such as paraffinic process oil and naphthenic process oil. Other commercially available plastomers may be useful in the invention, including those manufactured by Mitsui.

The molecular weight distribution, ($M_w/M_n$), of plastomers made in accordance with U.S. Pat. No. 5,272,236 most preferably is about 2.0. Non-limiting examples of these plastomers include ENGAGE CL 8001 having a density of about 0.868 gms/cc, a melt flow index of about 0.5 gm/10 mins, and a Shore A hardness of about 75; ENGAGE CL 8002 having a density of about 0.87 gms/cc, a melt flow index of about 1 gms/10 min, Shore A hardness of about 75; ENGAGE CL 8003 having a density of about 0.885 gms/cc, a melt flow index of about 1.0 gms/10min, and a Shore A hardness of about 86; ENGAGE EG 8100 having a density of about 0.87 gms/cc, a melt flow index of about 1 gms/10 min., and a Shore A hardness of about 87; ENGAGE 8150 having a density of about 0.868 gms/cc, a melt flow index of about 0.5 gms/10 min, and a Shore A hardness of about 75; ENGAGE 8200 having a density of about 0.87 gms/cc, a melt flow index of about 5 g/10 min., and a Shore A hardness of about 75; and ENGAGE EP 8500 having a density of about 0.87 gms/cc, a melt flow index of about 5 g/10 min., and a Shore A hardness of about 75.

In a particularly preferred form of the invention, at least one layer of the golf ball contains at least 0.01 parts by weight of a filler. Fillers preferably are used to adjust the density, flex modulus, mold release, and/or melt flow index of a layer. More preferably, at least when the filler is for adjustment of density or flex modulus of a layer, it is present in an amount of at least five parts by weight based upon 100 parts by weight of the layer composition. With some fillers, up to about 200 parts by weight probably can be used.

A density adjusting filler according to the invention preferably is a filler which has a specific gravity which is at least 0.05 and more preferably at least 0.1 higher or lower than the specific gravity of the layer composition. Particularly preferred density adjusting fillers have specific gravities which are higher than the specific gravity of the resin composition by 0.2 or more, even more preferably by 2.0 or more.

A flex modulus adjusting filler according to the invention is a filler which, when used in an amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 wt % based upon the total weight of the layer.

A melt flow index adjusting filler is a filler which increases or decreases the melt flow, or ease of processing of the composition.

The layers may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler is used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer of a filler with a higher specific gravity than the resin composition, results in an increase in moment of inertia and a lower initial spin rate. High specific gravity fillers are preferred as less volume is used to achieve the desired inner cover total weight. Nonreinforcing fillers are also preferred as they have minimal effect on COR Preferably, the filler does not chemically react with the resin composition to a substantial degree, although some reaction may occur when, for example, zinc oxide is used in a shell layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

TABLE 9

| Filler Type | Spec. Grav. | Comments |
|---|---|---|
| Precipitated hydrated silica | 2.0 | 1,2 |
| Clay | 2.62 | 1,2 |
| Talc | 2.85 | 1,2 |
| Asbestos | 2.5 | 1,2 |
| Glass fibers | 2.55 | 1,2 |
| Aramid fibers (KEVLAR ®) | 1.44 | 1,2 |
| Mica | 2.8 | 1,2 |
| Calcium metasilicate | 2.9 | 1,2 |
| Barium sulfate | 4.6 | 1,2 |
| Zinc sulfide | 4.1 | 1,2 |
| Lithopone | 4.2–4.3 | 1,2 |
| Silicates | 2.1 | 1,2 |
| Silicon carbide platelets | 3.18 | 1,2 |
| Silicon carbide whiskers | 3.2 | 1,2 |
| Tungsten carbide | 15.6 | 1 |
| Diatomaceous earth | 2.3 | 1,2 |
| Polyvinyl chloride | 1.41 | 1,2 |
| Carbonates | | |
| Calcium carbonate | 2.71 | 1,2 |
| Magnesium carbonate | 2.20 | 1,2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1,2 |
| Copper | 8.94 | 1 |
| Brass | 8.2–8.4 | 1 |
| Boron | 2.34 | 1 |
| Boron carbide whiskers | 2.52 | 1,2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1,2 |
| Iron oxide | 5.1 | 1,2 |
| Aluminum oxide | 4.0 | |
| Titanium oxide | 3.9–4.1 | 1,2 |
| Magnesium oxide | 3.3–3.5 | 1,2 |
| Zirconium oxide | 5.73 | 1,2 |
| Metal Stearates | | |
| Zinc stearate | 1.09 | 3,4 |
| Calcium stearate | 1.03 | 3,4 |
| Barium stearate | 1.23 | 3,4 |
| Lithium stearate | 1.01 | 3,4 |
| Magnesium stearate | 1.03 | 3,4 |
| Particulate carbonaceous materials | | |
| Graphite | 1.5–1.8 | 1,2 |
| Carbon black | 1.8 | 1,2 |
| Natural bitumen | 1.2–1.4 | 1,2 |
| Cotton flock | 1.3–1.4 | 1,2 |

TABLE 9-continued

| Filler Type | Spec. Grav. | Comments |
|---|---|---|
| Cellulose flock | 1.15–1.5 | 1,2 |
| Leather fiber | 1.2–1.4 | 1,2 |
| Micro balloons | | |
| Glass | 0.15–1.1 | 1,2 |
| Ceramic | 0.2–0.7 | 1,2 |
| Fly ash | 0.6–0.8 | 1,2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the cover layer.
2 Particularly useful for adjusting flex modulus of the cover layer.
3 Particularly useful for adjusting mold release of the cover layer.
4 Particularly useful for increasing melt flow index of the cover layer.
All fillers except for metal stearates would be expected to reduce the melt flow index of the cover layer.

The amount of filler employed is primarily a function of weight requirements and distribution.

The golf balls of the invention preferably have a COR of at least 0.725, more preferably at least 0.730, and most preferably at least 0.740. The golf balls of the invention preferably have an overall PGA compression of 50–120, more preferably 60–110, and most preferably 70–100.

The intermediate and outer shell layers can be formed by compression molding or injection molding in the manner described above, by casting or using other conventional molding techniques. Furthermore, the layers can be subsequently blow molded from separate parisons with the outer layer being blow molded first, the intermediate layer being blow molded inside the outer layer and the inner layer being blow molded inside the intermediate layer. Furthermore, any two adjacent layers can be molded from a single parison. In another embodiment, all three layers are blow molded from a single parison.

The golf balls of the present invention typically are coated with a thin, glossy, protective topcoat of polyurethane, epoxy, or another suitable topcoat material. The topcoat generally has a dry thickness in the range of 0.005 to 0.0030 inches, and more preferably 0.001–0.002 inches. To provide for good adhesion of the top coat on the outer cover layer, a primer coat typically is included between the outer cover layer and top coat. This primer coat generally also is made of polyurethane or epoxy, and typically has a dry thickness of 0.005 to 0.0030 inches, and more preferably 0.001–0.002 inches. The topcoat and primer layers are applied over a dimpled outer cover layer.

When the golf ball of the invention has more than three cover layers, the inner cover layer as defined in this application can be formed from two or more layers which, taken together, meet the requirements of hardness and thickness of the layer or layers which are defined herein as the inner cover layer. Similarly, the intermediate cover layer can be formed from two or more layers which, taken together, meet the requirements of hardness and thickness of the layer or layers which are defined herein as the intermediate cover layer. The outer cover layer can be formed from two or more layers which, taken together, meet the requirements of hardness and thickness of the layer or layers which are defined herein as the outer cover layer. Furthermore, one or more additional, very thin ionomeric or non-ionomeric layers can be added on either side of the inner cover layer and intermediate cover layer as long as the objectives of the invention are achieved.

Having generally described the invention, the following examples are included for purposes of illustration so that the invention may be more readily understood and are in no way intended to limit the scope of the invention unless otherwise specifically indicated.

Terms Utilized and Other Features

For purposes herein, when the terms "densities" and "specific gravities" are referred to, they are referred to in "apparent densities" and "apparent specific gravities." Some of the cover stocks of this invention are nonuniform in that they may incorporate skins and variable cell structures. These latter terms take into consideration these variables and give the actual density and specific gravity of the average structure. The terms "apparent densities" and "apparent specific gravities" also apply to the "density" and "specific gravity" of the liquid materials injected into the shell to form the core.

As is apparent from the above discussions, two principal properties involved in golf ball performance are resilience and PGA compression. The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR of solid core balls is a function of the composition of the core and of the cover. The core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers. The COR of the golf balls of the present invention is a function of the composition and physical properties of the core and cover layer materials such as flex modulus, hardness and particularly, their resilience, i.e. ability to quickly recover from a high impact deformation.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can affect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates. The term "compression" utilized in the golf ball trade generally defines the overall deflection that a golf ball undergoes when subjected to a compressive load., For example, PGA compression indicates the amount of change in golf ball's shape upon striking.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball.

A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160—Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Durability is determined by firing the golf balls at 125 ft/sec (at 72° F.) into a five-sided steel pentagonal container, the walls of which are steel plates. The container has a 19 ½ inch long insert plate mounted therein, the central portion of which has horizontally extending square grooves on it which are intended to simulate a square-grooved face of a golf club. The grooves have a width 30 of 0.033 inches, a depth 32 of 0.100 inches, and are spaced apart form one another by land areas having a width of 0.130 inches. The five walls of the pentagonal container each have a length of 14 ½ inches. The inlet wall is vertical and the insert plate is mounted such that it inclines upward 30° relative to a horizontal plane away from the opening in the container. The ball travels 15 ½–15 ¾ inches horizontally from its point of entry into the container until it hits the square-grooved central portion of the insert plate. The angle between the line of trajectory of the ball and the insert plate is 30°. The balls are subjected to a number of blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected.

Balls are assigned a Durability rating according to the following scale. A sample of 10–12 balls of the same type are obtained and are tested using the durability test apparatus described in the previous paragraph. If less than all of the balls in the sample survive 70 blows each without cracking, the ball is assigned a Durability Rating of 1. If all of the balls survive 70 blows and one or more of the balls cracks before 120 blows, the ball is assigned a Durability Rating of 2. If all of the balls survive 120 blows and the average for the sample is up to 150 blows, the ball is assigned a Durability Rating of 3. If all of the balls survive 120 blows and the average for the sample is up to 200 blows, the ball is assigned a Durability Rating of 4. If all of the balls survive 120 blows and the average for the sample is up to 240 blows, the ball is assigned a Durability Rating of 5. If all the balls survive 120 blows and the average for the sample is more than 240 blows, the ball is assigned a Durability Rating of 6.

In describing the components of the subject golf ball herein, the term "spherical" is used in conjunction with the shell (center). It is understood by those skilled in the art that when referring to golf balls and their components, the term "spherical" includes surfaces and shapes which may have minor insubstantial deviations from the perfect ideal geometric spherical shape. In addition the inclusion of dimples on the exterior surface of the shell, to effect its aerodynamic properties, does not detract from its "spherical" shape for the purposes therein or in the art. Further the internal surface of the shell as well as the core may likewise incorporate intentionally designed patterns and still be considered "spherical" within the scope of this invention.

The rotational moment of inertia of a golf ball is the resistance to change in spin of the ball and is conventionally measured using an "Inertia Dynamics Moment of Inertia Measuring Instrument".

For the Unique ball of this invention, the moment of inertia is relatively low because the liquid center of the ball does not immediately rotate when the outside of the ball begins to spin. If an increased moment of inertia is desired, this may be achieved by adding high density materials to the cover and reducing the density of the liquid core to maintain the desired ball weight.

EXAMPLES OF THE INVENTION

EXAMPLE 1

Using the procedures described above, golf balls were prepared as follows: Formulation 514-92-I was injection molded into half shells, approximately 1.68 inches in diameter and 0.190 inches thick. Formulation 514-92-1 is as follows:

| | Parts by Weight |
|---|---|
| Surlyn 1605/8940 | 50 |
| ("SURLYN" is a trademark of E. I. DuPont De Nemours & Company of Wilmington, DE) | |
| Surlyn 1706/9910 | 50 |
| Unitane 0-110 Titanium Dioxide | 2.35 |
| ("Unitane" 0-110 is a trademark of Kemira, Inc. of Savannah, GA) | |
| Uvitex OB | 0.10 |
| ("Uvitex OB" is a trademark of Ciba-Geigy of Hawthorne, New York) | |
| Ultramarine Blue | 0.024 |
| ("Ultramarine Blue" is manufactured by Whittaker-Clark and Daniels of South Plainfield, New Jersey) | |
| Total | 102.474 |

The pole height was greater than the equator radius by 0.007 inches to allow for material flow during spin welding of the two half shells to form the hollow spheres. The two half shells had a tongue and groove configuration. The two half shells were spin bonded together to produce a hollow sphere at 4100 revolutions per minute (rpm) and 15 second dwell. The grooved half shell had a molded tapered hole 0.0125 inches in diameter at the exterior ball surface and 0.0625 inches in diameter at the interior ball surface.

Specific gravity of the cover material can range from 0.95 to 1.25. The preferred range is 0.97 5 to 1.0.

The flex modulus expressed in psi at 73 degrees Fahrenheit has a range of 30,000 to 60,000. The preferred range is 45,000 to 60,000. Flex modulus is measured in accordance with A.S.T.M. Test D 790.

Samples to date using ionomer compounds as listed below have the following average data:

| | |
|---|---|
| Specific gravity: | .97 |
| Actual flex modules: | 50,000 |
| Cover weight: | 21 grams |

The estimated volume of the cover is 0.979 cubic inches, or 16.04 cubic centimeters.

A liquid core material, Formulation A, was introduced using a hypodermic syringe to completely fill the interior void. Formulation A is:

| Formulation A | Parts by Weight |
|---|---|
| Calcium Chloride | 45 |
| Water | 55 |
| Total | 100 |

Figure 15:
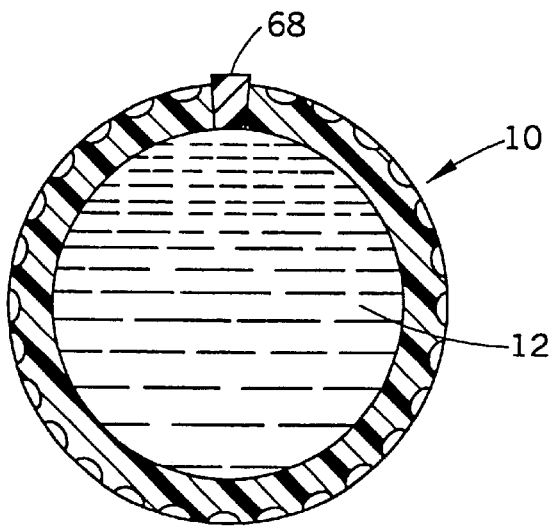

A molded plug in the shape as shown in FIGS. 12 and 15 of the same material as the shell was spin bonded into the hole to seal the contents. Spin bonding conditions were 3150 rpm and 15 seconds dwell.

The resulting product after deflashing had the following average properties:

| | |
|---|---|
| Average Diameter: | 1.694 inches |
| Average Weight: | 45.9 grams |
| Average PGA Compression: | 104 |
| Average Coefficient of Restitution: | 0.747 |

These results are the average of the three highest coefficient balls from six (6) balls produced.

The test as described above was repeated. Only 12 balls were manufactured.

| | |
|---|---|
| Average Diameter: | 1.685 inches |
| Average Weight: | 45.4 grams |
| Average PGA Compression: | 99 |
| Average Coefficient of Restitution: | 0.725 |

EXAMPLE 2

The procedure of Example 1 was followed, except that the filling material was glycerine.

The resulting product after deflashing had the following properties:

| | |
|---|---|
| Average Diameter: | 1.693 inches |
| Average Weight: | 44.4 grams |
| Average PGA Compression: | 107 |
| Average Coefficient of Restitution: | 0.758 |

These results are the average of the three longest coefficient balls of four balls produced.

As is described in Example 1 above, 12 additional balls were manufactured.

| | |
|---|---|
| Average Diameter: | 1.686 inches |
| Average Weight: | 43.8 grams |
| Average PGA Compression: | 99 |
| Average Coefficient of Restitution: | 0.732 |

EXAMPLE 3

The procedure of Example 1 was followed, except that the filling material was hydraulic oil, "Mobil Etna 26" which is a trademark of Mobile Oil Corp. of New York City, N.Y.

The resulting product after deflashing had the following properties:

| Average Diameter: | 1.693 inches |
|---|---|
| Average Weight: | 37.5 grams |
| Average PGA Compression: | 108 |
| Average Coefficient of Restitution: | 0.749 |

These results are the average of the three highest coefficient balls of four balls produced.

As is described in Example 1 above, the tests of Example 3 were repeated and 12 balls manufactured. The resulting products after deflashing had the following properties:

| Average Diameter: | 1.683 inches |
|---|---|
| Average Weight: | 37.1 grams |
| Average PGA Compression: | 99 |
| Average Coefficient of Restitution: | 0.745 |

EXAMPLE 4

The procedure of Example 1 was followed, except that the filling material was gelatin/sugar/water solution, Formulation B. Formulation B is as follows:

| Formulation B | Parts by Weight |
|---|---|
| Gelatin | 45 |
| ("Royal" Gelatin dessert, manufactured by Nabisco Brands, Inc. of East Hanover N.J. 07936) | |
| Sugar | 80 |
| Water | 240 |
| Total | 365 | introduced at one hundred fifty (150) degrees 5 Fahrenheit. On cooling, a solid gel is produced.

The resulting product after deflashing had the following properties:

| Average Diameter: | 1.687 inches |
|---|---|
| Average Weight: | 42.7 grams |
| Average PGA Compression: | 106 |
| Average Coefficient of Restitution: | 0.749 |

These results are the average of the three 15 highest coefficient balls of four balls produced.

As is described above relative to Example 1, the tests were repeated and 12 balls were manufactured. The resulting products after flashing had the following properties:

| Average Diameter: | 1.684 inches |
|---|---|
| Average Weight: | 42 grams |
| Average PGA Compression: | 98 |
| Average Coefficient of Restitution: | 0.733 |

EXAMPLE 5

The procedure of Example 1 was followed, except that the shell material 514-93-3, was as follows:

| | Parts by Weight |
|---|---|
| Escor 900 | 50 |
| ("Escor" is a Trademark of Exxon Chemical of Houston, Texas) | |
| Escor 4000 | 50 |
| Unitane 0-110 Titanium Dioxide | 2.35 |
| Uvitex OB | 0.10 |
| Ultramarine Blue | 0.024 |
| Total | 102.474 |

The resulting product after deflashing had the following properties:

| Average Diameter: | 1.693 inches |
|---|---|
| Average Weight: | 45.9 grams |
| Average PGA Compression: | 104 |
| Average Coefficient of Restitution: | 0.747 |

These results are the average of the three highest coefficient balls of four balls produced.

As is described above in Example 1, the tests of Example 1 were repeated and 12 golf balls formed. The resulting products after deflashing had the following physical properties:

| Average Diameter: | 1.687 inches |
|---|---|
| Average Weight: | 45.4 grams |
| Average PGA Compression: | 104 |
| Average Coefficient of Restitution: | 0.738 |

EXAMPLE 6

A number of blow molded inner shells were obtained which had an outer diameter of 1.510 inches and an inner shell layer thickness of 0.110 inches. The inner shells contained a solution, which had a specific gravity of about 1.3, of calcium chloride and water. The liquid filled inner shells were made from a pre-extruded blend of 50 parts by weight lotek 1002 and 50 parts by weight lotek 1003. The liquid filled inner shells were media tumbled for an hour and allowed to dry before additional layers were formed thereon.

Intermediate shell layers were injection molded over the inner shell layers using a laboratory 1.62 inch injection mold to form a number of inner balls. The inner balls were centerless ground to a diameter of 1.59 inches.

Dimpled outer shell layers were then injection molded over the intermediate shell layers. The balls were primed with a polyurethane primer and then coated with a polyurethane top coat. The primer coat had a dry thickness of about 0.0005 inches and the top coat had a thickness of about 0.0015 inches. The properties of the golf balls and shell layer formulations are shown on Table 10 below.

The "Surlyn Blend" on Tables 10–12 has the following formulation:

|  | phr |
|---|---|
| Surlyn 9910 | 50.2 |
| Surlyn 8940 | 16.8 |
| Surlyn 8320 | 17.9 |
| Surlyn 8120 | 7.7 |

The "whitener package" on Tables 10–12 has the following formulation: 2.3 phr titanium dioxide (Unitane O-110), 0.025 phr optical brightener (Eastobrite OB-1), 0.042 phr pigment and 0.004 phr stabilizer (Santanox R).

Spin testing was conducted using a custom-made Top Flite Tour Edition 9 iron at 105 ft/sec.

EXAMPLE 7–9

The procedure of Example 6 was repeated using different combinations of shell layer formulations. The properties of the golf balls and the shell layer formulations are shown below on Table 10.

Comparative Examples 1–3

A number of the blow molded cores of Example 6 were covered with a single dimpled shell layer of ionomer. The properties of the golf balls and the shell layer formulations are shown on Table 10 below.

A comparison of the balls of Examples 6–9 with those of Comparative Examples 1–3 shows that the inclusion of an intermediate layer between the inner shell layer and the outer shell layer generally results in an increase in spin rate. This is evident from a comparison of Example 6 with Comparative Example 1 and a comparison of Example 7 with Comparative Example 2. When Examples 8 and 9 are compared with Comparative Example 3, Examples 8 and 9 have a significantly higher coefficient of restitution than Comparative Example 3 at the same spin rate.

EXAMPLE 10

A number of blow molded inner shells were obtained having an outer diameter of 1.410 inches an inner shell layer thickness of 0.065 inches. The inner shells contain a solution of calcium chloride and water, which had a specific gravity of about 1.41. The liquid filled inner shells were made from a pre-extruded blend of 50 parts by weight IOTEK 1002 and 50 parts by weight IOTEK 1003. The inner shells were blow molded at a melt temperature of 320–350° F. The liquid filled inner shells were media tumbled for an hour and allowed to dry before additional layers were formed thereon.

An intermediate shell layer having an outer diameter of about 1.550 inches and a wall thickness of about 0.070 inches was formed over the inner shell layer to form an inner ball. The inner shells were made from a pre-extruded blend of 50 parts by weight IOTEK 1002 and 50 parts by weight IOTEK 1003. The inner balls were media tumbled for one hour.

Dimpled outer shell layers were then injection molded over the intermediate shell layers. The outer shell layers had an outer diameter of 1.681 inches and a wall thickness of about 0.065 inches. The outer shell layers were made of a pre-extruded blend of IOTEK 1002, IOTEK 1003, and white masterbatch. The balls were primed with a polyurethane primer and then coated with a polyurethane top coat. The primer coat had a dry thickness of about 0.0005 inches and the top coat had a dry thickness of about 0.0015 inches. The properties of the golf balls and shell layer formulations are shown on Table 11 below.

As shown by the data on Table 11, golf balls having three shell/cover layers with intermediate wall thicknesses have a good COR in combination with favorable durability.

EXAMPLE 11–15

The procedure of Example 10 was repeated with the exception that different intermediate shell layer and/or outer shell layer formulations were used. The results are shown below on Table 11. The durability values shown on Table 11 are average number of blows to failure for a set of six balls of each type. The balls were shot in a barrel test at 125 ft/sec.

EXAMPLE 16–19

The procedure of Example 10 was repeated using a number of different cover layer formulations and a different set of wall thicknesses. The inner shells had a theoretical outer diameter of 1.490 inches and a wall thickness of 0.110 inches. The intermediate shell layers had a theoretical outer diameter of 1.596 inches and a theoretical wall thickness of 0.053 inches. The outer shell layers had a theoretical outer diameter of 1.681 inches and a theoretical wall thickness of 0.043 inches, resulting in an overall theoretical wall thickness of 0.196 inches. The cover formulations and golf ball properties are shown below on Table 12.

EXAMPLE 20

The procedure of Example 10 was repeated using a different set of shell wall thicknesses. The inner shell had an actual outer diameter of 1.41 inches. The intermediate shell layer had an actual outer diameter of 1.550 inches. The outer shell layer had an outer diameter of about 1.684 inches. The cover formulation and ball properties are shown on Table 12.

EXAMPLE 21

The procedure of Example 20 was repeated with the exception that the inner shells were blow molded at a melt temperature of 400° F. This increase in temperature resulted in substantially improved durability of the resulting balls.

As shown by Examples 6–21, the use of a three layer shell allows one to more finely tailor the properties of a golf ball, including spin, compression, COR, etc., to better meet the needs of players having a wide variety of skill levels, particularly more highly skilled players.

TABLE 10

|  | Ex. 6 | Ex. 7 | Ex. 8 | Ex. 9 | Comp. 1 | Comp. 2 | Comp. 3 |
|---|---|---|---|---|---|---|---|
| Inner Shell Materials |  |  |  |  |  |  |  |
| Iotek 1002 | 50 | 50 | 50 | 50 | 50 | 50 | 50 |
| Iotek 1003 | 50 | 50 | 50 | 50 | 50 | 50 | 50 |
| Size (in.) | 1.510 | 1.510 | 1.510 | 1.510 | 1.510 | 1.510 | 1.510 |

TABLE 10-continued

|  | Ex. 6 | Ex. 7 | Ex. 8 | Ex. 9 | Comp. 1 | Comp. 2 | Comp. 3 |
|---|---|---|---|---|---|---|---|
| Thickness (in.) | 0.110 | 0.110 | 0.110 | 0.110 | 0.110 | 0.110 | 0.110 |
| Weight (g) | 35.2 | 35.2 | 35.2 | 35.2 | 35.2 | 35.2 | 35.2 |
| PGA Comp | 76 | 76 | 76 | 76 | 76 | 76 | 76 |
| COR | 747 | 747 | 747 | 747 | 747 | 747 | 747 |
| Shore C/D | 97/71 | 97/71 | 97/71 | 97/71 | 97/71 | 97/71 | 97/71 |
| Intermediate Layer |  |  |  |  | None | None | None |
| Materials | pph | pph | pph | pph | — | — | — |
| Iotek 1002 | — | — | 50 | — | — | — | — |
| Iotek 1004 | — | — | 50 | — | — | — | — |
| Iotek 8000 | — | — | — | 50 | — | — | — |
| Iotek 7030 | — | — | — | 50 | — | — | — |
| Surlyn Blend | 100 | 100 | — | — | — | — | — |
| Size (in.) | 1.59 | 1.59 | 1.59 | 1.59 | — | — | — |
| Thickness (in.) | 0.040 | 0.040 | 0.040 | 0.040 | — | — | — |
| Weight (g) | 39.9 | 39.9 | 39.8 | 40 | — | — | — |
| PGA Comp | 96 | 96 | 100 | 98 | — | — | — |
| COR | 740 | 740 | 755 | 754 | — | — | — |
| Shore C/D | 91/63 | 91/63 | 97/71 | 96/68 | — | — | — |
| Finished Ball |  |  |  |  |  |  |  |
| Outer Cover Materials | pph | pph | pph | pph | pph | pph | pph |
| Iotek 1002 | — | 46.3 | — | — | — | 46.3 | — |
| Iotek 1004 | — | 46.3 | — | — | — | 46.3 | — |
| Iotek 8000 | 46.3 | — | — | — | 46.3 | — | — |
| Iotek 7030 | 53.7 | 7.4 | 7.4 | 7.4 | 53.7 | 7.4 | 7.4 |
| Surlyn Blend | — | — | 92.6 | 92.6 | — | — | 92.6 |
| whitener pkg | 2.4 | 2.4 | 2.4 | 2.4 | 2.4 | 2.4 | 2.4 |
| Size (in.) | 1.68 | 1.68 | 1.68 | 1.68 | 1.68 | 1.68 | 1.68 |
| Thickness (in.) | 0.045 | 0.045 | 0.045 | 0.045 | 0.085 | 0.085 | 0.085 |
| Weight (g.) | 46 | 46.1 | 45.7 | 46.1 | 45.4 | 45.5 | 45.4 |
| PGA Comp | 100 | 102 | 103 | 102 | 104 | 105 | 98 |
| COR | 756 | 750 | 752 | 742 | 750 | 754 | 730 |
| Shore C/D | 96/68 | 97/71 | 91/63 | 91/63 | 96/68 | 97/71 | 91/63 |
| Spin*1 | 8499 | 8432 | 8169 | 8161 | 8293 | 8178 | 8108 |
| Spin std. dev. | 504 | 614 | 607 | 129 | 298 | 376 | 216 |

*1- Spin test #0208971 Titleist TB 100 = 9336, Top Flite XL = 7349

TABLE 11

|  | Ex. 10 | Ex. 11 | Ex. 12 | Ex. 13 | Ex. 14 | Ex. 15 |
|---|---|---|---|---|---|---|
| Inner Shell Materials |  |  |  |  |  |  |
| Iotek 1002 | 50 | 50 | 50 | 50 | 50 | 50 |
| Iotek 1003 | 50 | 50 | 50 | 50 | 50 | 50 |
| Size (in.) | 1.410 | 1.410 | 1.410 | 1.410 | 1.410 | 1.410 |
| Intermediate Layer |  |  |  |  |  |  |
| Materials | pph | pph | pph | pph | pph | pph |
| Iotek 1002 | 50 | 50 | — | — | — | — |
| Iotek 1003 | 50 | 50 | — | — | — | — |
| Iotek 1006 | — | — | 50 | 50 | — | — |
| Iotek 1007 | — | — | 50 | 50 | — | — |
| Surlyn Blend | — | — | — | — | 100 | 100 |
| Size (in.) | 1.55 | 1.55 | 1.55 | 1.55 | 1.55 | 1.55 |
| Finished Ball |  |  |  |  |  |  |
| Outer Cover Materials | pph | pph | pph | pph | pph | pph |
| Iotek 1002 | 46.3 | — | — | — | — | 46.3 |
| Iotek 1003 | 46.3 | — | — | — | — | 46.3 |
| Iotek 1006 | — | — | 46.3 | — | 46.3 | — |
| Iotek 1007 | — | 46.3 | — | 46.3 | — | — |
| Iotek 7030 | 7.4 | 7.4 | 7.4 | 7.4 | 7.4 | 7.4 |
| Surlyn Blend | — | 92.6 | — | 92.6 | — | — |
| whitener pkg | 2.4 | 2.4 | 2.4 | 2.4 | 2.4 | 2.4 |
| Size (in.) | 1.681 | 1.681 | 1.681 | 1.681 | 1.681 | 1.681 |
| Durability | 170 | 166 | 155 | 145 | 150 | 170 |

*1- Spin test #0208971 Titleist TB 100 = 9336, Top Flite XL = 7349

TABLE 12

|  | Ex. 16 | Ex. 17 | Ex. 18 | Ex. 19 | Ex. 20 | Ex. 21 |
|---|---|---|---|---|---|---|
| Inner Shell Materials |  |  |  |  |  |  |
| Iotek 1002 | 50 | 50 | 50 | 50 | 50 | 50 |
| Iotek 1003 | 50 | 50 | 50 | 50 | 50 | 50 |
| Size (in.) | 1.49 | 1.49 | 1.49 | 1.49 | 1.41 | 1.41 |
| Intermediate Layer |  |  |  |  |  |  |
| Materials | pph | pph | pph | pph | — | — |
| Iotek 1002 | 50 | — | — | 50 | 50 | 50 |
| Iotek 1003 | 50 | — | — | 50 | 50 | 50 |
| Ex 959 | — | 50 | 50 | — | — | — |
| Ex 960 | — | 50 | 50 | — | — | — |
| Size (in.) | 1.596 | 1.596 | 1.596 | 1.596 | 1.550 | 1.550 |
| Finished Ball |  |  |  |  |  |  |
| Outer Cover Materials | pph | pph | pph | pph | pph | pph |
| Iotek 1002 | 46.3 | 46.3 | — | 46.3 | 46.3 | 46.3 |
| Iotek 1003 | 46.3 | 46.3 | — | 46.3 | 46.3 | 46.3 |
| Ex 959 | — | — | 46.3 | — | — | — |
| Ex 960 | — | — | 46.3 | — | — | — |
| Iotek 7030 | 7.4 | 7.4 | 7.4 | 7.4 | 7.4 | 7.4 |
| whitener pkg | 2.4 | 2.4 | 2.4 | 2.4 | 2.4 | 2.4 |
| Size (in.) | 1.686 | 1.68 | 1.68 | 1.68 | 1.684 | 1.684 |
| Overall Shell Thickness (in.) | 0.233 | — | — | — | 0.216 | 0.216 |
| Weight (g.) | 46.5 | — | — | — | 47.75 | 47.75 |
| PGA Comp | 114 | 116 | 117 | 116 | 108 | 108 |
| COR | 745 | 745 | 754 | 739 | 732 | 732 |

TABLE 12-continued

|  | Ex. 16 | Ex. 17 | Ex. 18 | Ex. 19 | Ex. 20 | Ex. 21 |
|---|---|---|---|---|---|---|
| COR (after 2 wks.) | 760 | 765 | 768 | 760 | 750 | 750 |
| Durability | 166 | 202 | 220 | 140 | 195 | 250 |
| Durability (after 2 wks.) | 178 | 181 | 170 | 111 | 186 | — |

*1- Spin test #0208971 Titieist TB 100 = 9336, Top Flite XL = 7349

What is claimed is:

1. A golf ball comprising:
   A. a spherical shell which includes an inner first layer, a second layer and a third layer,
   B. a core which at least substantially fills the spherical shell without stressing the spherical shell, the core comprising at least one of a liquid and a gel, and
   C. a top coat layer formed over the spherical shell;
   wherein the structural characteristics of the spherical shell and the core are such that the improved golf ball has a coefficient of restitution of at least 0.725.

2. A golf ball according to claim 1, wherein each layer of the shell has a concave inner surface and a convex outer surface, the convex outer surface of the third layer being dimpled and the convex outer surface of the first and second layers being generally smooth.

3. A golf ball according to claim 1, further comprising a primer coat layer formed between the spherical shell and the top coat layer.

4. A golf ball according to claim 1, wherein the density off the second layer is less than the density of the first layer.

5. A golf ball according to claim 1, wherein the density of the second layer is less than the density of the third layer.

6. A golf ball according to claim 1, wherein each layer of the shell is thermoplastic.

7. A golf ball according to claim 1, wherein each layer of the shell has a different Shore D hardness than the Shore D hardness of any adjacent layer of the shell.

8. A golf ball according to claim 1, wherein the difference between the Shore D hardness of each layer of the shell as compared to any adjacent layer of the shell is at least three points.

9. A golf ball according to claim 1, wherein the third layer of the shell comprises ionomer.

10. A golf ball according to claim 1, wherein at least one layer of the shell is formed from at least one member selected from the group consisting of ionomers, vinyl resins, polyolefins, polyurethanes, polyamides, acrylic resins, blends of acrylic resins with polyvinyl chloride, blends of acrylic resins with elastomers, thermoplastic rubbers, polyphenylene oxide resins, blends of polyphenylene oxide with high impact polystyrene, thermoplastic polyesters, blends of polycarbonate with acrylonitrile butadiene styrene, polybutylene terephthalate, polyethylene terephthalate, styrene maleic anhydride, polyethylene elastomers, blends of polyvinyl chloride with acrylonitrile butadiene styrene or ethylene vinyl acetate, and blends of thermoplastic rubbers with polyethylene, polypropylene, polyacetal, polyamide, polyesters, or cellulose esters.

11. A golf ball according to claim 10, wherein each layer of the shell has a different overall chemical composition than the other layers of the shell.

12. A golf ball according to claim 1, wherein each layer of the shell has a thickness of at least 0.020 inches.

13. A golf ball according to claim 1, wherein at least one layer of the shell is formed from a polyethylene-containing material.

14. A golf ball according to claim 1, wherein at least one layer of the shell is formed from at least one member selected from the group consisting of polypropylene, rubber-toughened olefin polymers, acid copolymers which do not become part of an ionomeric copolymer, styrenelbutadiene/styrene block copolymers, styrene/ethylene-butylene/styrene block copolymers, ethylene vinyl acetates, ethylene methyl acrylates, polyvinyl chloride resins, polyamides, thermoplastic polyurethanes.

15. A golf ball according to claim 1, wherein the first layer has a Shore D hardness of 60–80.

16. A golf ball according to claim 15, wherein each layer of the shell is ionomeric.

17. A golf ball according to claim 15 wherein the third layer has a Shore D hardness of 60–80.

18. A golf ball according to claim 17, wherein the second layer has a Shore D hardness of 10–60.

19. A golf ball according to claim 1, wherein the first layer has a Shore D hardness of 10–60.

20. A golf ball according to claim 19, wherein the third layer has a Shore D hardness of 10–60.

21. A golf ball according to claim 20, wherein the second layer has a Shore D hardness of 60–80.

22. A golf ball according to claim 1, wherein the sum of the thickness of the first, second and third layers is 0.060–0.410 inches.

23. A golf ball according to claim 1, wherein each layer of the shell has the same Shore D hardness.

24. A golf ball according to claim 23, wherein each layer of the shell has generally the same composition.

25. A golf ball according to claim 1, wherein all of the layers have generally the same Shore D hardness.

26. A golf ball according to claim 1, wherein the spherical shell includes a fourth layer surrounding the third layer.

27. The golf ball of claim 1, wherein the structural characteristics of the spherical shell and the core are such that the improved golf ball has an initial velocity which approaches but does not exceed the maximum allowable limit imposed by the U.S.G.A.

28. The golf ball of claim 1, wherein the structural characteristics of the spherical shell and the core are such that the improved golf ball has a coefficient of restitution of at least 0.745.

29. The golf ball of claim 1, wherein each said layer of said spherical shell has a thickness between 0.02 inches and 0.20 inches.

30. A golf ball according to claim 1, wherein each of said first, second, and third layers is made of an ionomer resin.

31. A golf ball according to claim 1, having a PGA compression of at least 98.

32. A golf ball according to claim 1, having a PGA compression of at most 108.

33. A golf ball according to claim 1, wherein at least one layer of the shell is formed from at least one member selected from the group consisting of:
   low density polyethylene,
   linear low density polyethylene,
   high density polyethylene,
   plastomers including metallocene catalyzed polyolefins,
   flexomers,
   dynamically vulcanized elastomers,
   amide-ester elastomers,
   graft copolymers of ionomer and polyamide,
   crosslinked transpolyisoprene blends,
   thermoplastic block polyesters, thermoplastic block polyamides, and thermosetting polyurethanes.

34. The golf ball of claim 1, wherein the structural characteristics of the spherical shell and the core are such that the improved golf ball has a coefficient of restitution of at least 0.73.

35. The golf ball of claim 1, wherein the structural characteristics of the spherical shell and the core are such that the improved golf ball has a coefficient of restitution of at least 0.74.

36. The golf ball of claim 1, wherein the structural characteristics of the spherical shell and the core are such that the improved golf ball has a coefficient of restitution of at least 0.765.

37. A golf ball comprising:
 A. a thermoplastic shell which includes a plurality of shell layers including at least an inner first layer, a second layer and a third layer, the second layer being sandwiched between the first layer and the third layer, wherein the density of the second layer is less than the density of the first layer,
 B. a non-wound core which comprises a liquid, is positioned within the shell, and does not stress the shell, and
 C. a top coat layer formed over the thermoplastic shell.

38. A golf ball comprising:
 A. a thermoplastic shell which includes a plurality of shell layers including at least an inner first layer, a second layer and a third layer, the second layer being sandwiched between the first layer and the third layer, wherein the density of the second layer is less than the density of the third layer,
 B. a non-wound core which comprises a liquid, is positioned within the shell, and does not stress the shell, and
 C. a top coat layer formed over the thermoplastic shell.

39. A golf ball according to claim 38, wherein the third layer of the shell is ionomeric.

40. A golf ball comprising:
 A. a thermoplastic shell which includes a plurality of shell layers including at least an inner first layer, a second layer and a third layer, the second layer being sandwiched between the first layer and the third layer, wherein at least one layer of the shell is formed from at least one member selected from the group consisting of ionomers, vinyl resins, polyolefins, polyurethanes, polyamides, acrylic resins, blends of acrylic resins with polyvinyl chloride, blends of acrylic resins with elastomers, thermoplastic rubbers, polyphenylene oxide resins, blends of polyphenylene oxide with high impact polystyrene, thermoplastic polyesters, blends of polycarbonate with acrylonitrile butadiene styrene, polybutylene terephthalate, polyethylene terephthalate, styrene maleic anhydride, polyethylene elastomers, blends of polyvinyl chloride with acrylonitrile butadiene styrene, or ethylene vinyl acetate, and blends of thermoplastic rubbers with polyethylene, polypropylene, polyacetal, nylon, polyesters, or cellulose esters,
 B. a non-wound core which comprises a liquid, is positioned within the shell, and does not stress the shell, and
 C. a top coat layer formed over the thermoplastic shell.

41. A golf ball according to claim 40, wherein each layer of the shell has a thickness of at least 0.020 inches.

42. A golf ball according to claim 40, wherein the ball has a Durability Rating of at least 4.

43. A golf ball according to claim 40, wherein the ball has a Durability Rating of at least 5.

* * * * *